(12) United States Patent
Yano et al.

(10) Patent No.: US 6,499,554 B1
(45) Date of Patent: Dec. 31, 2002

(54) SEAT BELT RETRACTOR

(76) Inventors: Hideaki Yano, c/o Takata corporation, 4-30, Roppongi 1-chome, Minato-ku, Tokyo 106-8510 (JP); Koji Tanaka, c/o Takata corporation, 4-30, Roppongi 1-chome, Minato-ku, Tokyo 106-8510 (JP); Hiromasa Tanji, c/o Takata corporation, 4-30, Roppongi 1-chome, Minato-ku, Tokyo 106-8510 (JP)

( * ) Notice: Subject to any disclaimer, the term of this patent is extended or adjusted under 35 U.S.C. 154(b) by 0 days.

(21) Appl. No.: 09/631,728

(22) Filed: Aug. 3, 2000

(30) Foreign Application Priority Data

| Aug. 6, 1999 | (JP) | ................................. 11-223954 |
| May 24, 2000 | (JP) | ................................. 2000-153220 |
| Jul. 3, 2000 | (JP) | ................................. 2000-200965 |
| Jul. 26, 2000 | (JP) | ................................. 2000-225424 |

(51) Int. Cl.7 ............................................. B60R 21/00
(52) U.S. Cl. ...................... 180/268; 280/806; 280/807; 297/480
(58) Field of Search ................ 180/269, 270; 280/806, 807, 803; 297/480

(56) References Cited

U.S. PATENT DOCUMENTS

| 4,436,255 | A | * | 3/1984 | Matsui et al. | ............. 342/382.2 |
| 4,483,494 | A | * | 11/1984 | Takada | ................. 242/372 |
| 4,603,819 | A | * | 8/1986 | Loose et al. | ............. 242/379 |
| 4,624,422 | A | * | 11/1986 | Hollowell | ............. 242/381.1 |
| 4,854,522 | A | * | 8/1989 | Brown et al. | ............. 242/385.2 |
| 4,907,757 | A | * | 3/1990 | Rumpf et al. | ............. 242/385.4 |
| 5,072,968 | A | * | 12/1991 | Hamaue | ............. 242/383.2 |
| 5,087,075 | A | * | 2/1992 | Hamaue | ............. 242/375.1 |
| 5,232,177 | A | * | 8/1993 | Hibata | ............. 242/382.2 |
| 5,622,327 | A | * | 4/1997 | Health et al. | ............. 242/383.4 |
| 5,769,345 | A | * | 6/1998 | Morner et al. | ............. 242/375.3 |
| 5,788,281 | A | * | 8/1998 | Yanagi et al. | ............. 280/806 |
| 5,904,371 | A | * | 5/1999 | Koning | ............. 242/379.1 |
| 5,906,326 | A | * | 5/1999 | Specht | ............. 242/374 |
| 5,934,596 | A | * | 8/1999 | Gorman et al. | ............. 242/379.1 |
| 5,984,223 | A | * | 11/1999 | Hiramatsu | ............. 242/374 |
| 6,076,757 | A | * | 6/2000 | Holzapfel | ............. 242/374 |

FOREIGN PATENT DOCUMENTS

| EP | 000543520 | * | 5/1993 | ............. 280/807 |
| GB | 002223667 A | * | 4/1990 | ............. 280/807 |
| GB | 002263624 | * | 8/1993 | ............. 280/807 |
| GB | 2 304 540 | | 3/1997 | |

* cited by examiner

*Primary Examiner*—Paul N. Dickson
*Assistant Examiner*—Toan C To

(57) ABSTRACT

A seat belt retractor is formed of a frame, a reel rotationally supported by the frame for winding a seat belt, a reel urging device connected to the reel for urging the reel in a seat belt winding direction, a locking device provided between the frame and the reel for allowing the reel to rotate freely in a normal state and preventing the reel to rotate in a belt unwinding direction when necessary, and a belt tension control mechanism for controlling a belt tension of the seat belt. The belt tension control mechanism includes a motor, and a power transmission path situated between the motor and the reel and actuated by the motor. The power transmission path has an OFF-state in which a rotational torque of the motor is not transmitted between the motor and the reel, and an ON-state in which the rotational torque is transmitted between the motor and the reel. A power transmission path switching mechanism selectively switches the power transmission path between the ON-state and the OFF-state. The belt tension control mechanism is simplified by reducing the number of the components.

17 Claims, 36 Drawing Sheets

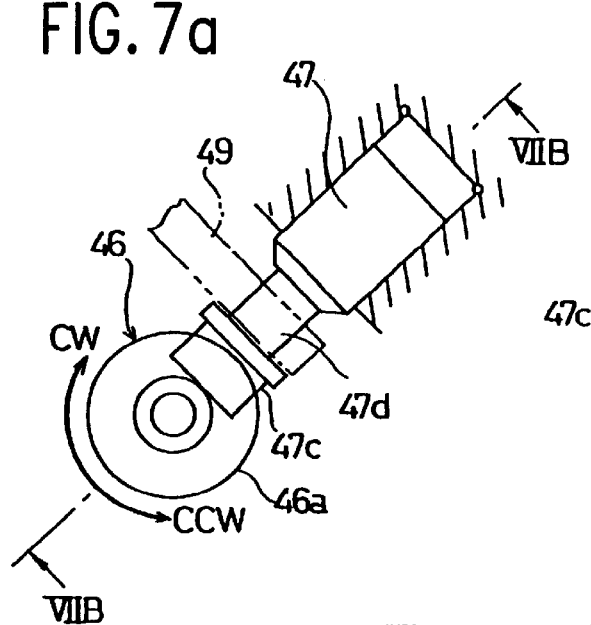
FIG. 7a
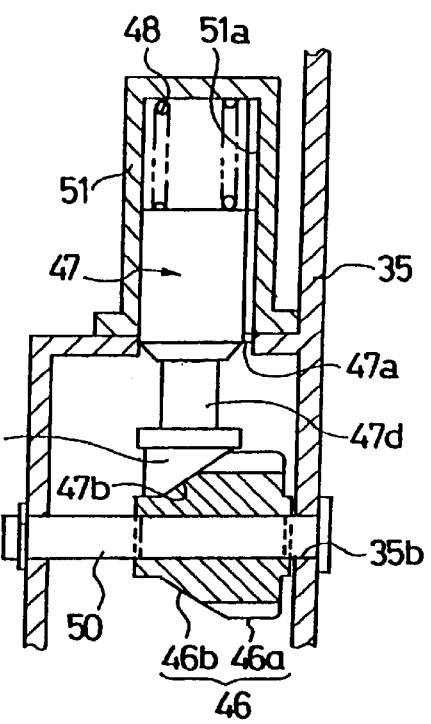
FIG. 7b
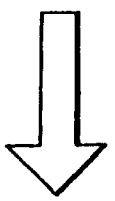 CCW rotation
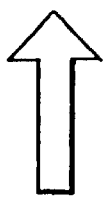 CW rotation
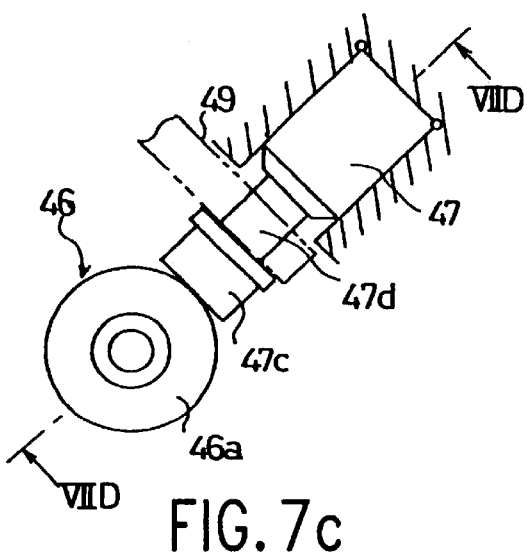
FIG. 7c
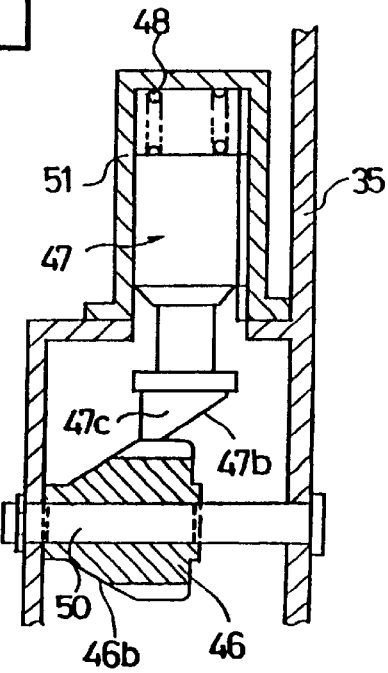
FIG. 7d

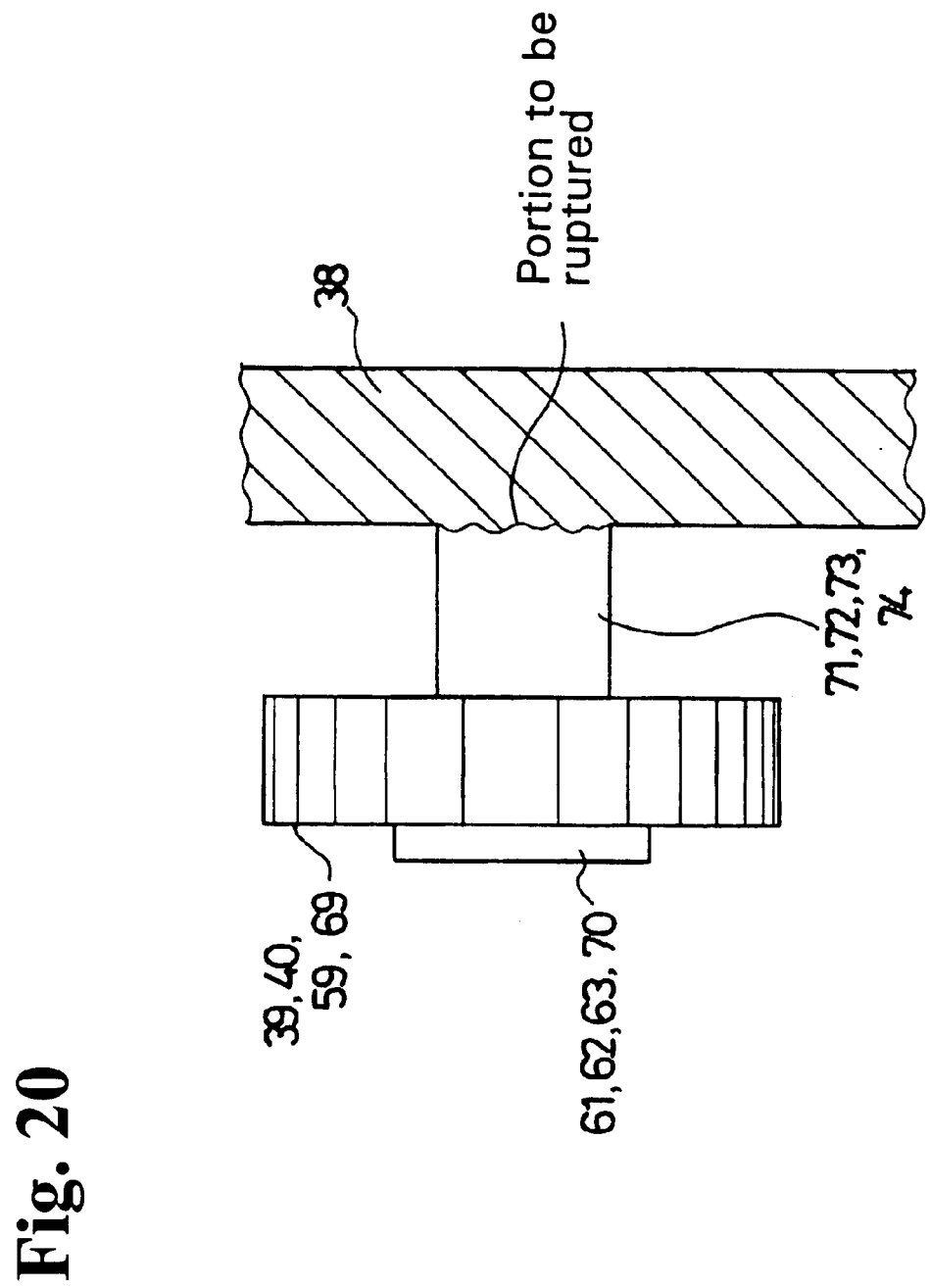

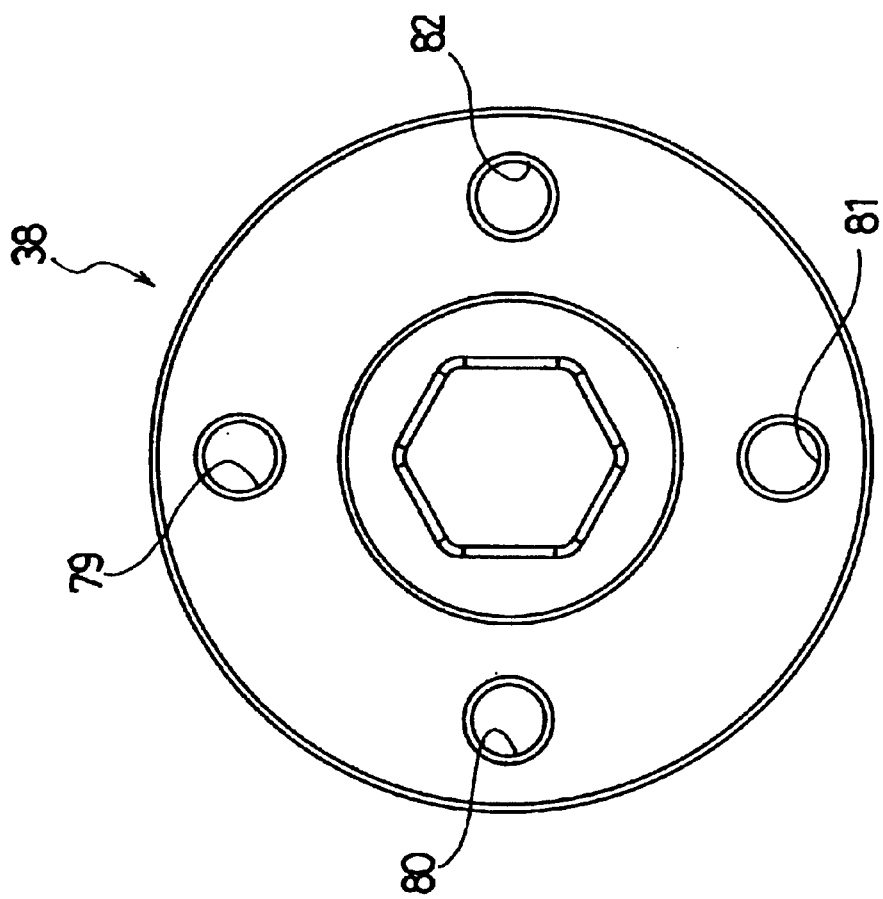

Fig. 28(a) Fig. 28(b)
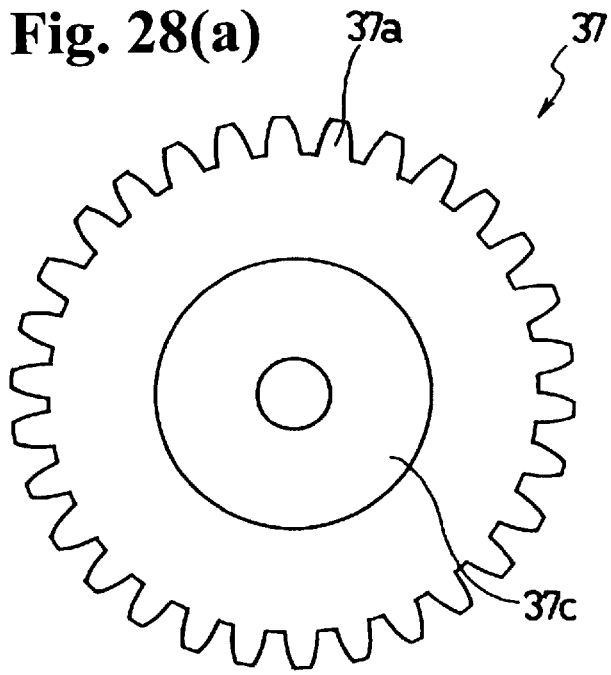
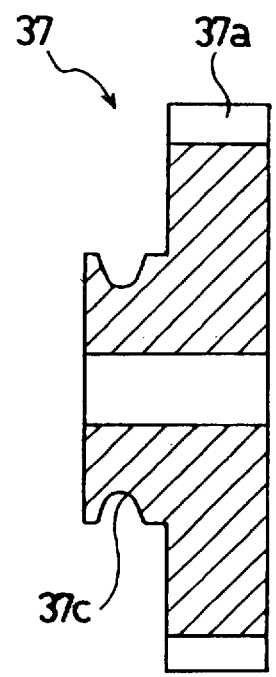
Fig. 29(a) Fig. 29(b)
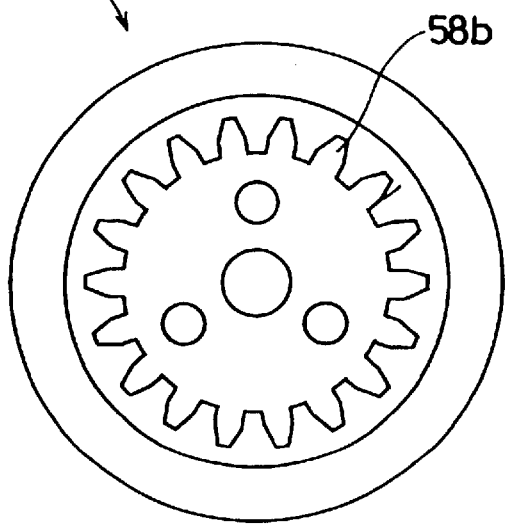
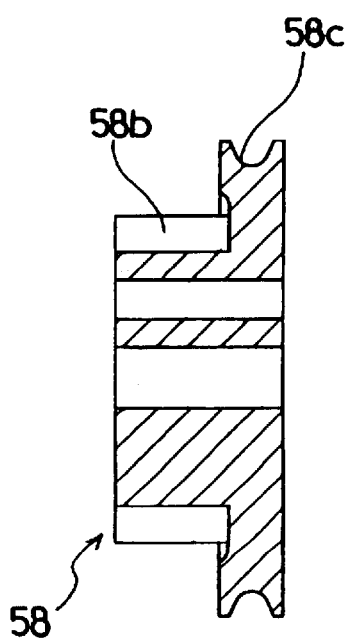

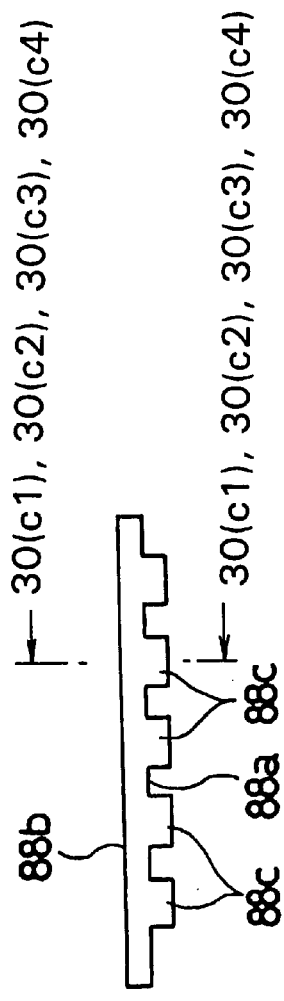
Fig. 30(c)
Fig. 30(c4)
Fig. 30(c3)
Fig. 30(c2)
Fig. 30(c1)

SEAT BELT RETRACTOR

BACKGROUND OF THE INVENTION AND RELATED ART STATEMENT

The present invention relates to a seat belt retractor mounted on a vehicle, such as automobile, for controlling unwinding and winding of a seat belt for restraining and protecting a passenger and, more specifically, the invention relates to a seat belt retractor for restraining and protecting a passenger more reliably by controlling tension of the seat belt based on the conditions outside the vehicle or the operating conditions of the seat belt.

The seat belt device that has been mounted conventionally on the vehicle, such as automobile, protects a driver and passenger from being jumped out from the seat in case of emergency such that an abrupt deceleration is applied to the vehicle in the event of a collision or the like by restraining the driver or passenger with a seat belt.

The seat belt device of this type is provided with a seat belt retractor for winding the seat belt. The seat belt retractor comprises energy application means, such as flat spiral spring, for urging a reel for winding the seat belt at all the time in the normal winding direction. The seat belt is wound on the reel by the energy applied by the energy application means when not in use. In contrast, in use, the seat belt is unwound against the energy applied by the energy application means and worn by the passenger. The seat belt retractor prevents unwinding of the seat belt in case of emergency as stated above by actuating locking means to prevent the reel from rotating in the unwinding direction. This ensures that the seat belt restrains and protects the passenger in case of emergency.

In the conventional seat belt device of the type described above, an almost constant tension is applied to the seat belt by the energy from the energy application means when the seat belt is in use. Therefore, the seat belt retractor always acts in the same manner independently of the conditions of the vehicle itself and surrounding the vehicle. However, although the conventional seat belt device ensures protection of the passenger in case of emergency as stated above, it can not be said that the seat belt is controlled comfortably for the passenger in the case other than emergency as stated above. In addition, it is preferable to protect the passenger more positively by restraining the passenger securely in case of emergency.

A passenger restraining and protecting system is provided in Japanese Unexamined Patent Publication (KOKAI) No. 9-132113, wherein the restraint and protection of the passenger are carried out more efficiently and more comfortably for the passenger by controlling the rotation of the reel of the seat belt retractor and adjusting the belt tension by a motor with consideration of the conditions between the vehicle itself and outer objects.

On the other hand, when the locking means of the seat belt retractor is actuated in case of emergency and prevents the reel from rotating in the unwinding direction as stated above, the passenger tends to move forward by an inertial force and is subjected to a significant impact by the seat belt. Therefore, a seat belt retractor comprising a belt load limiting mechanism (EA mechanism) is also proposed, wherein a torsion bar is provided between the reel and the locking means in order to protect the passenger from the impact so that the torsional deformation of the torsion bar absorbs the impact energy and relieves the impact applied to the passenger.

Since a large number of components is used in the belt tension control mechanism in the passenger restraining and protecting system disclosed in Japanese Unexamined Patent Publication (KOKAI) No. 9-132113, and these components perform complicated actions, the seat belt retractor becomes significantly large size and the operational control is complicated.

However, the space in the interior of the vehicle where the seat belt retractor is mounted is limited, and is quite small, and the space for mounting the seat belt retractor is strictly limited when considering the habitability of the interior of the vehicle. Therefore, it is preferable to provide a seat belt retractor that can accommodate the strict limitation of the mounting space by downsizing it as small as possible, while allowing control of the belt tension based on the conditions between the vehicle itself and the outer objects.

In addition, since the operational control of the belt tension control mechanism is quite complicated, the drive control of the motor is not simple and, in addition, the drive circuit of the motor is complicated and costly.

In view of such conditions, it is an object of the invention to provide a seat belt retractor, wherein the structure of the belt tension control mechanism is simplified by reducing the number of components as small as possible, and the control of the belt tension control mechanism is reliable and simple.

Further objects and advantages of the invention will be apparent from the following description of the invention.

SUMMARY OF THE INVENTION

In order to overcome the problems described above, a seat belt retractor according to a first aspect of the invention comprises a reel for winding a seat belt, reel urging means for urging the reel in the seat belt winding direction, locking means provided between a frame and the reel for allowing rotation of the reel in a normal condition, and preventing the rotation of the reel in the belt unwinding direction when necessary, and a belt tension control mechanism for controlling the belt tension of the seat belt. The belt tension control mechanism comprises a motor for generating a rotational torque, a power transmission path having an OFF-state in which the rotational torque is not transmitted between the motor and the reel, and an ON-state in which a rotational torque is transmitted between the motor and the reel, and a power transmission path switching mechanism for selectively switching the power transmission path between the ON-state and the OFF-state. The power transmission path switching mechanism is actuated by the rotational torque of the motor.

In a second aspect of the invention, the power transmission path includes a power transmission gear mechanism; the power transmission path switching mechanism includes a switch gear axially movable for controlling the operation of the power transmission path switching mechanism; and the gear of the power transmission gear mechanism and the switch gear are both formed in helical gears and are engaged with respect to each other. When the gear of the power transmission gear mechanism is rotated by the rotational torque of the motor, the switch gear is rotated, and the axial tension generated in the axial direction by the rotation of both gears moves the switch gear in the axial direction, thereby actuating the power transmission path switching mechanism and setting the power transmission path into the ON-state.

In a third aspect of the invention, the power transmission path father includes a speed reducing mechanism for reducing the speed of the rotation of the motor transmitted from the power transmission gear mechanism and transmitting it to the reel; and the speed reducing mechanism includes a sun gear, a ring-shaped internal gear rotatably mounted and having ratchet teeth on the outer periphery thereof and internal teeth on the internal periphery thereof, a planetary gear to be engaged with the sun gear and with the internal gear, a carrier for rotatably supporting the planetary gear and transmitting the rotation thereof to the reel, and a speed reducing gear provided so as to rotate with the sun gear as a single unit for receiving the rotation of the motor transmitted from the power transmission gear mechanism. The power transmission path switching mechanism further comprises a stop lever rotatable between a non-engaging position in which the stop lever is not engaged with the ratchet teeth and the engaging position in which the stop lever is engageable with the ratchet teeth, and a plunger for placing the stop lever to the non-engaging position in the normal state in which the switch gear does not move in the axial direction to allow the free rotation of the internal gear, and for preventing the rotation of the internal gear when actuated by the movement of the switch gear in the axial direction, by placing the stop lever to the engaging position so that the stop lever is engaged with the ratchet teeth. The power transmission path is set to the OFF-state when the internal gear is free to rotate, and is set to the ON-state when the internal gear is prevented from rotating.

In a fourth aspect of the invention, the power transmission path includes a power transmission gear mechanism, and the power transmission path switching mechanism includes a control lever rotatable for controlling the operation of the power transmission path switching mechanism. When a gear of the power transmission gear mechanism is rotated by the rotational torque of the motor, the power transmission path switching mechanism is actuated by the rotation of the rotatable control lever so that the power transmission path is set to the ON-state.

In a fifth aspect of the invention, the power transmission path further comprises a speed reducing mechanism for reducing the speed of the rotation of the motor transmitted from the power transmission gear mechanism and transmitting it to the reel. The speed reducing mechanism comprises a sun gear, a ring-shaped internal gear rotatably mounted and having ratchet teeth on the outer periphery and internal teeth on the inner periphery, a planetary gear to be engaged with the sun gear and the internal gear, a carrier for rotatably supporting the planetary gear and transmitting the rotation thereof to the reel, and a speed reducing gear provided so as to rotate with the sun gear as a single unit for receiving the rotation of the motor transmitted from the power transmission gear mechanism. The power transmission path switching mechanism further comprises a stop lever rotatable between a non-engaging position in which the stop lever is not engaged with the ratchet teeth and an engaging position in which the stop lever is engageable with the ratchet teeth, so that, in the normal state in which the control lever does not rotate, the stop lever is placed into the non-engaging position to allow the free rotation of the internal gear, and when the control lever is rotated, the stop lever is placed to the engaging position and engaged with the ratchet teeth to prevent the rotation of the internal gear. In the state in which the internal gear is free to rotate, the power transmission path is set to OFF-state and in the state in which the rotation of the internal gear is prevented, the power transmission path is set to the ON-state.

In addition, in a sixth aspect of the invention, the control lever may be formed of a lever spring having a prescribed resiliency.

In a seventh aspect of the invention, the planetary gear comprises a large planetary gear having a large diameter and engaging the sun gear at all the time, and a small planetary gear having a diameter smaller than the large planetary gear provided so as to rotate with the large planetary gear as a single unit. The small planetary gear engages the internal teeth of the internal gear at all the time.

In an eighth aspect of the invention, the speed reducing mechanism is provided with a transmitted torque limiting mechanism that discontinues transmission of a power when a power transmission torque is equal to or higher than a prescribed value.

In a ninth aspect of the invention, the transmitted torque limiting mechanism is composed of a supporting portion of the planetary gear that is ruptured when the power transmission torque is equal to or higher than the prescribed value.

In the tenth aspect of the invention, the power transmission gear mechanism includes a belt power transmission mechanism comprising first and second pulleys, and an endless belt looped between the first and the second pulleys. The belt power transmission mechanism is provided with a transmitted torque limiting mechanism that discontinues power transmission by generating a slip between the endless belt and at least one of the first and the second pulleys when a power transmission torque is equal to or higher than a prescribed value.

In an eleventh aspect of the invention, a seat belt retractor comprises at least a reel for winding a seat belt, locking means provided between a frame and the reel for allowing rotation of the reel in a normal condition and actuated to prevent the rotation of the reel in a belt unwinding direction when necessary, and a belt tension control mechanism for controlling the belt tension of the seat belt. The belt tension control mechanism comprises a motor for generating a rotational torque, a power transmission path for transmitting a rotational torque between the motor and the reel, vehicle's emergency state detecting means for detecting the emergency state of the vehicle and sending a signal, and motor drive control means for driving the motor in the belt winding direction for a first preset time period according to the signal from the vehicle's emergency state detecting means to restrain the passenger, then stopping the operation of the motor, and when the prescribed conditions are satisfied after the motor has stopped, driving the motor again in the belt winding direction additionally for a second preset time period.

In addition, in a twelfth aspect of the invention, the vehicle's emergency state detecting means detects that the vehicle is in the emergency state when it determines that three conditions, that is, a condition that the speed of the vehicle is equal to or higher than the first fixed speed, a condition that the speed of depression of the brake pedal is equal to or higher than a fixed speed of depression, and a condition that a deceleration of the vehicle is equal to or higher than the first fixed deceleration, are all satisfied.

In addition, in a thirteenth aspect of the invention, the vehicle's emergency state detecting means detects that the vehicle is in the emergency state when a condition that the speed of the vehicle is equal to or higher than the first fixed speed is determined to be satisfied, when a condition that the speed of depression of the brake pedal is equal to or higher than a fixed speed of depression is determined to be satisfied, or when a condition that the acceleration of the vehicle is equal to or higher than the first fixed acceleration which is a positive value, or is equal to or lower than the second fixed acceleration which is a negative value is determined to be satisfied.

In a fourteenth aspect of the invention, the prescribed condition is one of a condition that the vehicle has stopped, a condition that the speed of the vehicle is equal to or lower than the second fixed speed, a condition that the deceleration of the vehicle is equal to or lower than a second fixed deceleration, and a condition that a time elapsed from a moment when the operation of the motor is stopped is equal to or longer than a third preset time period.

In addition, in a fifteenth aspect of the invention, the motor is driven in the belt unwinding direction for the third preset time period after the motor is driven in the belt winding direction for the second preset time period.

In the seat belt retractor in this arrangement according to the present invention, the ON and OFF-states of the power transmission path between the reel and the motor is selectively switched by the power transmission switching mechanism operationally controlled by a driving force of the motor. In other words, when the motor is not in operation, the power transmission path switching mechanism is not actuated, the power transmission path is set to OFF-state, and thus a rotational torque is not transmitted between the motor and the reel. Therefore, when the seat belt is drawn out and the reel rotates in the belt unwinding direction, or when the reel rotates in the belt winding direction during belt winding operation after the seat belt is unwound, the rotation of the reel is not transmitted to the motor and the power transmission path switching mechanism, and the motor and the power transmission path switching mechanism are not affected by the rotation of the reel.

When the motor is in operation, the rotational torque of the motor actuates the power transmission path switching mechanism, the power transmission path is set to the ON-state, and the rotational torque is transmitted between the motor and the reel. Therefore, the rotational torque of the motor is transmitted to the reel via the power transmission path switching mechanism to rotate the reel, and the winding and unwinding of the seat belt are carried out to control the belt tension. In this way, the belt tension is controlled to a prescribed value by the belt tension control mechanism actuated by the driving force of the motor.

In this case, since the ON and OFF-states of the power transmission path are controlled by the power transmission path switching mechanism operated by rotational torque of the motor, a specifically designed actuator driven by other motive power, such as electromagnetic solenoid or the like, for actuating the power transmission path switching mechanism is not required. Therefore, the power transmission path switching mechanism has less number of components and is simple in structure, and thus the cost is further reduced.

According to one aspect the invention, when a power transmission torque is equal to or higher than the prescribed value, the transmitted torque limiting mechanism discontinues transmission of a power. Accordingly, in case a power transmitted in case of an emergency is increased suddenly, the power transmission is stopped whereby a load of the motor itself is not linked to the reel side. Therefore, as described above, in the seat belt retractor having the EA mechanism on the reel side, the load of the motor itself is not linked to the EA mechanism. As a consequent, increase in load applied to the EA mechanism due to the load of the motor itself (EA load) is suppressed. In this case, according to the invention, the structure of the transmitted torque limiting mechanism is simple because the supporting portion of the planetary gear is constructed to be ruptured to discontinue transmission of the power when the power transmission torque is equal to or higher than the prescribed value.

In one aspect the invention, when the power transmission torque is equal to or higher than the prescribed value, a slip generated between the endless belt and the pulley discontinues the power transmission. Accordingly, as described above, even when the power transmitted increases suddenly, transmission of the power is discontinued, so that the high load of the motor itself is not linked to the reel side. Therefore, in the seat belt retractor including the EA mechanism on the reel side, the high load of the motor itself is not linked to the EA mechanism. Consequently, increase in the belt limiting load due to the high load of the motor itself can be controlled or suppressed.

In addition, in the above case, the component of the power transmission mechanism, such as a supporting portion of the planetary gear, is not ruptured when a power transmission torque is equal to or higher than the prescribed value, so that when a power transmission torque has lowered to the prescribed value or below, the component can be used repeatedly. Therefore, in the vehicle that can be driven freely even after occurrence of an emergency, such as a crush, when another emergency, such as a secondary crush occurs again while the vehicle is being driven to another location, such as a repair shop, the capability of the seat belt retractor to restrain the passenger by winding its seat belt by the motor may be fully exerted again.

According to one aspect of the invention, when the emergency state of the vehicle is detected, the motor is driven in the belt winding direction for the first preset time period to restrain the passenger. Then, when the prescribed conditions are satisfied after stoppage of the motor, the motor is driven again in the belt winding direction additionally for at least the second preset time period. Consequently, after the locking means is actuated by occurrence of the vehicle's emergency and then the emergency state is eliminated, the actuation of the locking means is automatically released. Therefore, the passenger is released easily and more reliably from the state of secure restraint brought by the motor driven in the belt winding direction. In addition, it is not necessary to release the engagement between the tongue and the buckle every time as in the case of the conventional system any more, whereby the additional lock releasing operation to be made by the passenger can be eliminated.

Especially, in one aspect of the invention, only when three conditions are satisfied, the vehicle's emergency state can be detected, so that the detection is performed in further detail and more accurately.

In one aspect of the invention, detection of the vehicle's emergency state by the vehicle's emergency state detecting means is made relatively easy since the vehicle's emergency state detecting means detects that the vehicle is in the emergency state when the condition that the speed of the vehicle is equal to or higher than the first fixed speed is determined to be satisfied, when the condition that the speed of depression of the brake pedal is equal to or higher than a fixed speed of depression is determined to be satisfied, or when the condition that the acceleration of the vehicle is equal to or higher than the first fixed acceleration which is a positive value, or is equal to or lower than the second fixed acceleration which is a negative value is determined to be satisfied.

In one aspect of the invention, it is determined that the vehicle's emergency state is eliminated when one of the conditions, i.e. the condition that the vehicle has stopped, the condition that the speed of the vehicle is equal to or lower then the second fixed speed, the condition that the deceleration of the vehicle is equal to or lower than the second fixed deceleration, and the condition that the time elapsed from the stoppage of the motor is equal to or longer than the third preset time period, is eliminated. Consequently, the operation of the locking means is automatically released at an earlier stage and more flexibly after the vehicle's emergency state is eliminated.

In one aspect of the invention, after the vehicle's emergency state is eliminated and the operation of the locking means is automatically released, the seat belt is restored automatically to the state before the vehicle's emergency state was detected. Consequently, the passenger need not perform the additional lock releasing operation, and what is more, the user can be released automatically from the restrained state.

BRIEF DESCRIPTION OF THE DRAWINGS

FIGS. 7(a)–7(d) are explanatory drawings illustrating the operation of a switch gear used in the seat belt retractor shown in FIG. 1, wherein FIG. 7(a) is the switch gear in a non-operating mode, as seen from the direction of an axis of the reel, FIG. 7(b) is a partly sectional view taken along line 7(b)—7(b) in FIG. 7(a), FIG. 7(c) is the switch gear in an operating mode, as seen from the direction of the axis of the reel, and FIG. 7(d) is a partly sectional view taken along line 7(d)—7(d) in FIG. 7(c);

FIGS. 19(a)–19(c) show a carrier used in the seat belt retractor shown in FIG. 17, wherein FIG. 19(a) is a front view, FIG. 19(b) is a cross sectional view taken along line 19(b)—19(b) of FIG. 19(a), and FIG. 19(c) is a rear view;

FIG. 20 is an explanatory view illustrating the operation of the torque transmission limiting mechanism in the seat belt retractor shown in FIG. 17;

FIGS. 21(a)–21(c) show a reduction pin used in the seat belt retractor shown in FIG. 17, wherein FIG. 21(a) is a front view, FIG. 21(b) is a longitudinal sectional view of FIG. 21(a), and FIG. 21(c) is a rear view;

FIGS. 22(a) and 22(b) show a planetary gear used in the seat belt retractor of a fourth embodiment of the present invention, wherein FIG. 22(a) is a front view, and FIG. 22(b) is a cross sectional view taken along line 22(b)—22(b) of FIG. 22(a);

FIGS. 23(a) and 23(b) show a carrier used in the seat belt retractor of the fourth embodiment, wherein FIG. 23(a) is a front view, and FIG. 23(b) is a longitudinal sectional view thereof;

FIGS. 28(a) and 28(b) show a connect gear used in the seat belt retractor of the sixth example shown in FIG. 27, wherein FIG. 28(a) is a front view, and FIG. 28(b) is a longitudinal sectional view;

FIGS. 29(a) and 29(b) show an intermediate speed reducing gear used in the seat belt retractor of the sixth example shown in FIG. 27, wherein FIG. 28(a) is a front view, and FIG. 28(b) is a longitudinal cross sectional view thereof;

DETAILED DESCRIPTION OF PREFERRED EMBODIMENTS

Figure 1:
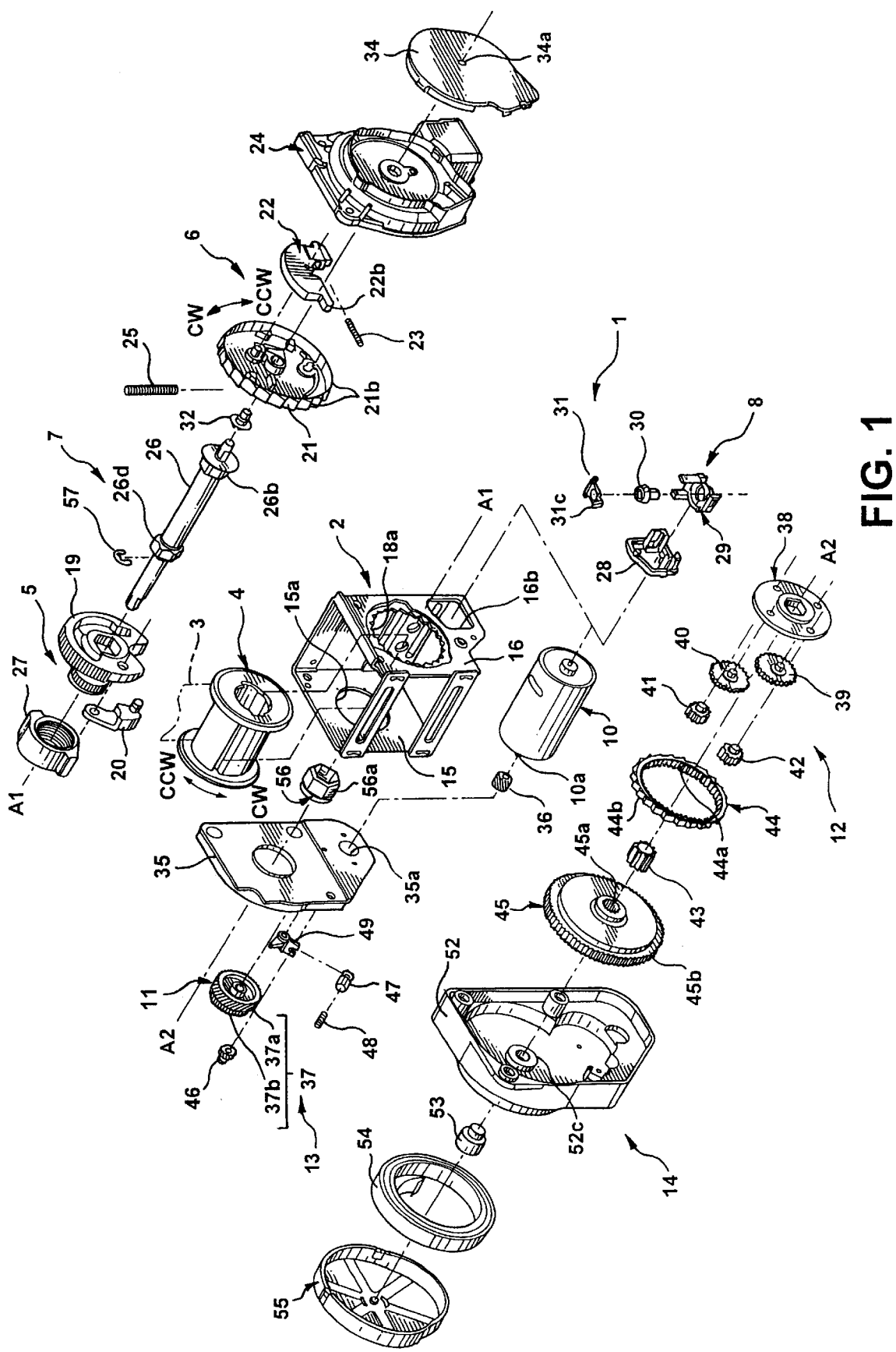
FIG. 1 is an exploded perspective of a first embodiment of a seat belt retractor according to an embodiment of the invention.

Referring now to the drawings, the embodiments of the invention will be described.

Figure 2:
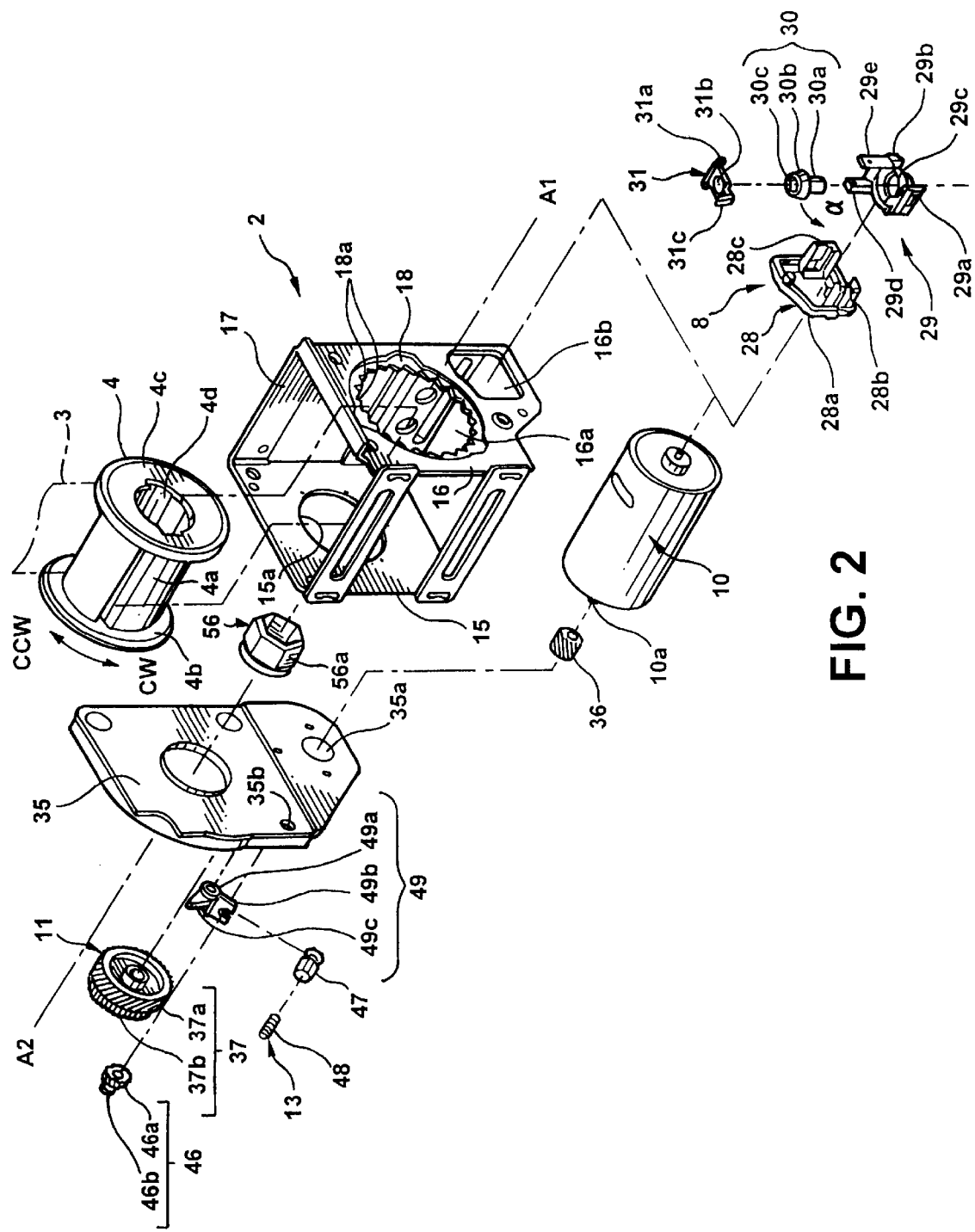
FIG. 2 is a partly enlarged exploded perspective view showing a part of the seat belt retractor shown in FIG. 1.
Figure 3:
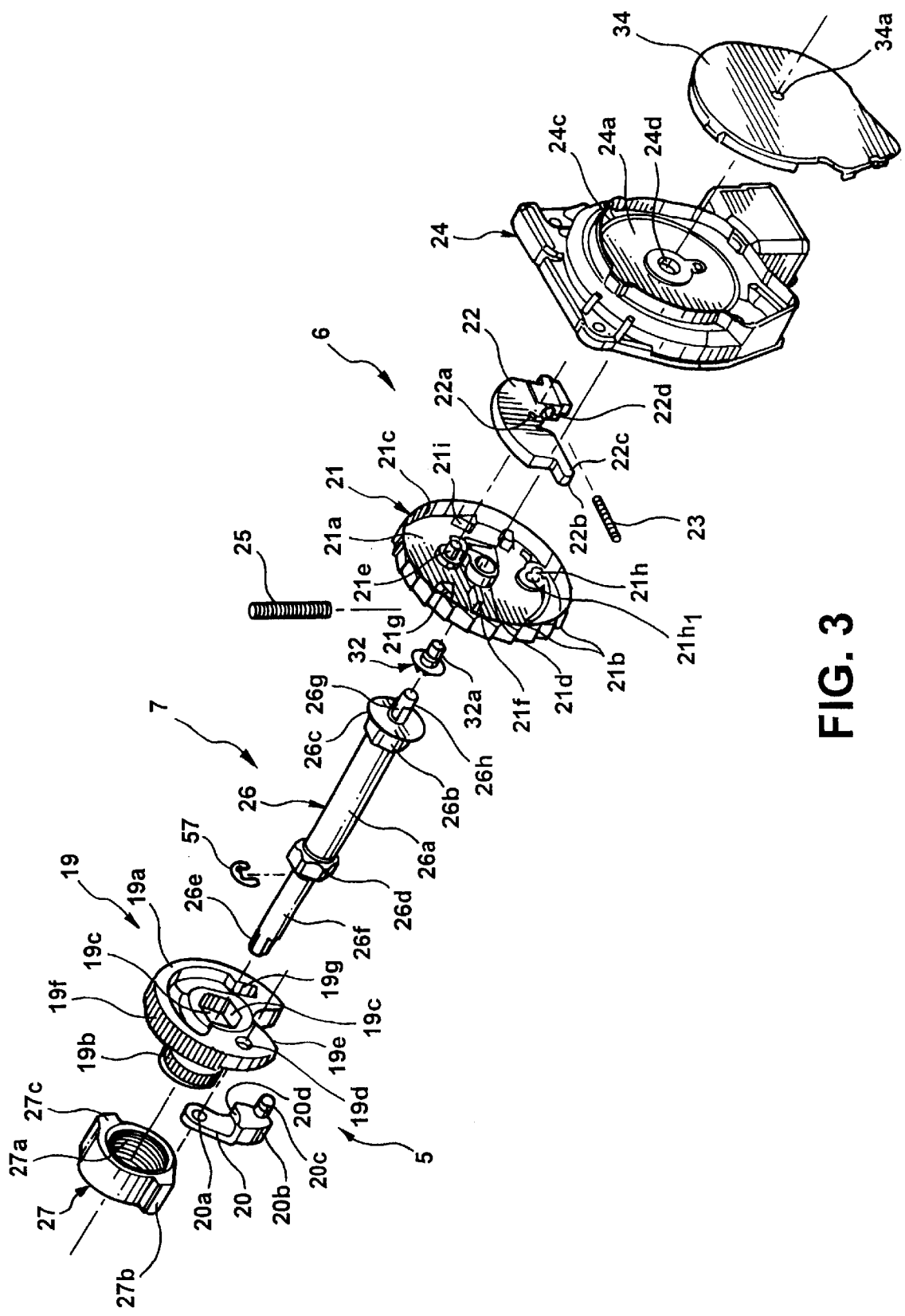
FIG. 3 is a partly enlarged exploded perspective view showing another part of the seat belt retractor shown in FIG. 1.
Figure 4:
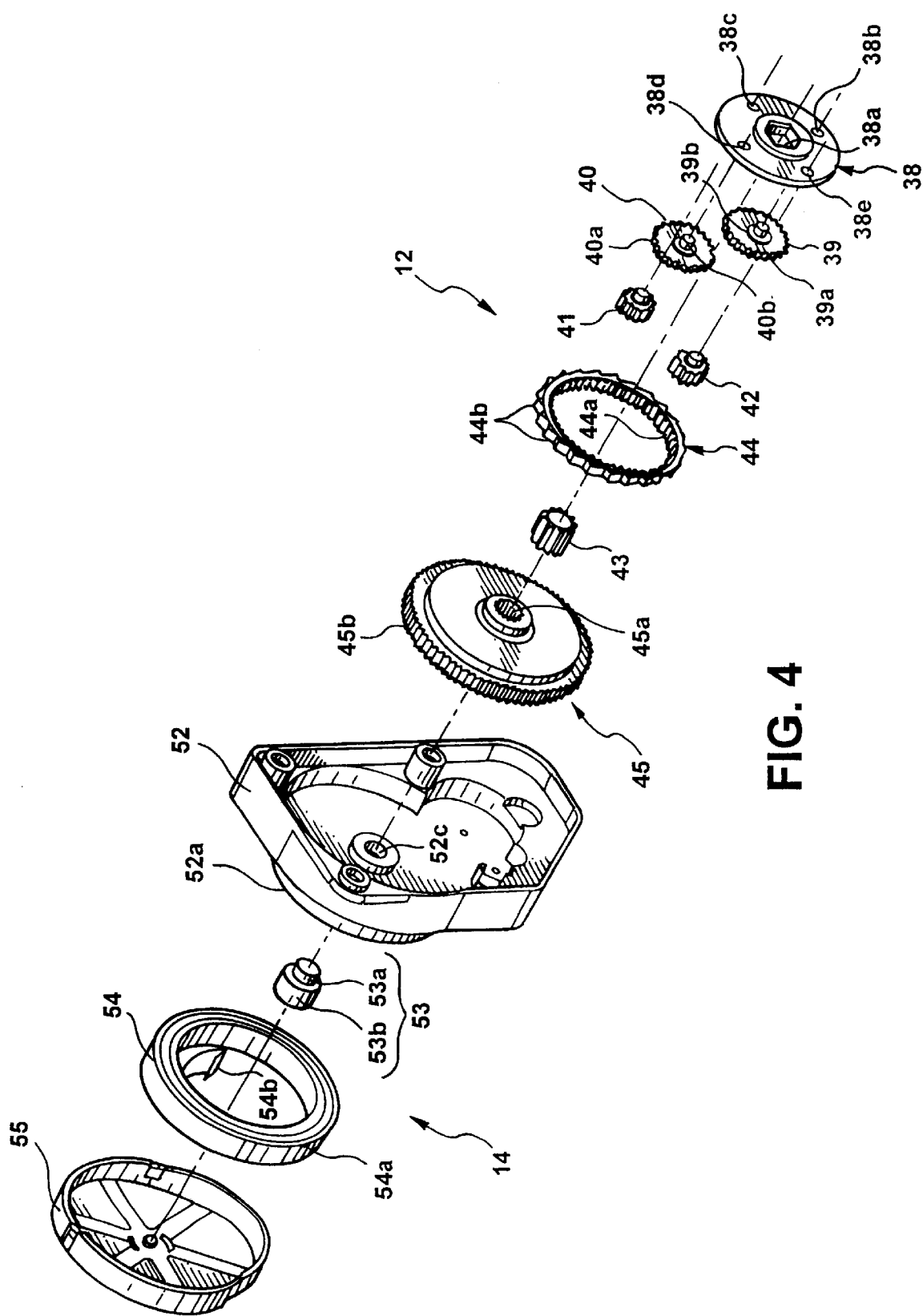
FIG. 4 is a partly enlarged exploded perspective view showing still another part of the seat belt retractor shown in FIG. 1.
Figure 5:
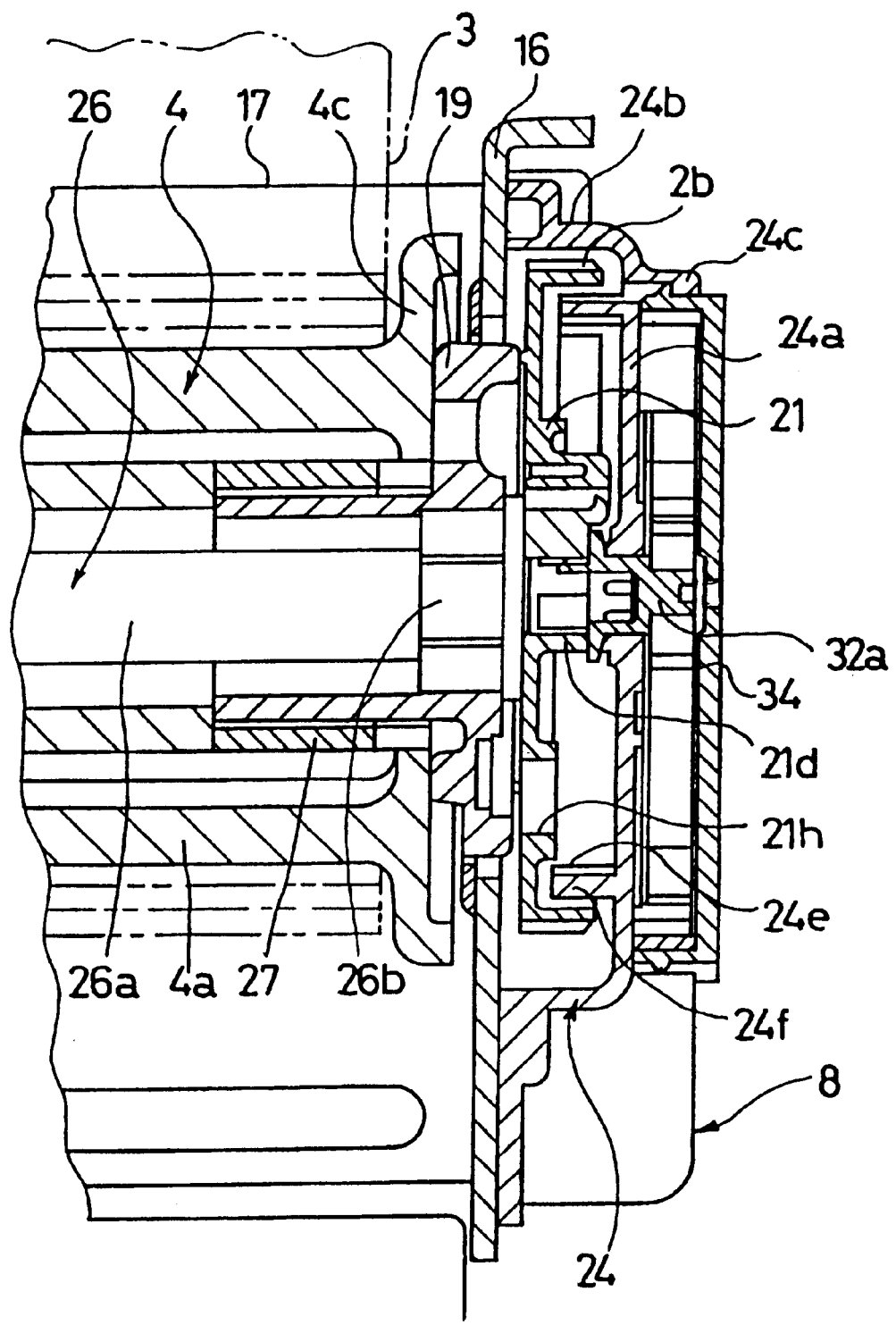
FIG. 5 is a longitudinal sectional view of the seat belt retractor of the embodiment shown in FIG. 1, showing the assembled state as seen from a side of locking means.
Figure 6:
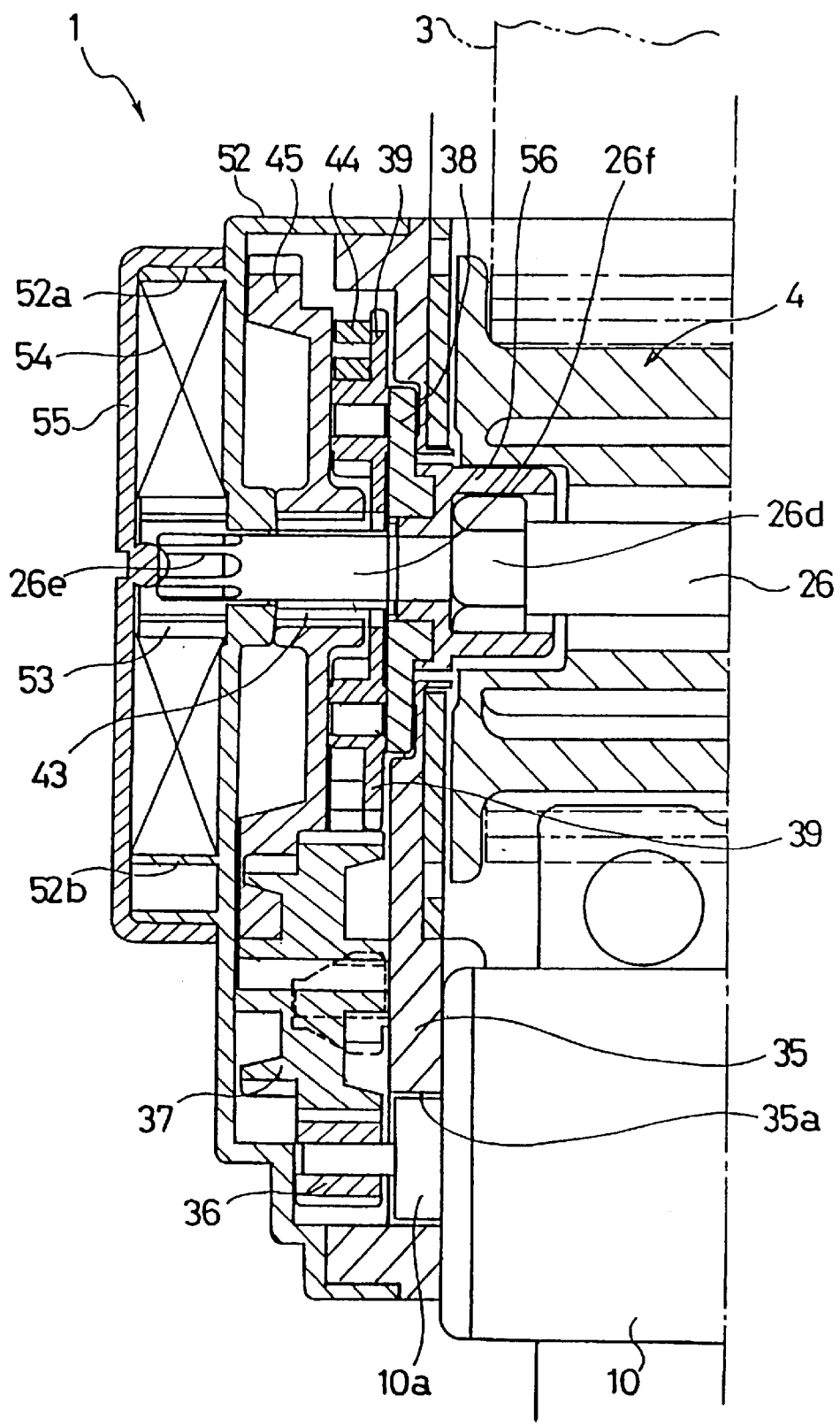
FIG. 6 is a longitudinal sectional view of the seat belt retractor of the embodiment shown in FIG. 1, showing the assembled state as seen from a side of spring means.

FIG. 1 is an exploded perspective view of the seat belt retractor according to a first embodiment of the invention; FIGS. 2 to 4 are partly enlarged exploded perspective views showing the seat belt retractor of FIG. 1; FIG. 5 is a longitudinal sectional view of the seat belt retractor showing the assembled state as seen from a side of locking means; and FIG. 6 is a longitudinal sectional view of the seat belt retractor in the assembled state showing the side of the spring means.

As shown in FIG. 1, the seat belt retractor 1 of this embodiment comprises, in broadly dividing, a frame 2, a reel 4 for winding the seat belt 3, locking means 5 provided on one side of the frame 2 for preventing rotation of the reel 4 in the belt unwinding direction CW in use, a lock actuating mechanism 6 for actuating the locking means 4 when necessary, a force limiter mechanism (hereinafter referred to as EA mechanism) 7 for limiting the load applied to the seat belt when the unwinding of the seat belt is prevented by the action of the locking means 5 in the event of abrupt speed reduction, such as collision, speed reduction detecting means 8 for detecting the speed reduction of the vehicle, a motor 10 for generating a rotational torque, a power transmission gear mechanism 11 for transmitting a rotational torque of the motor 10, a speed reducing mechanism 12 for reducing the speed of a rotational torque of the motor 10 transmitted from the power transmission gear mechanism 11 and transmitting it to the reel 4, a power transmission path switching mechanism 13 for selectively switching to one of the state in which a rotational torque of the motor 10 is transmitted to the reel 4 and the state in which the rotation of the motor 10 is not transmitted to the reel 4, and spring means 14 for urging the reel 4 in the winding direction CCW of the seat belt 3.

Although the components of the seat belt retractor 1 are shown in three rows in the exploded perspective view in FIG. 1, actually, the end A1 of the straight line passing through the centers of the upper locking means 5 and the lock actuating mechanism 6 respectively on the side of the locking means is connected or continues to the end A1 of the straight line A1-A2 passing through the frame 2, and the end A2 of the straight line passing through the centers of the lower speed reducing mechanism 12 and the spring means 14 respectively on the side of the speed reducing mechanism 12 is connected or continues to the end A2 of the straight line A1-A2 passing through the frame 2.

As shown in FIG. 2, the frame 2 comprises a pair of parallel side walls 15 and 16 and a back plate 17 connecting the side walls 15 and 16. Between both sidewalls 15 and 16, there is disposed the reel 4 for winding the seat belt 3.

One of the side walls 15 is formed with a large circular opening 15a. The other of the side walls 16 is also formed with a large circular opening 16a concentrically with the large opening 15a, and is fixed with an internal teeth member 18 having a circular opening with a prescribed number of internal teeth 18a in the shape of ratchet teeth on the surface of the internal periphery thereof. The internal teeth 18a are registered concentrically with respect to the large opening 16a. In addition, the side wall 16 is further provided with a mounting hole for mounting the speed reduction detecting means 8.

The reel 4 comprises a seat belt winding portion 4a for winding the seat belt 3, flange portions 4b and 4c located on both ends of the seat belt winding portion 4a, and a through hole 4d that extends in the axial direction formed in the center thereof. In this case, the through hole 4d is formed in such a manner that the end on the side of the side wall 15 is formed into the hexagonal shape in a cross section, and the end on the side of the sidewall 16 has a cross section that allows a stop 27 described later to be fitted and allows the reel 4 and the stop 27 to rotate together.

As shown in FIG. 3, the locking means 5 comprises a locking base 19 and a pawl 20. The locking base 19 comprises a disk portion 19a and a threaded shaft portion 19b, and is provided with a through hole 19c axially piecing the center thereof. The portion of the through hole 19c at the disk portion 19a has a shape of a regular hexagonal cross section 19c'. The disk portion 19a is provided with a hole 19d for rotatably supporting the pawl 20, and an arc-shaped load-transmitted portion 19e that is concentric with the hole 19d. The load-transmitted portion 19e receives a load from the pawl 20. At the portion of the outer periphery of the disk portion 19a opposite to the load transmitted portion 19e, there is formed knurled teeth 19f along a prescribed range, and the knurled teeth 19f are engaged with the internal teeth 18a of the internal teeth member 18. In addition, the disk portion 19a is provided with a spring supporting portion 19g for supporting one end of the pawl spring 25 described later.

On the other hand, the pawl 20 includes a hole 20a formed at the proximal end thereof, and rotatably mounted on the locking base 19 by fitting a fixture, such as a pin (not shown), into the hole 20a and a hole 19d formed on the locking base 19. On the tip of the pawl 20, there is formed a stop claw 20b engageable with the internal teeth 18a of the internal teeth member 18, and a cam follower 20c formed of a protruding strut. In addition, the pawl 20 is formed with an arc-shaped load transmitting portion 20d, which transmits the reaction acting on the pawl 20b to the load-transmitted portion 19e of the locking base 19. In other word, the reaction of the pawl 20b is supported by the locking base 19.

The lock actuating mechanism 6 comprises a lock gear 21, a flywheel 22, a flywheel spring 23 compressively mounted between the lock gear 21 and the flywheel 22, a first retainer 24 removably fixed on the side wall 16 of the frame 2, and a pawl spring 25 compressively mounted between the locking base 19 and the lock gear 21.

The lock gear 21 comprises a disk portion 21a, and an annular teeth member 21c having a prescribed number of the external teeth 21b in the shape of ratchet teeth formed on the outer periphery thereof.

In the center of the disk portion 21a, there are formed a cylindrical boss 21d and a supporting shaft 21e protruding for rotatably supporting the flywheel 22 in the vicinity of the boss 21d. In addition, on the side of the outer periphery of the disk portion 21a, there are provided first and second stops 21f and 21g for limiting the rotation of the flywheel 22 to a prescribed range, and a cam hole 21h formed through the disk portion 21a. The cam follower 20c of the pawl 20 is fitted in the cam hole 21h, so that the cam follower 20c is guided to the cam hole 21h to rotate the pawl 20 when the lock gear 21 is rotated with respect to the locking base 19. In addition, the disk portion 21a is provided with a spring supporting portion 21i for supporting one end of the pawl spring 25.

The flywheel 22 is provided with a supporting hole 22a rotatably fitted with the supporting shaft 21e of the lock gear 21, and a stopper portion 22c formed with a stop claw 22b on the tip thereof. When the flywheel is rotatably supported at the supporting hole 22a, the stopper portion 22c is positioned between the first and the second stops 21f and 21g. Therefore, the rotation of the flywheel 22 is limited to the portion between the first and second stops 21f and 21g, so that the stop claw 22b takes the state retracted radially inside while the stopper portion 22c is in contact with the first stop 21f, and the stop claw 22b takes the state projecting radially outside while the stopper portion 22c is in contact with the second stop 21g. In addition, the flywheel 22 is provided with a spring supporting portion 22d for supporting one end of the flywheel spring 23.

The flywheel spring 23 is supported by the spring supporting portion 22d of the flywheel 22 on one end and by the spring supporting portion (not shown) of the lock gear on the other end, so that the flywheel 22 is urged in the belt unwinding direction cw with respect to the lock gear 21 at all the time. Therefore, when the flywheel 22 is not in operation, the stopper portion 22c remains in contact with the first stop 21f.

The first retainer 24 comprises a disk portion 24a, a first annular flange portion 24b formed on the outer periphery of the disk portion 24a projecting toward the side, where the frame 2 resides, to be fixed removably on the side wall 16 (shown in FIG. 5), and a second annular flange portion 24c formed on the outer periphery of the disk portion 24a projecting toward the opposite side of the frame 2.

The center of the disk portion 24a is formed with a through hole 24d. As shown in FIG. 5, the surface of the disk portion 24a facing the frame 2 is provided with an annular teeth member 24f having the internal teeth 24e in the shape of ratchet teeth on the internal periphery and projecting concentrically with the through hole 24d. The annular teeth member 24f has a size so as to be inserted between the first and the second stops 21f and 21g. In this case, the stop claw 22c of the flywheel 22 is also placed within the annular teeth member 21c, so that the stop claw 22c is engaged with the internal teeth 24e when the flywheel 22 is rotated with respect to the lock gear 21 into the position in which the stop portion 22c comes into contact with the second stop 21g. The second annular flange portion 24c is provided with a first cover 34 removably mounted thereon.

The pawl spring 25 is supported by the spring supporting portion 21i of the lock gear 21 on one end and by the spring supporting portion 19g of the locking base 19 on the other end, so as to urge the lock gear 21 with respect to the locking base 19 in the belt unwinding direction CW at all the time. Therefore, when the lock gear 21 is not in operation, the cam follower 20c of the pawl 20 is positioned at the innermost position 21h1 of the cam hole 21h, and in this state, the lock gear 21 is prevented from further rotation caused by the pawl spring 25.

The EA mechanism 7 comprises a torsion bar 26 and a cylindrical stop 27 screwed onto a threaded shaft portion 19b of the locking base 19. The torsion bar 26 comprises a torsion bar portion 26a, a first torque transmitting portion 26b provided on one end of the torsion bar portion 26a on the side of the lock gear 21 and having a regular hexagonal shape in a cross section to be fitted into the hole of regular hexagonal cross section 19c' formed on the locking base 19 so as not to rotate with respect to the locking base 19, a flange portion 26c provided on the end of the first torque transmitting portion 26b, a second torque transmitting portion 26d with a regular hexagonal cross sectional shape provided on the other end of the torsion bar portion 26a, a first shaft portion 26f concentrically projecting from the second torque transmitting portion 26d and formed with spline grooves 26e on the tip thereof, and a second shaft portion 26h concentrically projecting from the flange portion 26c and formed with spline grooves 26g thereon.

The cylindrical stopper 27 is provided, on the inner periphery thereof, with a female screw 27a to be screwed on the threaded shaft portion 19b of the locking base 19, and on the outer periphery thereof, with a pair of rotational torque transmitting portions 27b and 27c respectively for receiving rotational torque transmitted from the reel 4. By providing the rotational torque transmitting portions 27b and 27c, the stop 27 is rotatable with the reel 4 as an integral unit and axially movable with respect to the reel 4. Therefore, when the rotational differential is generated such that the stop 27 rotates with respect to the locking base 19 in the belt unwinding direction CW, in other words, when the rotational differential is generated such that the reel 4 rotates with respect to the locking base 19 in the belt unwinding direction CW, the stop 27 moves in the direction of the axis and is brought into contact with the disk portion 19a of the locking base 19. When the stop 27 comes into contact with the locking base 19, the stop 27 stops moving in the direction of axis and rotates with the locking base 19 as an integral unit.

Therefore, since the torsion bar portion 26a is twisted while the rotational differential exists between the stop 27 and the locking base 19, the EA mechanism 7 exerts its EA function that limits the belt load in the event of collision of the vehicle, and when the stop 27 comes into contact with the locking base 19, the EA function is terminated. In this way, the region where the EA function is performed is defined by the stop 27 and its female screw 27a, and the locking base 19 and its threaded shaft portion 19b.

As shown in FIG. 2, the speed reduction detecting means 8 comprises a housing 28 to be mounted on the side wall 16, a sensor case 29 to be mounted on the housing 28, an inertial mass 30 to be mounted on the sensor case 29, and an actuator 31 actuated by the inertial mass 30.

The housing 28 comprises a fitting portion 28a for fixing to the side wall 16 of the frame 2 by fitting into the mounting hole 16b formed therein, and a pair of supporting arm portions 28b and 28c for supporting the sensor case 29. The sensor case 29 comprises a pair of supported portions 29a and 29b to be supported by engagement with the grooves formed on the supporting arm portions 28b and 28c, a mass mounting portion 29c on which the inertial mass 30 is mounted, and a pair of supporting arms 29d and 29e for rotatably supporting the actuator 31.

The inertial mass 30 comprises a leg portion 30a, a mass portion 30b formed on the leg portion 30a, and an operating portion 30c for operating the actuator 31. The inertial mass 30 mounted on the mass mounting portion 29c is standing in an upright posture as shown in the figure in the normal state, and tilts in the direction α when the speed reduction more than the prescribed value is applied to the vehicle, so that the operating portion 30c rotates the actuator 31.

In addition, the actuator 31 comprises an axle portion 31a to be rotatably fitted into holes formed on a pair of supporting arm portions 29d and 29e of the sensor case 29, a pressed portion 31b to be pressed by the operating portion 30c of the inertial mass 30, and a stop claw 31c provided on the opposite side of the axle portion 31a and engageable with the external teeth 21b of the lock gear 21. When the inertial mass 30 is in the upright posture, the actuator 31 is in the lowest position that is a non-engaged position in which the stop claw 31c does not engage the external teeth 21b, and when the inertial mass 30 tilts in the direction a, it rotates upwardly so as to take the engaged position in which the stop claw 31c is engaged with the external teeth 21b.

As shown in FIG. 2, the motor 10 can be mounted on the second retainer 35 that can be mounted to the left side wall 15 of the frame 2. The second retainer 35 is provided with a thorough hole 35a through which the axle 10a of the motor 10 passes. The operation of the motor 10 is controlled by the CPU described above according to various information including information on the vehicle's travelling state, such as the speed of the vehicle or the acceleration of the vehicle, or to information on the vehicle's operating state, such as the speed of depression of the brake pedal or the speed of depression of the acceleration pedal.

The power transmission gear mechanism 11 comprises a motor gear 36 formed as a helical gear mounted to the axle 10a of the motor, and a connect gear 37 consisting of a large diameter connect gear 37a formed as a helical gear and always engaging the motor gear 36, and a small diameter connect gear 37b formed concentrically and integrally therewith and having a diameter smaller than that of the large diameter connect gear 37a.

As shown in FIG. 1 and FIG. 4, the speed reducing mechanism 12 comprises a first carrier 38 formed of an annular disk, two planetary gears 39 and 40, two idle gears 41 and 42, a sun gear 43, a ring-shaped internal gear 44, and a speed reducing gear 45.

The first carrier 38 is provided with a regular hexagonal through hole 38a in the center thereof, and four supporting holes 38b, 38c, 38d and 38e formed at a regular interval in the peripheral direction.

The planetary gears 39 and 40 comprise large planetary gears 39a and 40a both having large diameters respectively, and small planetary gears 39b, 40b both having smaller diameters than the large planetary gears 39a and 40a. The large planetary gears 30a and 40a and small planetary gear 39b and 40b are formed integrally and concentrically, and the small planetary gears 39b and 40b have the same dimensions as the idle gears 41, 42. The planetary gears 39 and 40 are respectively supported in two diametrically opposed supporting holes 38b and 38d formed on the first carrier 38 so as to rotate with respect to each other. In FIG. 1, small planetary gears 39b and 40b are not clearly shown.

The idle gears 41 and 42 are supported in two other diametrically opposed supporting holes 38c and 38e formed in the first carrier 38 so as to rotate with respect to each other.

The sun gear 43 is supported by the first shaft portion 26f of the torsion bar 26 so as to rotate with respect to each other.

The internal gear 44 has internal teeth 44a on the inner periphery, and ratchet teeth 44b on the outer periphery. In addition, the speed reducing gear 45 has internal teeth 45a on the inner periphery, and external teeth 45b on the outer periphery.

The large planetary gears 39a and 40a of the two planetary gears 39 and 40 are respectively engaged with the sun gear at all the time and the small planetary gears 39b and 40b are engaged with the internal teeth 44a of the internal gear 44 at all the time. The two idle gears 41 and 42 are engaged with the internal teeth 44a of the internal gear 44. In addition, the internal teeth 45a of the speed reducing gear 45 are engaged with the sun gear 43 at all the time, and the external teeth 45b of the speed reducing gear 45 are engaged with the small diameter connect gear 37b of the connect gear 37.

As shown in FIG. 1 and FIG. 2, the power transmission path switching mechanism 13 comprises a switch gear 46, a plunger 47, a spring 48, and a stop lever 49. As shown in FIGS. 7(a) to 7(d), the switch gear 46 is supported by the supporting shaft 50 mounted in the mounting hole 35b of the second retainer 35 so as to rotate and move in the axial direction by a prescribed distance, and composed of a gear portion 46a having a helical gear and an inclined surface 46b in the shape of a truncated cone. The plunger 47 is slidably mounted in the cylinder housing 51 mounted on the second retainer 35. In this case, the rotation of the plunger about the elongated axis is prevented by the projecting wall 47a axially extending along the plunger 47 and slidably fitted into an elongated guide groove 51 of the cylinder housing 51.

The plunger 47 is provided on the tip thereof with a contact portion 47c having an inclined surface 47b of the same inclination as the inclined surface 46b in the shape of the truncated cone. A spring 48 is compressively mounted between the plunger 47 and the cylinder housing 51, and the spring force of the spring 48 urges the plunger 47 toward the switch gear 46 at all the time and brings the contact portion 47c to contact with the switch gear at all the time. In this case, when the motor 10 is not in operation, as shown in FIG. 7(b), the switch gear 46 is placed at the right position of the figure, and simultaneously the plunger 47 projects to the outer most position so that the front surface of the inclined surface 47b of the contacting portion 47c comes in contact with the front surface of the inclined surface 46b of the switch gear 46. These inclined surface 46b and the inclined surface 47b define the cam mechanism in which the plunger 47 is moved in accordance with the axial movement of the switch gear 46.

When the motor 10 is in operation, as shown in FIG. 7(d), the switch gear 46 moves to the left and is placed to the left position of the figure, and simultaneously the plunger 47 is retracted to the inner most position so that the tip of the contact portion 47c comes into contact with the outer periphery of the gear portion 46a of the switch gear. In this state, the tip of the contacting portion 47c does not engage the teeth of the gear portion 46a of the switch gear 46. The actions of the switch gear 46 and the plunger 47 from the state shown in FIG. 7(b) to the state shown in FIG. 7(d) and vice versa will be described later.

Figure 8:
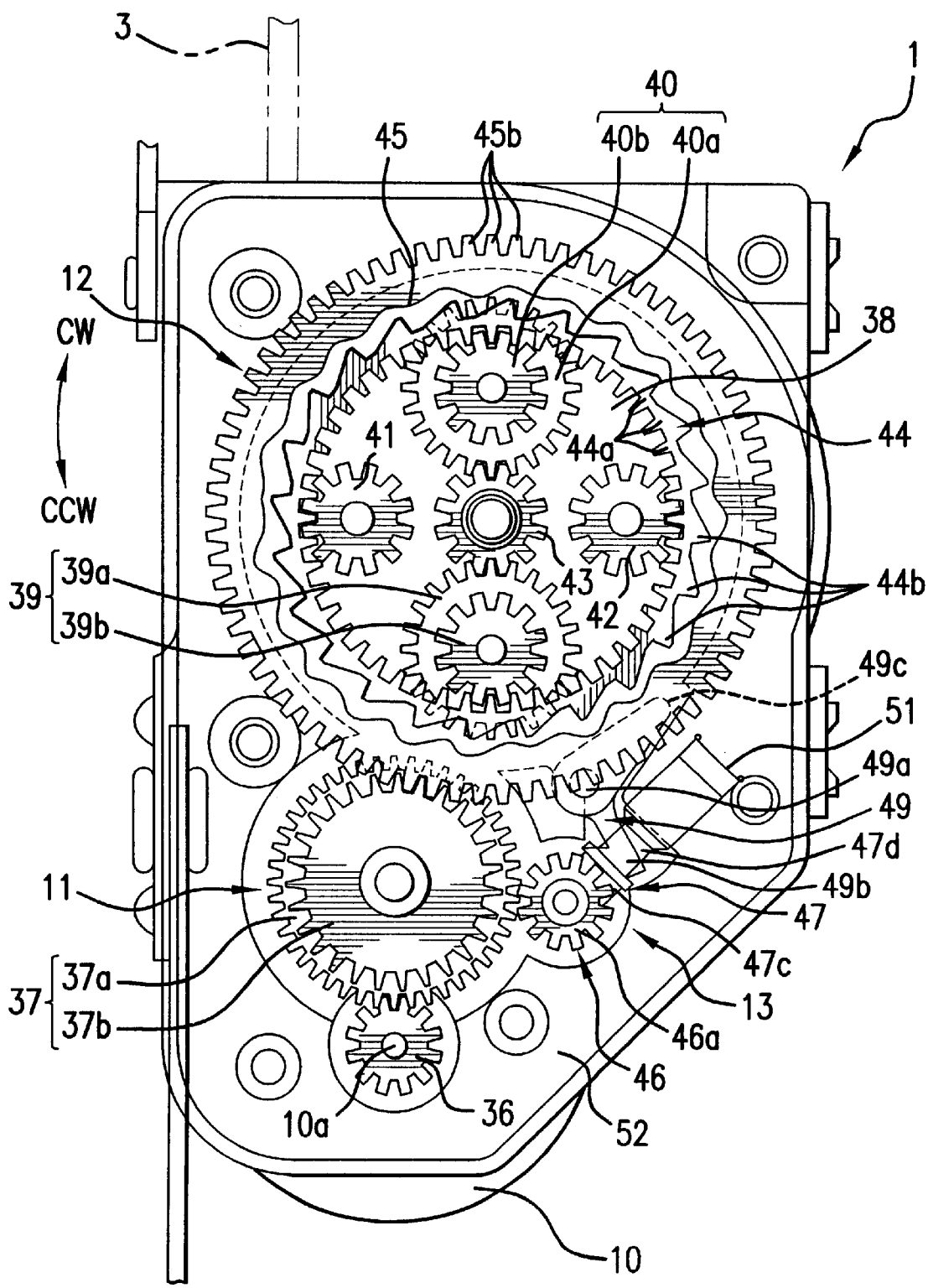
FIG. 8 is a partly broken side view showing a motor, a power transmission gear mechanism, a speed reducing mechanism, and a power transmission path switching mechanism used in the seat belt retractor shown in FIG. 1 in the non-operating mode.
Figure 9:
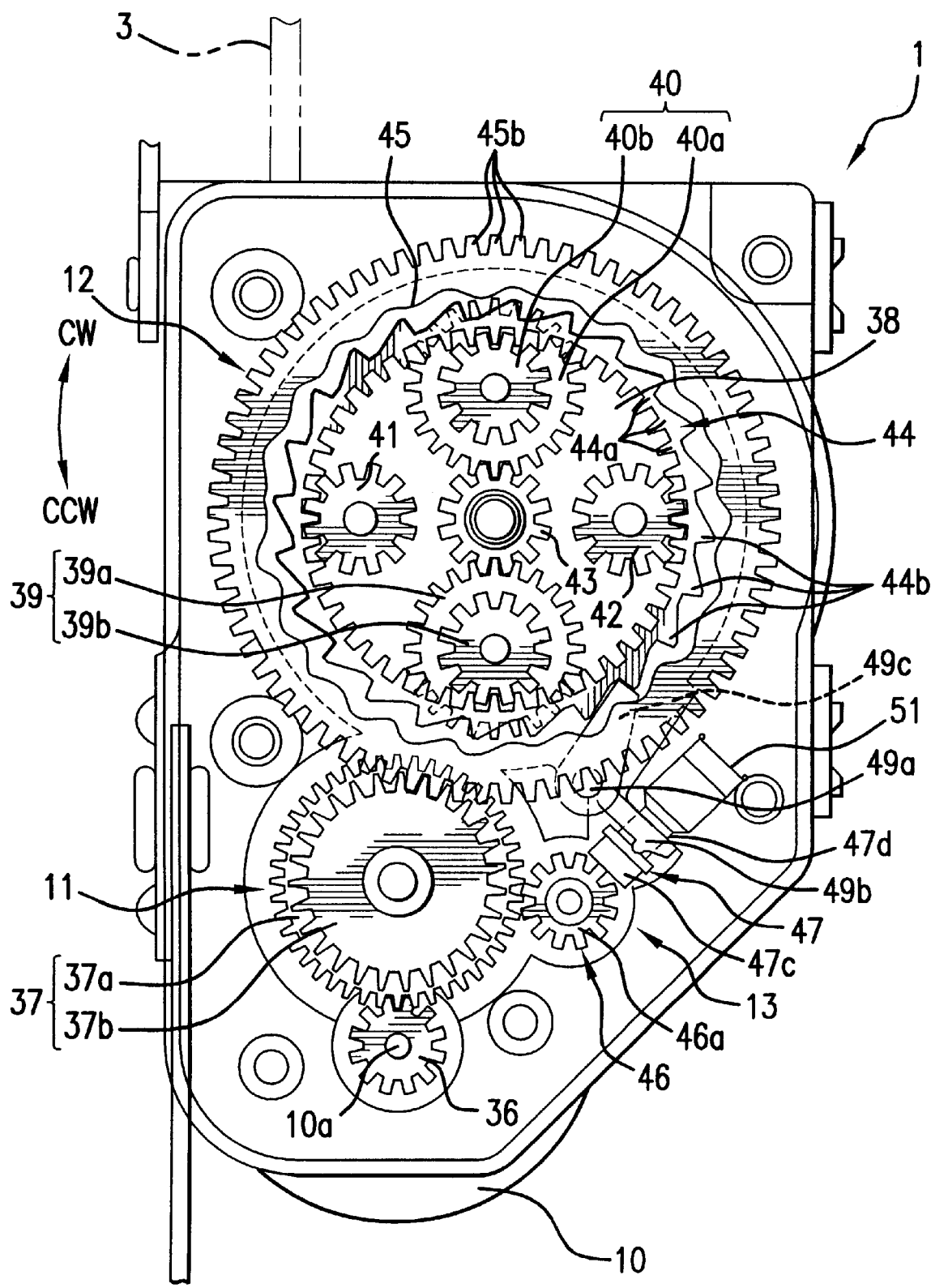
FIG. 9 is a partly broken side view showing the motor, the power transmission gear mechanism, the speed reducing mechanism, and the power transmission path switching mechanism used in the seat belt retractor shown in FIG. 1 in the operating mode.

The plunger 47 is provided with a stop lever operating portion 47d. The stop lever 49 comprises an axle 49a, a bifurcated operating lever portion 49b, and a stop claw 49c. The axle 49a is rotatably supported by the second retainer 35. The branch portion of the operating lever portion 49b is engaged with the stop lever actuating portion 47d of the plunger 47, and the plunger 47 allows the stop lever 49 to rotate about the axle 49a. In addition, the stop claw 49c is engaged with and released from the ratchet teeth 44b of the internal gear 44. When the plunger 47 is in the state shown in FIG. 7(b), the stop claw 49c is placed to the position in which the stop claw 49c is not engaged with the ratchet teeth 44b as shown in FIG. 8, and when the plunger 47 is in the state shown in FIG. 7(d), the stop claw 49c is placed to the position engaging the ratchet teeth 44b as shown in FIG. 9.

In the power transmission path switching mechanism 13 in such an arrangement, when the motor 10 is not in operation, the power transmission path between the reel 4 and the motor 10 and comprising the power transmission gear mechanism 11 and the speed reducing mechanism 12 is set to the OFF-state in which the reel 4 and the motor are rotationally free with respect to each other, and when the motor 10 is in operation, it is set to the ON-state in which the reel 4 and the motor 10 are rotationally connected.

As shown in FIG. 1 and FIG. 4, the spring means 14 comprises a second cover 52, a bush 53, a return spring 54, and a spring cover 55. The second cover 52 is mounted to the second retainer 52 so as to cover the power transmission gear mechanism 11, the speed reducing mechanism 12, and the power transmission path switching mechanism 13. An annular projection 52a is provided on the second cover 52 on the opposite side of the speed reducing mechanism 12, and a return spring 54 is received within the annular projection 52a. In addition, a spring mounting portion 52b is provided within the annular projection 52a, and the second cover 52 is formed with a supporting hole 52c for rotatably supporting the first shaft portion 26f of the torsion bar 26 via a bush 53.

The bush 53 comprises a bearing portion 53a and a spring mounting portion 53b. The bush 53 is fitted by means of splines into the spline groove 26e formed on the tip of the torsion bar 26 so as to rotate with the torsion bar 26 integrally. In this case, the bearing portion 53a of the bush 53 is rotatably supported within the supporting hole 52c formed in the second cover 52, and supports the first shaft portion 26f of the torsion bar 26.

A return spring 54 is formed as a flat spiral spring, and the outer periphery thereof is connected to the spring mounting portion 52b of the second cover 52 and the inner periphery 54b thereof is connected to the spring mounting portion 53b of the bush 53. The spring force of the return spring 54 urges the reel 4 in the belt winding direction CCW via the bush 53 and the torsion bar 26 at all the time.

As shown in FIG. 2 and FIG. 6, the second carrier 56 comprises a cylindrical first shaft portion 56a of a regular hexagonal cross section, and a cylindrical second shaft portion 56b (shown only in FIG. 6) having a regular hexagonal shape in a cross section at an outer periphery and a circular shape in a cross section at an inner periphery.

The end of the through hole 4d of the reel 4 on the side of the side wall 15 is fitted on the outer periphery of the first shaft portion 56a so as not to rotate with respect to each other, and the second torque transmitting portion 26d of the torsion bar 26 is fitted into the inner periphery of the first shaft portion 56a so as not to rotate with respect to each other, so that the reel 4, the second carrier 56, and the second torque transmitting portion 26d of the torsion bar 26 rotate integrally as an integral unit. On the other hand, the through hole 38a of the first carrier 38 receives the outer periphery of the second shaft portion 56n so as not to rotate with respect to each other, and the first shaft portion 26f of the torsion bar 26 is fitted in the inner periphery of the second shaft portion 56b, so that the first and second carriers 38, 56 rotate as an integral unit.

The second carrier 56 is axially fixed with respect to the second torque transmitting portion 26d by means of an E-ring 57 mounted on the first shaft portion 26f of the torsion bar 26.

The belt tension control mechanism for controlling the tension of the seat belt 3 is composed of the motor 10, the power transmission gear mechanism 11, the speed reducing mechanism 12, the power transmission path switching mechanism 13, and the CPU.

The operation of the belt tension control mechanism in such an arrangement will now be described.

(1) Non-operating mode of the seat belt retractor (state in which the seat belt is stored)

When the seat belt retractor 1 is in the non-operating mode, the seat belt 3 is wound on the reel 3 by the spring means 14. The motor 10 is also in the non-operating mode.

In this non-operating mode, as shown in FIG. 8, the motor gear 36, the connect gear 37, and the switch gear 46 do not rotate and, therefore, the switch gear 46 is placed at the position shown in FIGS. 7(a) and 7(b). Also, the plunger 47 projects to the outermost position so that the front surface of the inclined surface 47b of the contacting portion 47c contacts the front surface of the inclined surface 46b of the switch gear 46. In this state, the stop lever 49 is placed to the position in which the stop claw 49c does not engage the ratchet teeth 44b of the internal gear 44, and the power transmission path is set to the OFF-state. Therefore, the internal gear 44 is free to rotate in any of the belt unwinding direction CW and the belt winding direction CCW, and thus the belt tension control mechanism is in the non-operating mode.

(2) Seat belt unwinding operation

When the seat belt is unwound for withdrawal from the non-operating mode of the seat belt retractor 1 as stated above, the reel rotates in the belt unwinding direction CW. Then, both the second torque transmitting portion 26d of the torsion bar 26 and the second carrier 56 shown in FIG. 6 rotate in the belt unwinding direction CW. Since the first carrier 38 rotates in the same direction CW, the planetary gears 39 and 40 tend to rotate respectively around the sun gear 43 in the same direction CW. Therefore, the large planetary gears 39a and 40a of the planetary gears 39 and 40 tend to rotate respectively in the belt unwinding direction CW so as to rotate the sun gear 43 in the belt winding direction CCW, and on the other hand, the small planetary gears 30b and 40b tend to rotate in the belt-winding direction CCW so as to rotate the internal gear 44 in the belt unwinding direction CW. In this state, since the sun gear 43 is engaged with the speed reducing gear 45 at all the time, the speed reducing gear 45 is engaged with the small connect gear 37b of the connect gear 37 at all the time, and the large diameter connect gear 37a integrated with the small diameter connect gear 37b is engaged with the motor gear 36 and the switch gear 46 at all the time. Also, a prescribed rotational resistance is applied to the sun gear 43, while the internal gear 44 rotates freely as stated above. In other words, the internal gear 44 rotates freely and the sun gear 43 does not rotate. In this state, the small planetary gears 39b and 40b rotate with the respective large planetary gears 39a and 40a in the belt unwinding direction CW.

Since the sun gear 43 does not rotate, the rotation of the reel 4 in the belt unwinding direction CW during the unwinding operation of the seat belt 3 is not transmitted to the switch gear 46, and thus the power transmission path switching mechanism 13 is not actuated. Also, the power transmission path between the reel 4 and the motor 10 remains in the OFF state, the rotation of the reel 4 is not transmitted to the motor 10, and thus the motor is not affected by the rotation of the reel 4. At this time, since the motor 10 is not driven, the belt tension control mechanism remains in the non-operating mode.

When the belt is unwound or withdrawn, the rotation of the second torque transmitting portion 26d winds up the return spring 54 of the spring means, thereby increasing the spring force with the unwound amount of the belt.

(3) Winding operation of the seat belt by motor driving torque

Referring now to FIG. 8, when the motor 10 is driven to rotate the reel 4 in the belt winding direction CCW, the motor gear 36 rotates in the belt winding direction CCW, and the connect gear 37 rotates in the belt unwinding direction CW with its speed reduced. Then, the speed reducing gear 45 rotates with the speed further reduced in the belt winding direction CCW, thereby rotating the sun gear 43 in the same direction CCW at the same speed as the speed reducing gear 45. The rotation of the sun gear 43 rotates the planetary gears 39 and 40 about the axes with the speed further reduced in the belt unwinding direction CW, thereby rotating the internal gear 44 in the same direction CW. At this time, since the internal gear 44 rotates, the planetary gears 39 and 40 do not rotate around the sun gear 43.

On the other hand, when the connect gear 37 rotates, the switch gear 46 rotates in the belt winding direction CCW at the same time. In this case, since the large diameter connect gear 37a of the connect gear 37 and the switch gear 46 are engaged by the helical engagement, the switch gear is subjected to a thrust force in the direction of axis. Then, the switch gear 46 is moved axially by this thrust force and placed to the left position shown in FIG. 7(d). Concurrently, the inclined surface 47b of the contacting portion 47c of the plunger 47 slides along the inclined surface 46b of the switch gear 46 with the axial movement of the switch gear 46, and the plunger 47 moves away from the switch gear 46 and retracted into the cylinder housing 51.

Since the switch gear 46 is supported by the second retainer 35 in the thrusting direction, the switch gear 46 stops its axial movement and is placed in the left position as shown in FIG. 7(d). In this state, as stated above, the plunger 47 is retracted into the cylinder housing to the inner most position so that the tip of the contacting portion 47c contacts the outer periphery of the gear portion 46a of the switch gear 46. By this retracting action of the plunger 47, as shown in FIG. 9, the stop lever actuating portion 47d presses the operating lever portion 49b of the stop lever 49, thereby rotating the stop lever 49 about the axle 49a as is described above, so that the stop claw 49c is placed at the position in which it can engage the ratchet teeth 44b.

Then, by the rotation of the internal gear 44 in the belt unwinding direction CW, the ratchet teeth 44b and the stop claw 49c are engaged with respect to each other and the rotation of the internal gear 44 stops. In this way, when the motor 10 is actuated, the stop lever 49 is actuated quickly and the rotation of the internal gear 44 in the belt unwinding direction CW is prevented, and the power transmission path between the reel 4 and the motor 10 is set to the ON-state. In other words, the belt tension mechanism is set to the operating mode.

Accordingly, as stated above, since the planetary gears 39 and 40 rotate on their axes by the driving torque of the motor 10, when the internal gear 44 stops rotation, the planetary gears 39 and 40 rotate around the sun gear 43 along the internal teeth 44a of the internal gear 44 in the belt winding direction CCW with the speed reduced. Therefore, the first and second carriers 38 and 58 rotate in the belt winding direction CCW at the speed of the planetary gears 39 and 40 rotating around the sun gear 43, and the reel 4 rotates in the belt-winding direction CCW. In this manner, the reel 4 is rotated by the rotation of the motor 10 that is transmitted after being reduced in speed at a prescribed speed reduction ratio by the speed reducing mechanism 12.

The rotation of the reel 4 in the belt winding direction CCW forces the seat belt 3 to be wound onto the reel 4 by a rotational torque of the motor 10, and thus the belt tension is controlled. The rotation amount of the reel 4 is detected by the rotary encoder 33 and supplied to the CPU. The CPU controls the motor 10 according to various information including information on the vehicle's travelling state, such as the speed of the vehicle or the acceleration of the vehicle, or to the vehicle's operating state, such as the speed of depression of the brake pedal or the speed of depression of the accelerating pedal to control the winding amount of the seat belt 3, so that the belt tension is controlled to a preferred value.

In this case, since the spring 54 is unwound by the rotation of the second carrier 56 in the belt winding direction CCW, the spring force of the return spring 54 is weakened.

(4) Action to release the seat belt forced-winding operation In the seat belt forced-winding operation as is described in (3) above, when the motor is driven in the direction opposite to that described in (3), that is, in the belt unwinding direction CW, the reel 4 rotates in the belt unwinding direction CW via the gears 36, 37, 45, 43, 39, and 40, and the first and the second carriers 38 and 56, thereby loosening the forced-wound seat belt 3. Though the switch gear 46 is rotated in reverse by the rotation of the connect gear 37, the switch gear 46 is subjected to a thrust force in the direction reverse to the rotation described in (3) by the large connect gear 37a since the large connect gear 37a and the switch gear 46 are engaged by helical engagement. Then, the switch gear 46 moves from the state shown in FIG. 7(d) to the right. When the upper end of the inclined surface 46b of the switch gear 46 passed the lower end position of the inclined surface 47b of the plunger 47 by the movement of the switch gear 46, the inclined surface 47b of the plunger 47 comes into contact with the inclined surface 46b by a spring force of the spring 48, and the plunger projects while the inclined surface 47b keeps contacting with the inclined surface 46b. By this projecting action of the plunger 47, the stop lever actuating portion 47d of the plunger 47 rotates the stop lever 49 to the non-operation position.

At a final stage, the switch gear 46 and the plunger 47 take the non-operating mode as shown in FIG. 7(b). In this non-operating mode, the stop lever 49 is placed in the non-operating position, and comes to the non-engaging position in which the stop claw 49c is not engaged with the ratchet teeth 44b of the internal gear 44. Consequently, the internal gear 44 is free to rotate and the reel 4 and the motor 10 are rotationally free with respect to each other.

In the seat belt retractor 1 of the first example, the tension of the seat belt 3 is controlled by the rotational torque of the motor 10 in the belt tension mechanism controlled by the CPU according to the state of the passenger in the vehicle, the operating mode outside the vehicle, or the operating condition of the seat belt 3.

While the locking means 5, lock-actuating mechanism 6, EA mechanism 7, and speed reduction detecting means 8 of this example operate exactly in the same manner as those in conventional means, a brief explanation will be given.

In a case where a prescribed speed reduction acts on the vehicle with the seat belt worn by the passenger, the inertial mass 30 of the speed reduction detecting means 8 tilts forward to rotate the actuator 31 to the position in which the stop claw 31c engages the external teeth 21b of the lock gear 21. By the speed reduction of the vehicle, the seat belt 3 tends to be drawn out by the forward inertia of the passenger. Then, the reel 4, the torsion bar 26, the locking base 19 and the lock gear 21 tend to rotate together in the belt unwinding direction cw. However, since the rotation of the lock gear 21 of the lock actuating mechanism 6 in the belt unwinding direction CW is prevented by the engagement between the stop claw 31c and the external teeth 21b, only the reel 4, the torsion bar 26, and the locking base 19 rotate in the same direction CW. Therefore, there is generated a rotational differential (relative rotation) between the locking base 19 and the lock gear 21, the pawl 20 of the locking means 5 rotates, and thus, the stop claw 20b of the pawl 20 is engaged with the internal teeth 18a of the internal teeth member 18 on the frame 2. Consequently, the rotation of the reel 4 in the belt unwinding direction CW stops to prevent the seat belt 3 from being unwound, and thus, the inertial movement of the passenger may be prevented.

The inertia of the passenger increases with the increase of the speed reduction of the vehicle. In such a case, the torsion bar is twisted between the first and the second torque transmitting portions 26b and 26d to generate a rotational differential (relative rotation) between the reel 4 and the locking base 19, thereby rotating only the reel 4 by a prescribed amount in the belt unwinding direction CW. The twist of the torsion bar 26 actuates the EA mechanism 7 to alleviate the impact applied to the passenger by the seat belt 3. At this time, since a rotational torque of the reel 4 generated by the rotation of the reel 4 acts upon the second torque transmitting portion 27d to rotate the stop 27 with respect to the locking base 19, the stop 27 moves axially toward the disk portion 19a of the locking base 19, but not to the position in which the side surface of the stop 27 comes into contact with the disk portion 19a. When the speed of the vehicle significantly increases, the inertia of the passenger significantly increases as well. In such a case, since the rotational differential between the reel 4 and the locking base 19 is significantly large, the stop moves significantly in the direction of the axis due to the increased amount of rotation thereof, and thus the side surface of the stop 27 comes into contact with the disc portion 19a. Then, the relative rotation of the stop 27 with respect to the locking base 19 is prevented, and the stop 27 and the locking base 19 rotate as an integral unit, and therefore, the reel 4 and the locking base 19 rotate as an integral unit, and the EA effect (impact alleviating effect) of the EA mechanism 7 terminates.

Irrespective of whether the seat belt is worn or not, when the seat belt is unwound in the normal speed, the reel 4, the torsion bar 26, the locking base 19, and the lock gear 21 rotate together in the belt unwinding direction CW as stated above. In such a case, the flywheel 22 rotates together with the lock gear 21, and the lock gear 21 does not rotate with respect to the flywheel 22. In the case where the seat belt 3 is abruptly unwound at the speed higher than the normal speed, the reel 4, the torsion bar 26, the locking base 19 and the lock gear 21 rotate together, but more abruptly than the normal case. Then, the flywheel 22 experiences a delay in the rotation, and rotates with respect to the lock gear 21. Therefore, the stop claw 22c of the flywheel 22 comes to the position to engage the internal teeth 24e of the retainer 24, and the further rotation of the lock gear 21 allows the stop claw 22c to engage the internal teeth 24e of the retainer 24, and the further rotation of the lock gear 21 in the belt unwinding direction CW is prevented. When the rotation of the lock gear 21 in the belt unwinding direction CW is prevented, the rotation of the reel 4 in the belt unwinding direction CW is also prevented as in the case of the abrupt speed reduction described above. In this way, the abrupt unwinding of the seat belt 3 is prevented.

As is described thus far, in the seat belt retractor 1 of the first embodiment, the control of the tension of the seat belt 3 may be carried out reliably and easily by a rotational torque by controlling the rotation of the reel 4 of the motor via the power transmission gear mechanism 11 and the speed reducing mechanism 12.

In addition, since the ON and OFF-states of the power transmission path between the reel 4 and the motor 10 is controlled by the power transmission path switching mechanism 13 that is operated by the rotational torque of the motor 10, it is not necessary to use a specifically designed actuator using other motive power, such as electromagnetic solenoid or the like, for actuating the power transmission path switching mechanism 13. Therefore, the number of the components of the power transmission path switching mechanism may be reduced, thereby simplifying the structure thereof and further reducing the cost.

Figure 10:
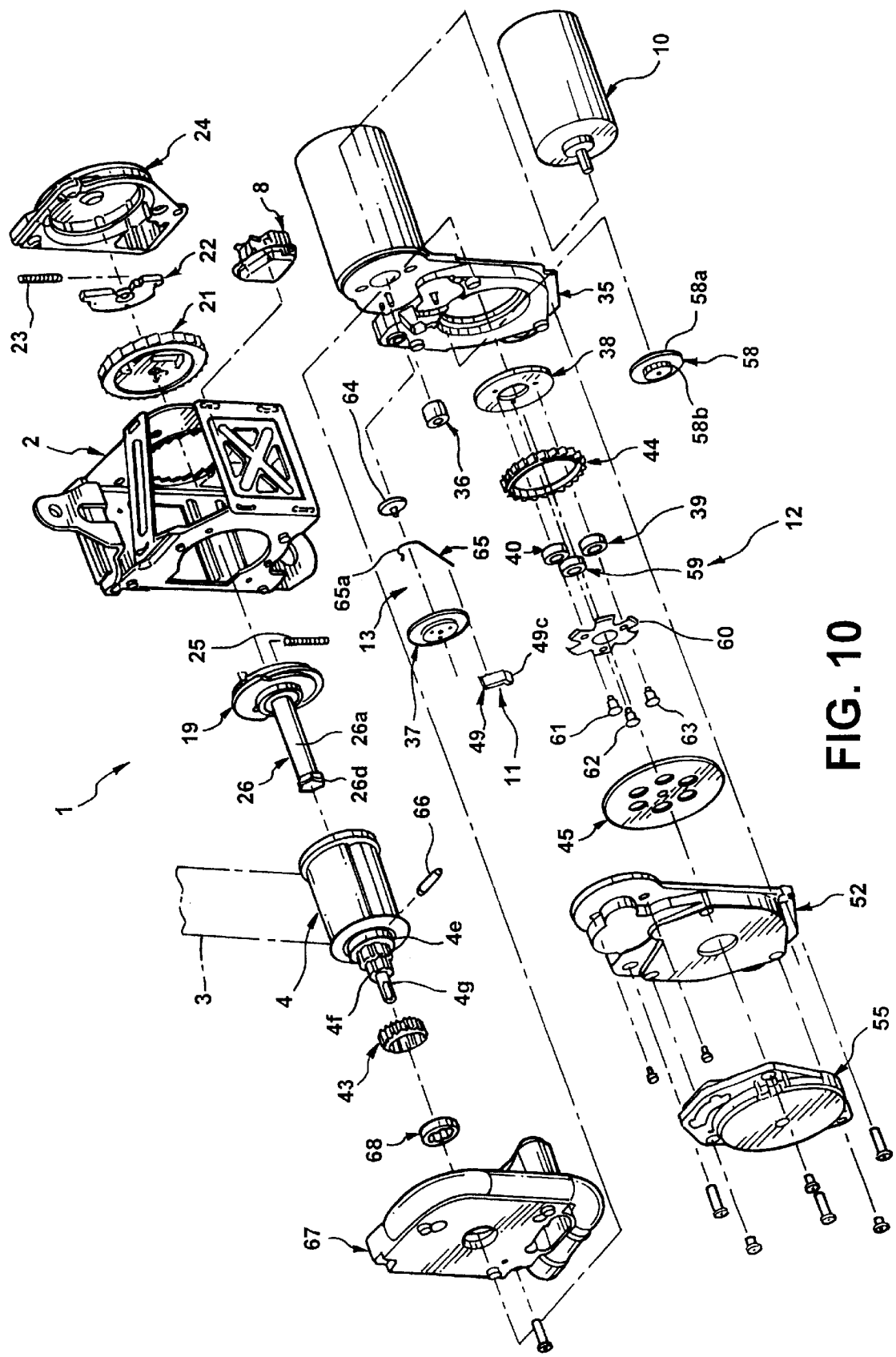
FIG. 10 is an exploded perspective view showing the seat belt retractor in a second embodiment according to the invention.
Figure 11:
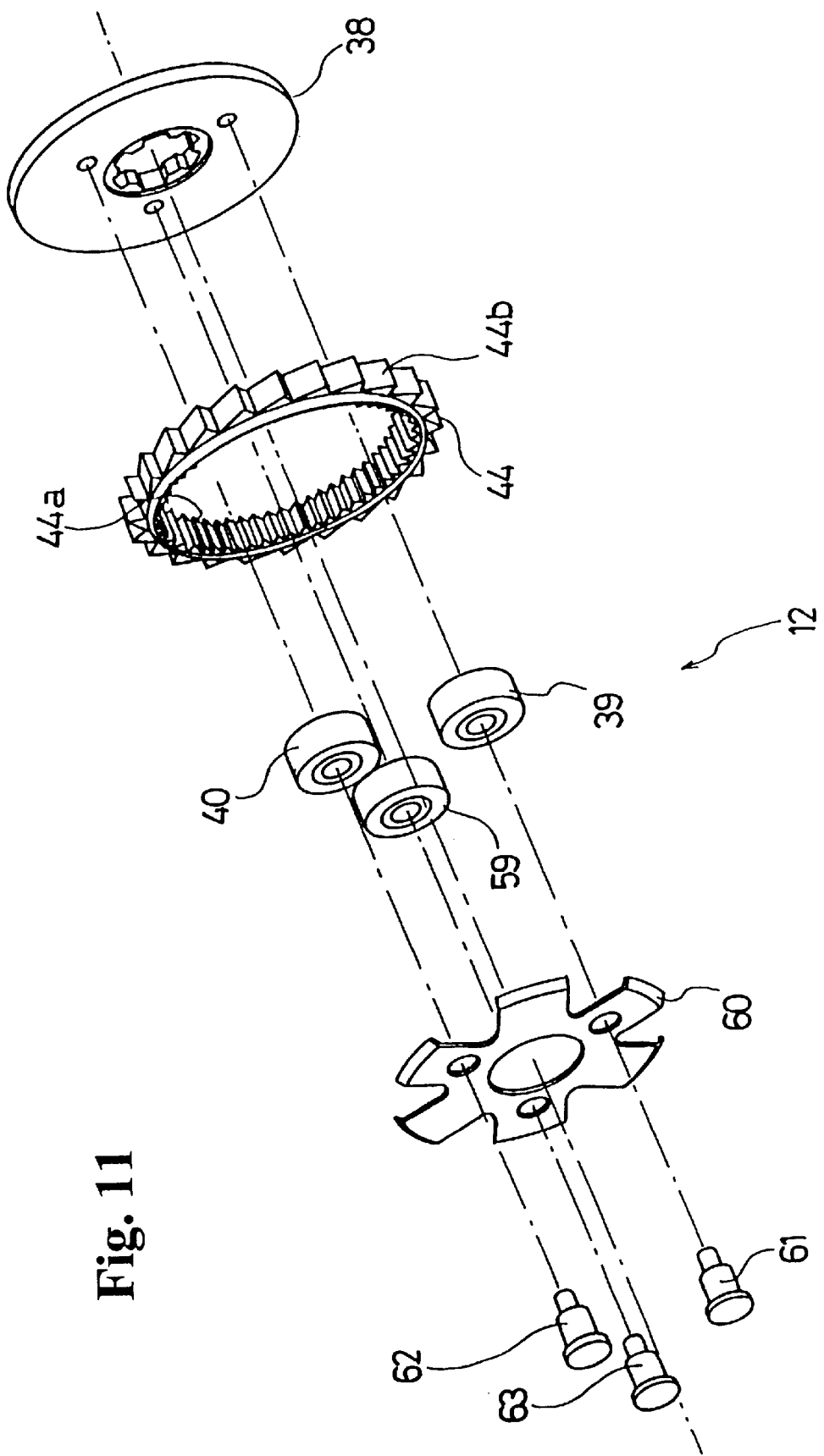
FIG. 11 is a partly enlarged exploded perspective view showing a part of the embodiment shown in FIG. 10.
Figure 12:
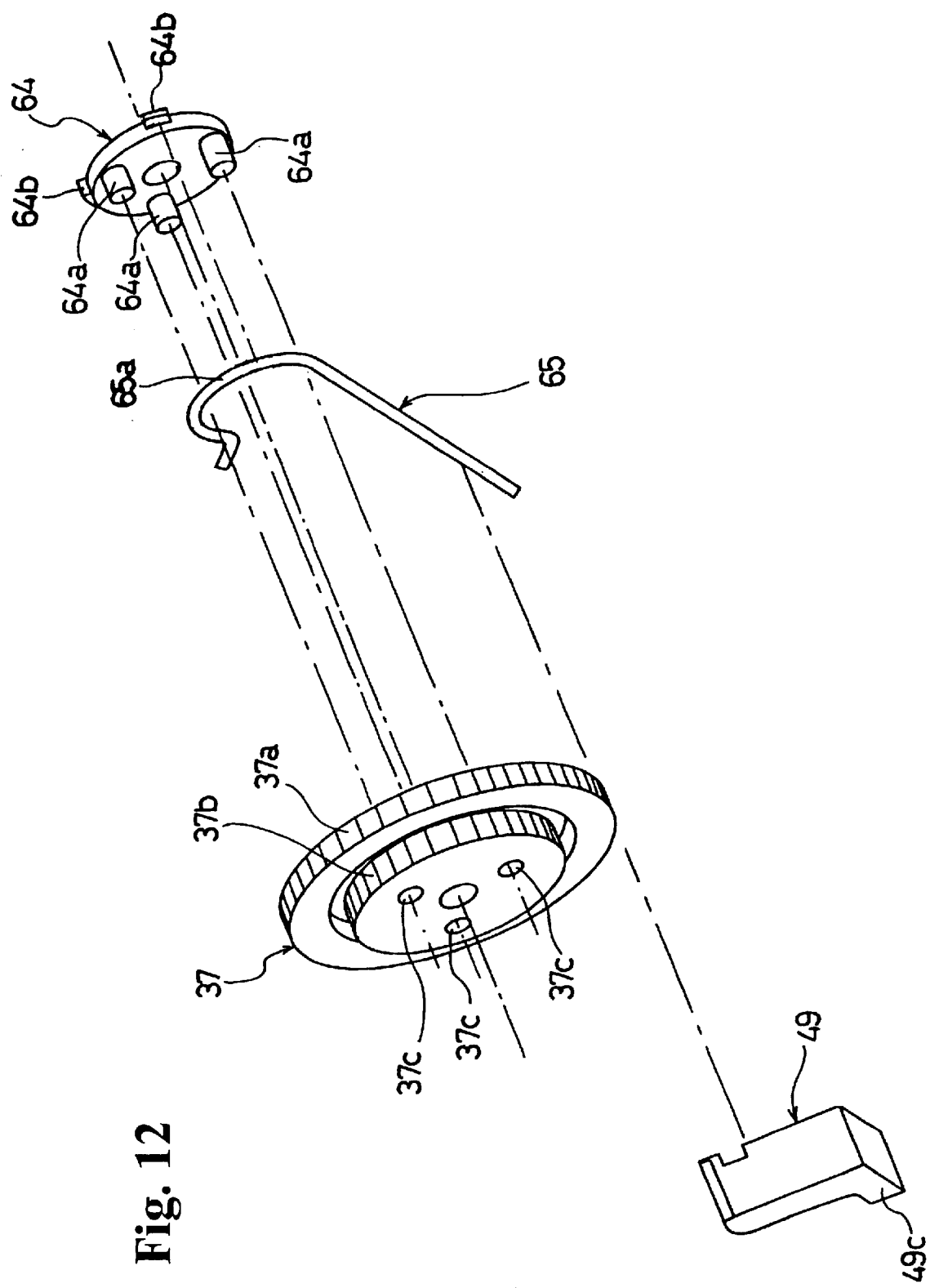
FIG. 12 is a partly enlarged exploded perspective view showing another part of the embodiment shown in FIG. 10.
Figure 13:
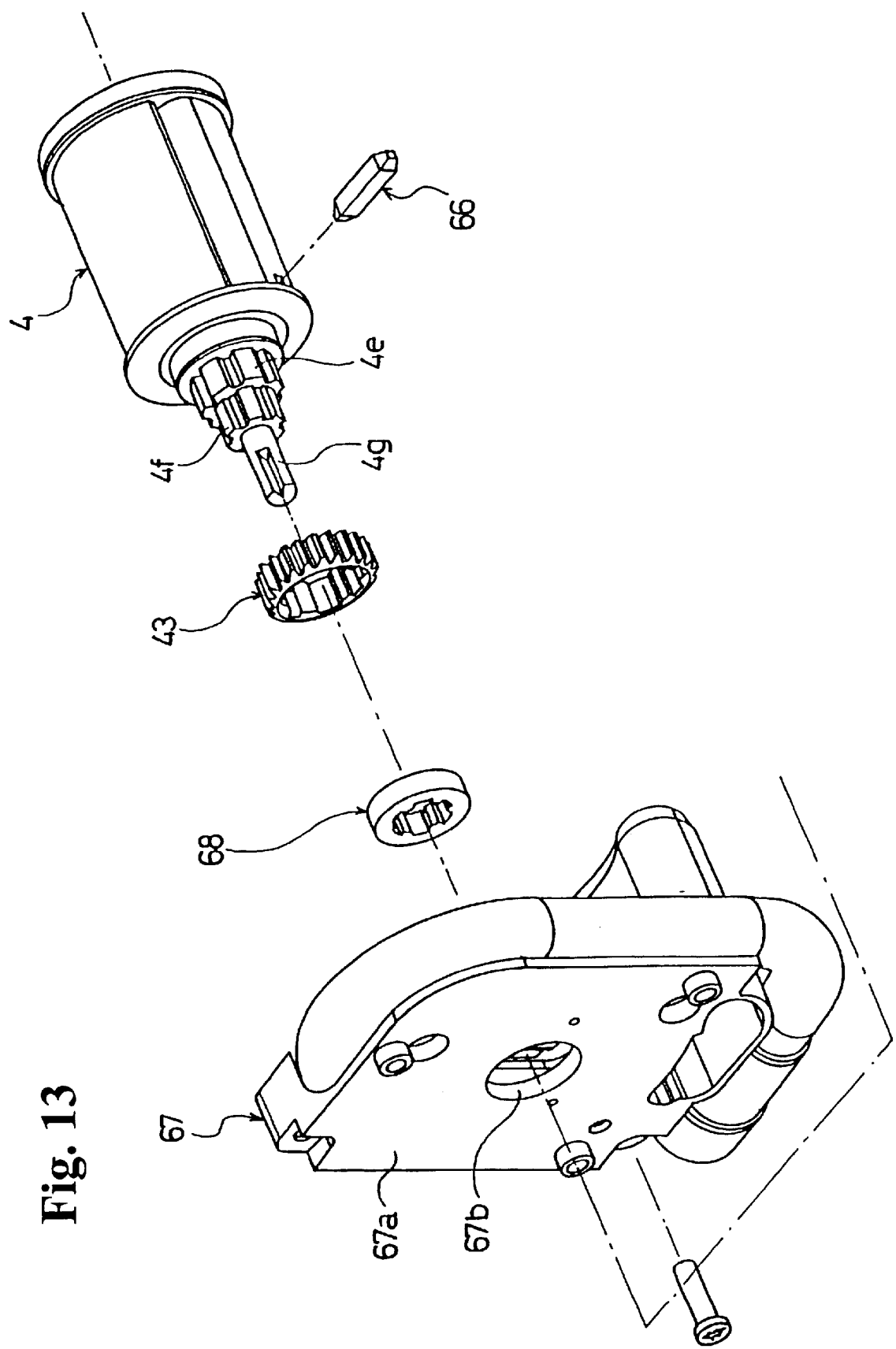
FIG. 13 is a partly enlarged exploded perspective view showing still another part of the embodiment shown in FIG. 10.
Figure 14:
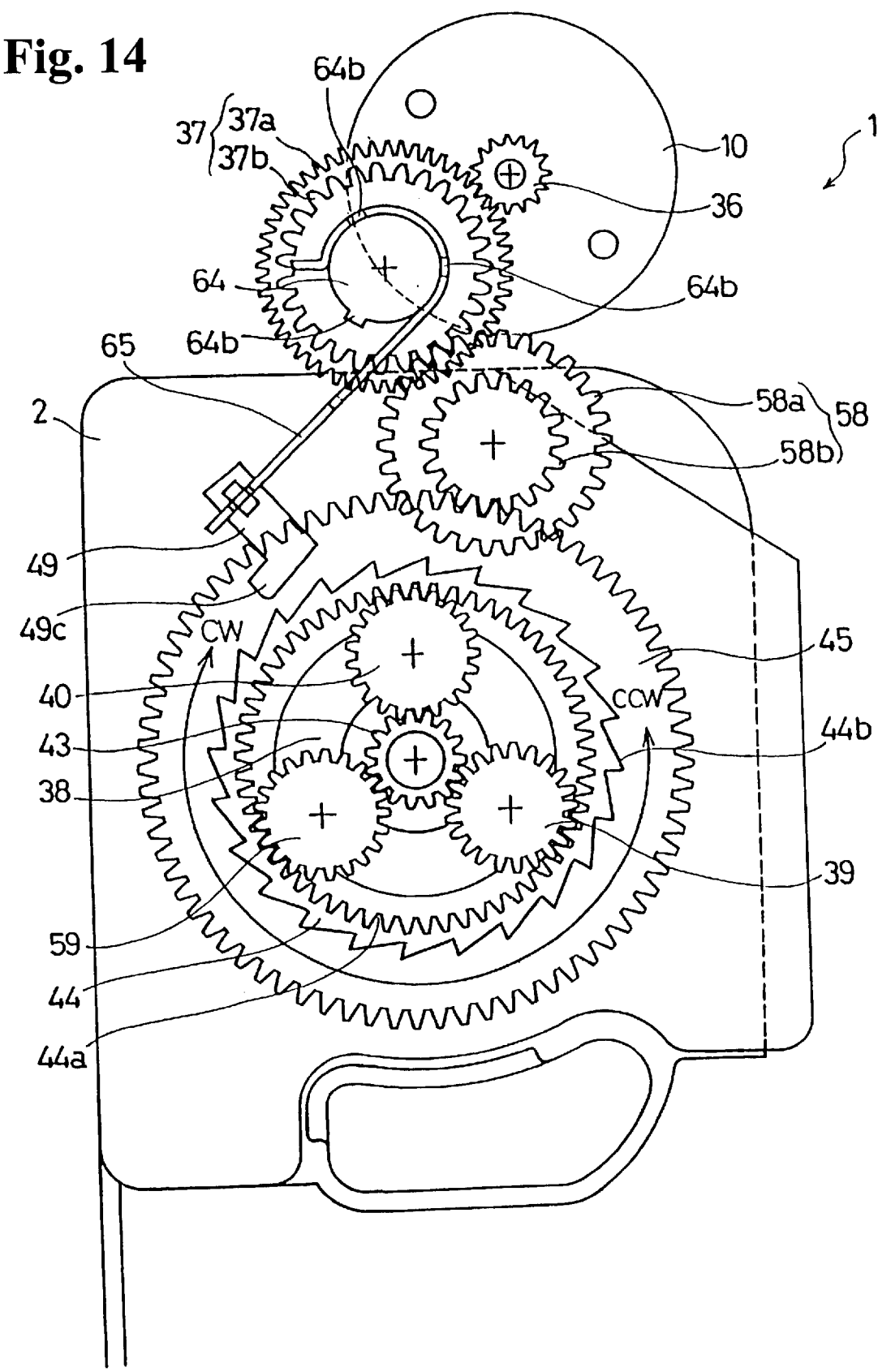
FIG. 14 is a partly broken side view of the motor, the power transmission gear mechanism, the speed reducing mechanism, and the power transmission path switching mechanism used in the seat belt retractor of the embodiment shown in FIG. 10.
Figure 15:
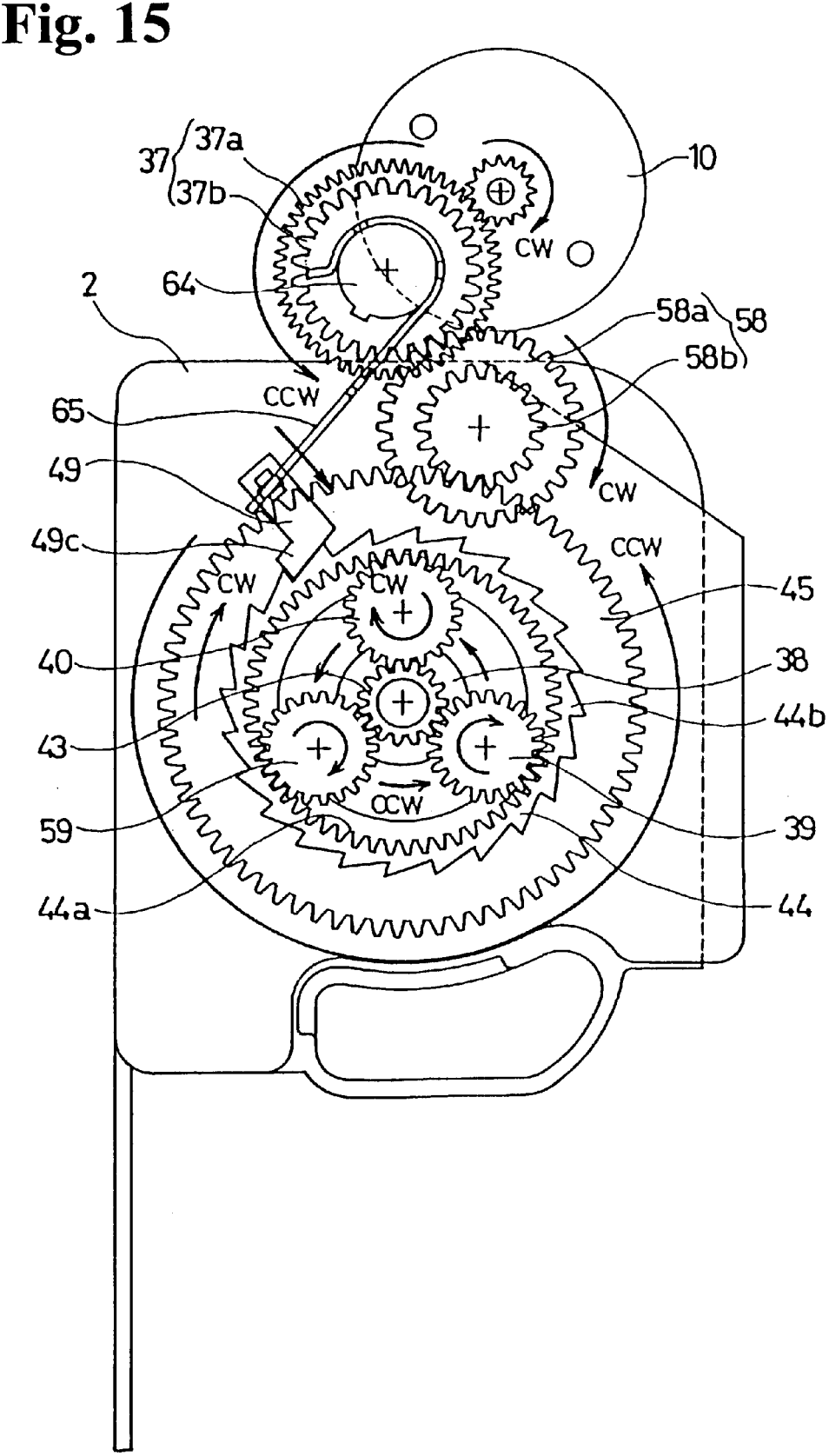
FIG. 15 is a side view, similar to FIG. 14, explaining the operation of the seat belt retractor in the state in which the seat belt is wound by a driving force of the motor.
Figure 16:
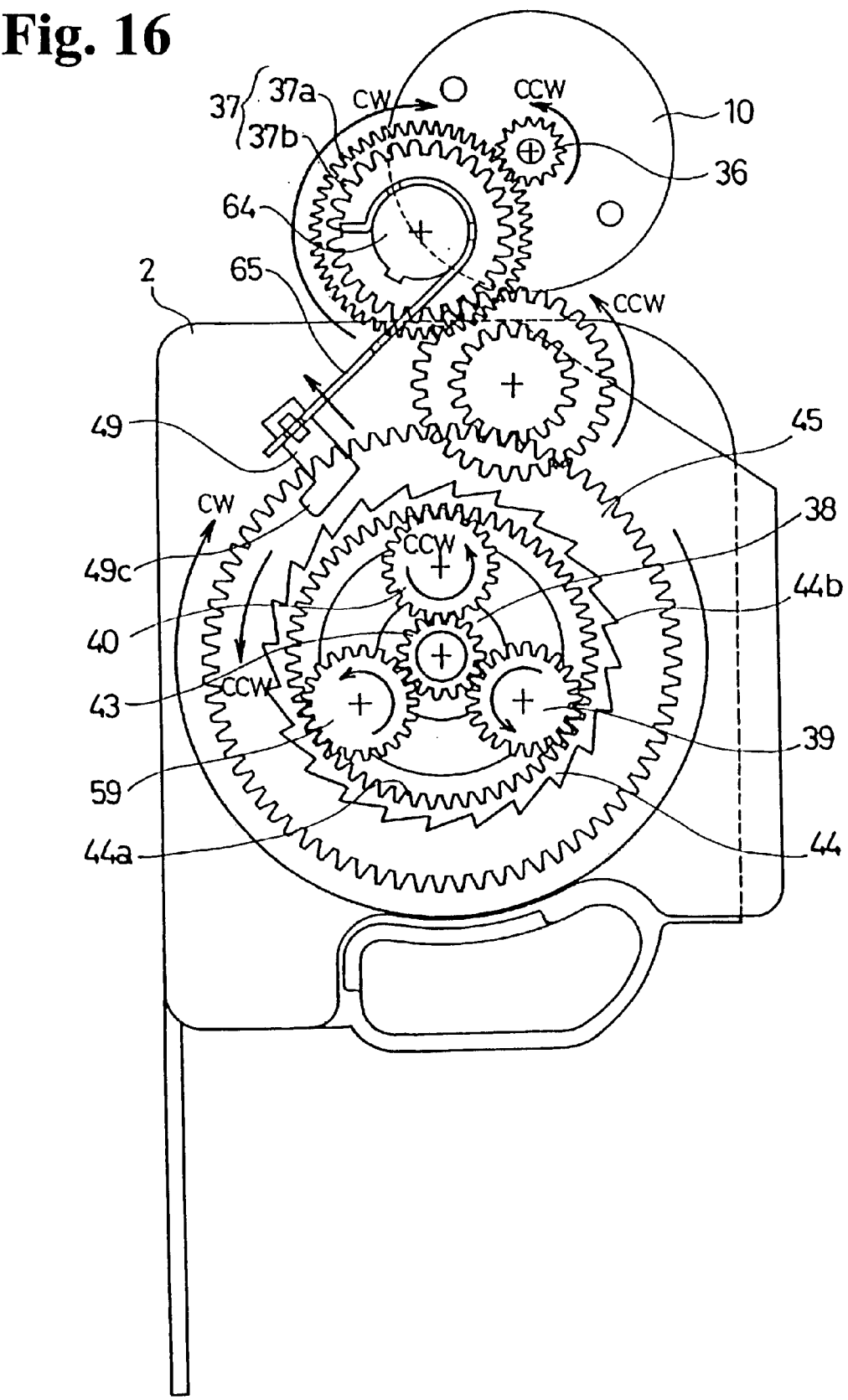
FIG. 16 is a side view, similar to FIG. 14, explaining the operation of the seat belt retractor in the state in which the seat belt winding operation is released by a driving force of the motor.

FIG. 10 is an exploded perspective view showing the seat belt retractor according to another embodiment of the invention. FIG. 11 to FIG. 13 are partly enlarged exploded perspective views; FIG. 14 is a partly broken side view of a motor, a power transmission gear mechanism, a speed reducing mechanism, and a power transmission path switching mechanism used in the seat belt retractor shown in FIG. 10 in the non-operating mode; FIG. 15 is a side view as in FIG. 14 showing the state in which the seat belt is wound by a driving force of the motor; and FIG. 16 is a side view as in FIG. 14 showing the state in which the winding operation of the seat belt is released. In the following embodiments, like reference numerals are used for components identical to those in the previous embodiment, and the detailed description is omitted. In the construction, operation, and effects of the seat belt retractor of the following embodiments, only the parts different from those of the previous embodiment will be described and the description of the parts identical to those of the previous embodiment will be omitted.

While the motor 10 is mounted in the lower portion of the retractor in the first embodiment, the motor 10 of the seat belt retractor 1 of the second embodiment is mounted on the upper part of the retractor 1.

While, the small diameter connect gear 37b of the connect gear 37 directly engages the external teeth 45b of the speed reducing gear 45 at all the time in the power transmission mechanism 11 and the speed reducing mechanism 12 of the first embodiment, an intermediate speed reducing gear 58 comprising a large diameter intermediate speed reducing gear 58a and a small diameter intermediate speed reducing gear 58b formed as an integral unit is placed between the connect gear 37 and the speed reducing gear 45 in the power transmission mechanism 11 and the speed reducing mechanism 11 of the second embodiment. In other words, the small diameter connect gear 37b of the connect gear 37 is engaged with the large diameter intermediate speed reducing gear 58a of the intermediate speed reducing gear 58 at all the time, and the small diameter intermediate speed reducing gear 58b of the intermediate speed reducing gear 58 is engaged with the external teeth 45b of the speed reducing gear 45 at all the time, so that the rotational speed of the connect gear 37 is reduced via the intermediate speed reducing gear 58 and transmitted to the speed reducing gear 45. Incidentally, depending on the position of the motor, the adequate number (one or more) of the intermediate gears may be added between the connect gear 37 and the speed reducing gear 45, otherwise the intermediate gear may be omitted.

As shown in FIG. 10 and FIG. 11, in the second embodiment, the first carrier 38 is provided with three planetary gears 39, 40 and 59 so as to rotate about their own axes. In such a case, these planetary gears 39, 40, and 59 are mounted to the first carrier 38 by reduction pins 61, 62 and 63 via a reduction plate 60. While in the first embodiment, the planetary gears 39 and 40 comprise large and small planetary gears having two different diameters respectively, i.e. the large planetary gears 39a and 40a engaging the sun gear 43 at all the time and small planetary gears 39b and 40b engaging the internal teeth 44a of the internal gear 44 at all the time, the planetary gears 39, 40 and 59 of the second embodiment are formed of planetary gears having the same diameters with respect to each other. The planetary gears with the same diameters are engaged with both of the sun gear 43 and the internal teeth 44a of the internal gear 44 at all the time.

The number of the planetary gears is not limited to three, but it may be two as in the first example, and may be four as in a third embodiment described later. Namely, the planetary gear may be any suitable number but at least one. The adequate number of the idle gears, such as the idle gears 41 and 42 in the first embodiment, may be provided as well. The speed reducing plate 60 may be omitted as in the first embodiment. In addition, the planetary gears 39, 40 and 59 may be composed of large and small planetary gears having two different diameters as in the first embodiment.

While the power transmission path switching mechanism 13 of the first embodiment is formed of the switch gear 46, the plunger 47, the spring 48, the stop lever 49, the supporting shaft 50, and the cylinder housing 51, the power transmission path switching mechanism 13 of the second embodiment comprises, as shown in FIG. 10 and FIG. 12, a stop lever 49, a spring-holding member 64 integrally and coaxially assembled to the connect gear 37 that is rotatably supported by the retainer so as to rotate with the connect gear 37 as an integral unit, and a lever spring (corresponding to the control lever of the invention) 65 having a prescribed resiliency and integrally assembled to the spring-holding member 64 on one end so as to rotate with the spring-holding member 64 as an integral unit and connected to the stop lever 49 on the other end.

In this case, on the axial side surface of the spring-holding member 64, there are provided three projecting pins 64a axially extending therefrom, and the spring-holding member 64 is assembled to the connect gear 37 by fitting these projecting pins 64a into three axial hole 37c formed on the connect gear 37 respectively. on the outer periphery of the spring-holding member 64, there are provided three projections 64b radially extending therefrom at regular intervals in the peripheral direction (three projections 64b are shown in FIG. 14). The lever spring 65 is assembled to the spring-holding member 64 by disposing the bent portion 65a of the lever spring 65 around the outer periphery of the spring-holding member 64, and fitting the same between the two projections 64b of the spring-holding member 64 and the connector gear 37 with prescribed friction in the direction of rotation.

The stop lever 49 is provided on the second retainer 35 so as to be brought into and out of contact with the ratchet teeth 44b of the internal gear 44 by a parallel movement.

When the connect gear 37 rotates counter-clockwise in FIG. 15 (in other words, the belt winding direction CCW) from the non-operating mode shown in FIG. 14, the rotation of the connect gear 37 in the belt winding direction CCW is transmitted to the lever spring 65 via the spring-holding member 64 to rotate the lever spring 65 in the same direction, and the rotation of the lever spring 65 causes a parallel movement of the stop lever 49 toward the internal gear 44, so that the stop claw 49c is placed to the position in which it can engage the ratchet teeth 44b of the internal gear 44. The clockwise rotation of the connect gear 37 in FIG. 16 (in other words, the rotation in the belt unwinding direction CW) transmitted from the state shown in FIG. 15 via the spring-holding member 64 and the lever spring 65 to the stop lever 49 causes the parallel movement of the stop lever 49 away from the internal gear 44, so that the stop claw 49c is placed to the position in which it does not engage the ratchet teeth 44b.

In the retractor 1 of the second embodiment, as shown in FIG. 10, the locking base 19 is provided on one end of the torsion bar portion 26a of the torsion bar 26 integrally with the torsion bar 26. Therefore, in the second embodiment, the first torque transmitting portion 26b of the torsion bar portion 26a is not provided as in the first embodiment. It is also possible to provide the torsion bar portion 26a and the locking base 19 as separate pieces, and the torsion bar portion 26a and the locking base 19 rotate as an integral unit via the first torque transmitting portion 26b provided on the torsion bar portion 26a as in the first embodiment.

In addition, in the second embodiment, a cylindrical stop 27 of the EA mechanism 7 and the male screw 19b formed on the locking base 19 to engage the female screw 27a of the stop 27 are not provided as shown in the first embodiment. Therefore, the reel 4 and the locking base 19 rotate with respective to each other but not as a single piece as a result of twisting action of the torsion bar 26.

In the second embodiment, the torsion bar 26 is not provided with the first shaft portion 26f that is provided on the distal side of the second torque transmitting portion 26d in the first embodiment, and the reel 4 is not axially cut as in the first embodiment. In addition, in the second embodiment, the second carrier 56 described in the previous embodiment is not provided. Therefore, the second torque transmitting portion 26d of the torsion bar 26 is directly fitted to the through hole 4d of the reel 4 from the end on the side of the side wall 15 so as not to rotate with respect to each other, and an axial engagement between the supporting pin 66 radially inserted into the reel 4 and the side portion of the second torque transmitting portion 26d prevents the torsion bar 26 from coming off in the axial direction. Because the supporting pin 66 is provided, the E-ring 57 described in the first embodiment is not provided.

Though the torsion bar 26 is not provided with the first shaft portion 26f as in the first embodiment, the reel 4 of the second embodiment is provided with the first shaft portion 4e, the second shaft portion 4f having a diameter smaller than that of the first shaft portion 4e, and the third shaft portion 4g having a diameter smaller than that of the second shaft portion 4f aligning in this order so as to extend its length toward the tip.

The first shaft portion 4e is provided with the first carrier 38 fitted thereto by means of splines so as to rotate with the first shaft portion 4e as an integral unit (in other words, to rotate with the reel 4 as an integral unit), and the sun gear 43 is supported thereon so as to rotate with respect to each other. The sun gear 43 is engaged with the internal teeth 45a of the speed reducing gear 45 at all the time as in the first embodiment. The second shaft portion 4f is connected to an output shaft of the pretensioner cassette 67 (not shown) and the bearing 68, both being fitted by means of splines, so as to rotate with the second shaft portion 4f as an integral unit (in other words, so as to rotate with the reel 4 as an integral unit), and the second shaft portion 4f is rotatably supported in the axial hole 67 of the housing 67a of the pretensioner cassette 67 by means of the bearing 68.

The pretensioner cassette 67 comprises a pretensioner accommodated within a housing 67a. Since the pretensioner is known in the art, and is not directly related to the invention, the detailed description is omitted. However, to be brief, the pretensioner is a device that is actuated in case of emergency such as a collision of the vehicle and winds a prescribed amount of the seat belt 3 by rotating the reel 4 in the seat belt winding direction CCW to apply a prescribed pretension to the seat belt in advance. The seat belt retractor 1 of this embodiment includes the pretensioner cassette 67, however, it is needless to say that the invention is also applicable to the seat belt retractor 1 having no pretensioner. The third shaft portion 4g is fitted with a bush 53 of the spring means 14, which is not shown in the figure, so as to rotate as an integral unit as in the first embodiment.

In the second embodiment as well, the motor is controlled by the CPU according to various information including information on the vehicle's traveling state, such as the speed of the vehicle and the acceleration of the vehicle, or to information on the vehicle's operating state, such as the speed of depression of the brake pedal or the speed of depression of the accelerating pedal.

Other structure of the seat belt retractor of the second embodiment, that is, the pawl 20, the lock gear 21 in the lock actuating mechanism 6, the flywheel 22, the flywheel spring 23, the housing 28 in the speed reduction detecting means 8, the sensor case 29, the inertia mass 30, the actuator 31, the first cover 34, the second cover 52 of the spring means 14, the bush 53, the return spring 54, and the spring cover 55 are identical to the first embodiment.

The operation of the belt tension control mechanism in the above arrangement will now be described.

(1) Non-operating mode of the seat belt retractor (state in which the seat belt is stored)

When the seat belt retractor 1 is in the non-operating mode, the seat belt 3 is wound on the reel 3 by the spring means 14. The motor 10 is also in the non-operating mode. In this non-operating mode, since the motor gear 36 and the connect gear 37 do not rotate, as shown in FIG. 14, the stop lever 49 is placed to the non-operating position in which the stop claw 49c is not engaged with the ratchet teeth 44b of the internal gear 44, and the power transmitting path is set to the OFF-state. Therefore, the internal gear 44 is free to rotate in either of the belt-unwinding direction CW and the belt-winding direction CCW, and thus the belt tension control mechanism is in the non-operating condition. At this time, the power transmission path extending through the motor gear 36, the connect gear 37, the intermediate speed reducing gear 58, and the speed reducing gear 45 requires a force (torque) equal to or higher than a given value for rotating these gears by a torque held by the motor 10 in the non-operating mode.

(2) Seat belt unwinding operation

Since the reel 4 is unwound in the belt unwinding direction CW when the seat belt 3 is unwound or withdrawn from the non-operating mode of the seat belt retractor as stated above, the second torque transmitting portion 26d of the torsion bar 26 rotates in the belt unwinding direction CW. Then, the first carrier 38 rotates in the same direction CW, and the planetary gears 39, 40 and 59 tend to rotate around the sun gear 43 respectively in the same direction CW. In this state, the sun gear 43 is engaged with the speed reducing gear 45 at all the time, and the speed reducing gear 45 is engaged with the small diameter intermediate speed reducing gear 58b of the intermediate speed reducing gear 58 at all the time, and thus a prescribed force is required to rotate the intermediate speed reducing gear 58 as stated above. Therefore, while the sun gear 43 is applied with a rotational resistance, the internal gear 45 is free to rotate as stated above. In other words, the internal gear 45 rotates freely and the sun gear does not rotate. In this situation, all of the planetary gears 39, 40 and 59 become rotatable in the belt unwinding direction CW.

Because the sun gear does not rotate, the rotation of the reel 4 in the belt unwinding direction CW during the seat belt 3 unwinding operation is not transmitted to the connect gear 37, and thus the lever spring 65 is not actuated and the stop lever 49 does not move. Therefore, the power transmission path switching mechanism 13 is not actuated, and the power transmission path between the reel 4 and the motor 10 remains in the OFF-state, so that the rotation of the reel 4 is not transmitted to the motor 10, and the motor is not affected by the rotation of the reel 4. Since the motor 10 is not actuated in this state, the belt tension control mechanism is held in the non-operating mode.

When the belt is withdrawn, the rotation of the third shaft portion 4g of the reel 4 winds up the return spring 54 via the bush 53 of the spring means, and thus the spring force gradually increases according to the unwound amount of the belt.

(3) The seat belt winding operation by a motor driving torque

When the motor is actuated from the non-operating mode shown in FIG. 14 so that the reel 4 rotates in the belt winding direction, the motor gear 36 rotates clockwise (same direction CW as the belt unwinding direction CW of the reel 4) as shown in FIG. 15, and the connect gear 37 rotates in the belt winding direction CCW with the speed reduced. Then, since the bent portion 65a of the lever spring 65 is fitted between the projection 64b of the spring-holding member 64 and the connector gear 37 with prescribed friction in the direction of rotation as is described above, the rotation of the connect gear 37 in the belt winding direction CCW allows the lever spring 65 to rotate in the same direction CCW, which causes the parallel movement of the stop lever 49 toward the internal gear 44. Accordingly, the stop claw 49c takes the engaging position in which it is engageable with the ratchet teeth 44b of the internal gear 44. After the stop claw 49c comes into contact with the outer periphery of the ratchet gear 44b of the internal gear 44, the lever spring 65 can not rotate in the direction CCW any more, but a slip is generated between the connect gear 37 and the lever spring 65, thereby rotating the connect gear 37 with respect to the lever spring 65. As a result, the motor 10 continues to rotate.

Simultaneously, since the rotation of the connect gear 37 is transmitted to the rotating speed reducing gear 45 via the intermediate speed reducing gear 58 with the speed reduced, and the sun gear 43 rotates in the same direction CCW at the same speed as the speed reducing gear 45. The rotation of the sun gear 43 allows the respective planetary gears 39, 40 and 59 to rotate on their respective axes in the belt unwinding direction CW with the speed further reduced, and the internal gear 44 rotates in the same direction CW. In this situation, the planetary gears 39, 40 and 50 do not rotate around the sun gear since the internal gear 44 rotates.

When the internal gear 44 rotates in the belt unwinding direction CW, the ratchet teeth 44b and the stop claw 49c engage with each other, and then the rotation of the internal gear 44 stops. In this way, when the motor 10 is actuated, the stop lever 49 is quickly actuated to prevent the rotation of the internal gear 44 in the belt unwinding direction CW, and the power transmission path between the reel 4 and the motor 10 is set to the ON-state. In other words, the belt tension mechanism is set to the operating mode.

Since the rotation of the internal gear 44 in such a manner causes the respective planetary gears 39, 40 and 59 to rotate on their axes by a driving torque of the motor as stated above, the respective planetary gears 39, 40 and 59 rotate around the sun gear 43 along the internal teeth 4a of the internal gear 44 in the belt winding direction CCW with the speed reduced. Therefore, since the first carrier 38 rotates in the belt winding direction CCW at the rotating speed of the planetary gears 39, 40 and 59 around the sun gear 43, the reel 4 rotates in the belt winding direction CCW at the same speed as the rotating speed of the first carrier 38. In this way, the reel 4 is rotated in the belt winding direction CCW by the rotation of the motor 10 in the belt unwinding direction CW transmitted with the speed reduced by the speed reducing mechanism 12 at a prescribed speed reduction ratio.

The rotation of the reel 4 in the belt winding direction CCW forces the seat belt 3 to be wound up on the reel 4 by the rotational torque of the motor 10, and the belt tension is controlled. As in the previous embodiment, the motor 10 is controlled based on the vehicle's traveling state or the vehicle's operating state, and the winding amount of the seat belt 3 is controlled to the desired amount, thereby controlling the belt tension to a desired value.

In this case, since the rotation of the third shaft portion 4g in the belt winding direction CCW unwinds the return spring 54, the spring force of the return spring 54 is weakened.

(4) Releasing action of the forced winding-up operation of the seat belt

When the motor rotates in reverse to the direction described in (3), as shown in FIG. 16, in the forced winding-up operation of the seat belt as is described in (3) shown in FIG. 15, the reel 4 rotates in the belt unwinding direction CW via the gears 36, 37, 58, 45, 43, 39, 40 and 59 and the first carrier 38, and the forced-wound seat belt 3 is loosened. Since the rotation of the connect gear 37 in the belt unwinding direction CW rotates the lever spring 65 in the belt unwinding direction CW, the stop lever 49 moves away from the internal gear 44 in parallel to place the stop claw 49 at the non-engaging position in which it is not engaged with the ratchet teeth 44b of the internal gear 44. Therefore, the internal gear 44 becomes free to rotate, and the reel 4 and the motor 10 are both rotationally free with respect to each other.

The seat belt retractor 1 of the second embodiment is constructed in such a manner that the belt tension of the seat belt 3 is controlled by a rotational torque of the motor 10 in the belt tension mechanism controlled by the CPU, according to the state of the passenger in the vehicle, the operating condition outside the vehicle, or the operating condition of the seat belt 3.

Other aspects of the operation of the seat belt retractor 1 of this embodiment are the same as those of the first embodiment.

According to the seat belt retractor 1 of the second embodiment, since the power transmission path switching mechanism 13 is comprised of only three members of the spring-holding member 64, the lever spring 65, and the stop lever 49, the number of the components constituting the power transmission path switching mechanism 13 is reduced and thus the mechanism is simplified in comparison with the first embodiment. Therefore, the power transmission is carried out reliably, thereby ensuring reliable and easy control of the belt tension of the seat belt 3.

In addition, by controlling the action of the stop lever 49 by the lever spring 65 having a prescribed resiliency, the movement of the stop lever 49 is smooth and more reliable, and the impact to the internal gear 44 of the stop lever 49 in the event of collision or the like is alleviated.

Other effects of the seat belt retractor 1 of this embodiment are the same as those in the first embodiment.

The power transmission path switching mechanism 13 of the second embodiment may be applied to the seat belt retractor 1 of the type as described in the first embodiment, wherein the torsion bar 26 passes through the reel 4 in the direction of the axis, and the power transmission path switching mechanism 13 of the first embodiment may be applied to the seat belt retractor 1 of this embodiment wherein the torsion bar 26 does not pass through the reel 4 in the direction of the axis.

Figure 17:
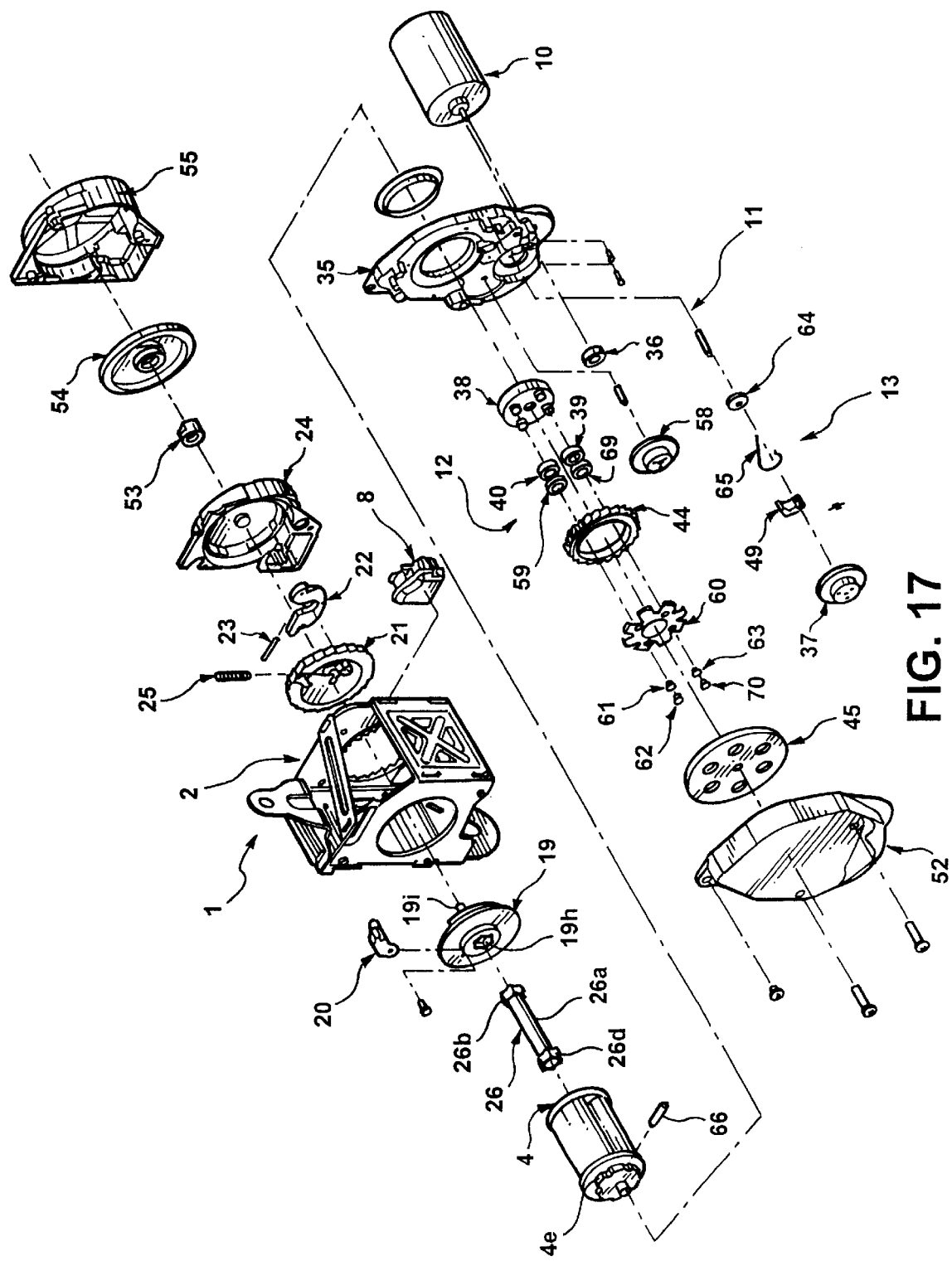
FIG. 17 is an exploded perspective view showing the seat belt retractor of a third embodiment of the present invention.
Figure 18:
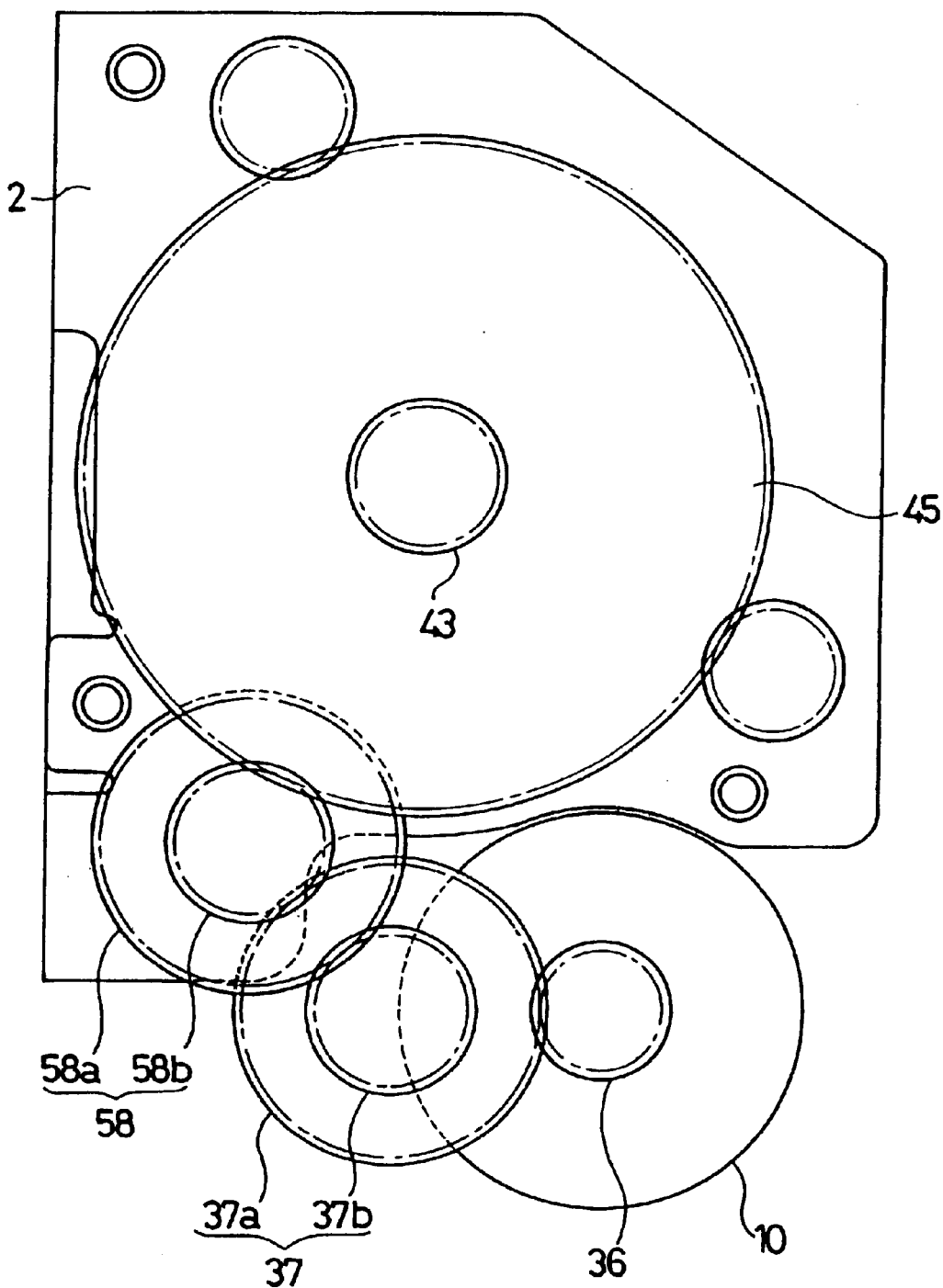
FIG. 18 is a side view showing only a motor and a power transmission gear mechanism used in the seat belt retractor shown in FIG. 17.

FIG. 17 is an exploded perspective view showing the seat belt retractor of a third embodiment of the present invention, and FIG. 18 is a side view showing only a motor and a power transmission gear mechanism used in the seat belt retractor shown in FIG. 17.

In comparison with the second embodiment shown in FIG. 10 described above, in the third embodiment of the seat belt retractor 1 as shown in FIG. 17 and FIG. 18, the motor 10 is located on the lower portion of the retractor as in the first example shown in FIG. 1.

Figure 19C:
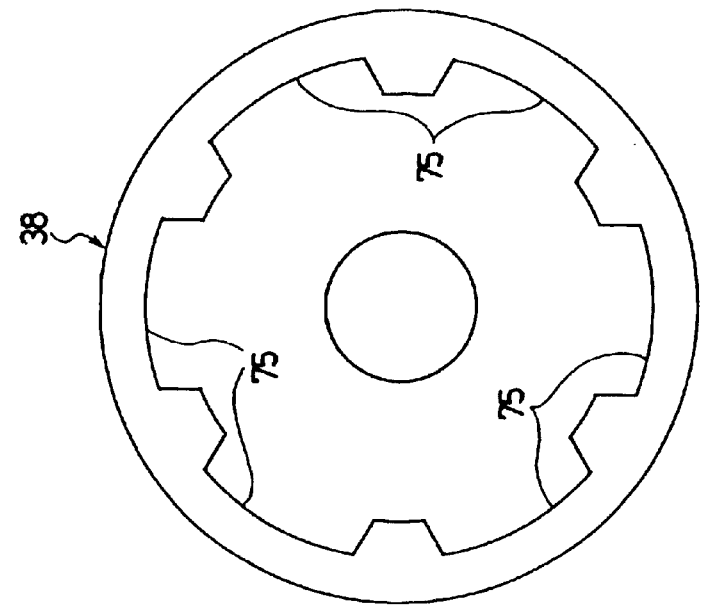
Figure 19B:
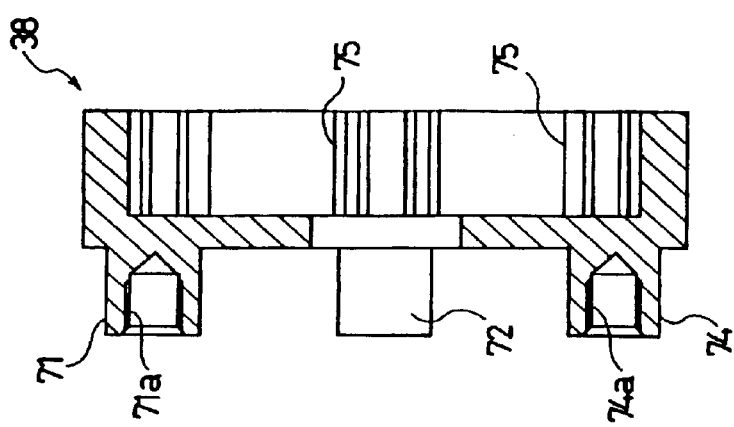
Figure 19A:
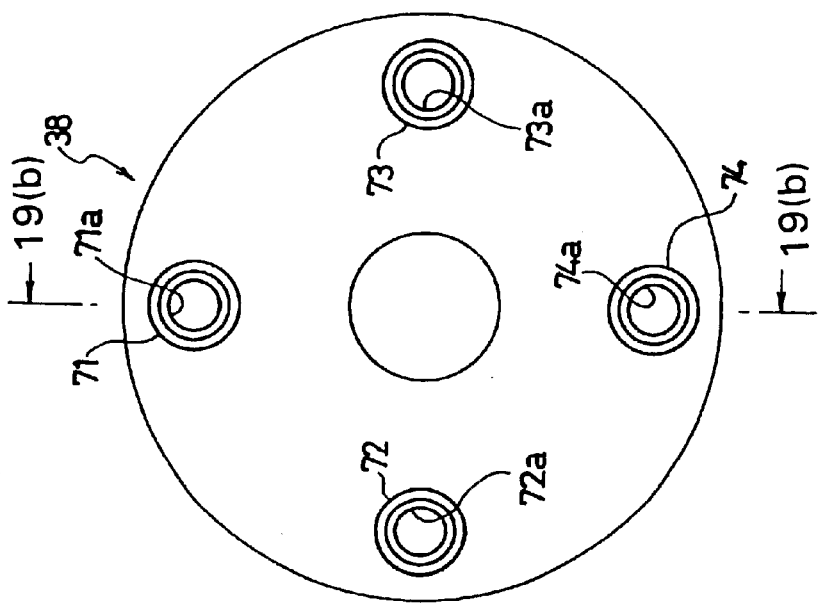

In the third example, as shown in FIG. 17, four planetary gears 39, 40, 59 and 69 are mounted on the first carrier 38 by four reduction pins 61, 62, 63 and 70 respectively, so as to rotate about their own axes. More specifically, as shown in FIGS. 19(a) and 19(b), planetary gear mounting portions 71, 72, 73 and 74 formed with female screws 71a, 72a, 73a and 74a respectively, which correspond to a transmitted torque limiting mechanism of the invention and a supporting portion of the planetary gear of the present invention, are provided on one side surface of the first carrier 38 circumferentially at regular intervals so as to project in the direction of the axis. These planetary gear mounting portions 71, 72, 73 and 74 are constructed such that they are ruptured from the roots thereof when a shearing force equal to or exceeding a prescribed value is applied in the direction of rotation of the carrier 38, as shown in FIG. 20. As shown in FIGS. 19(b) and 19(c), spline grooves to which the first shaft portion 4e of the reel 4 is spline-fitted are formed on the other side surface of the first carrier 38.

Figure 21C:
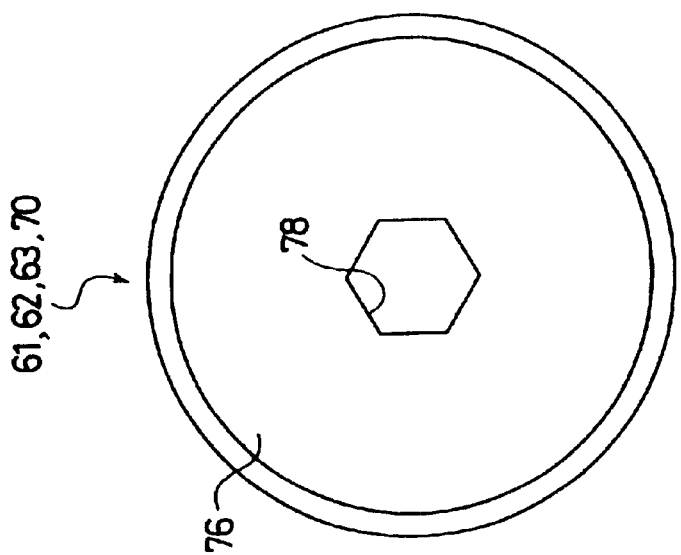
Figure 21B:
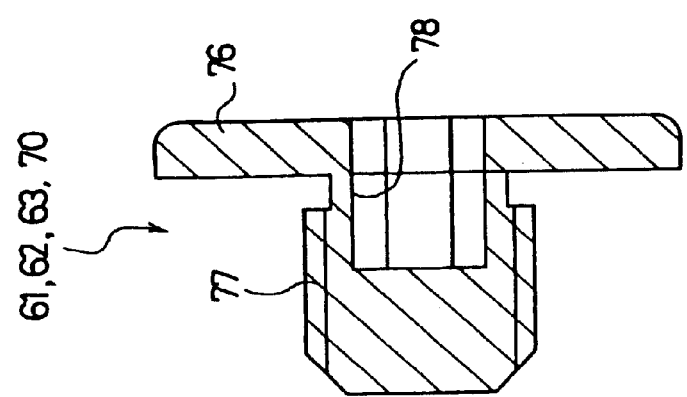
Figure 21A:
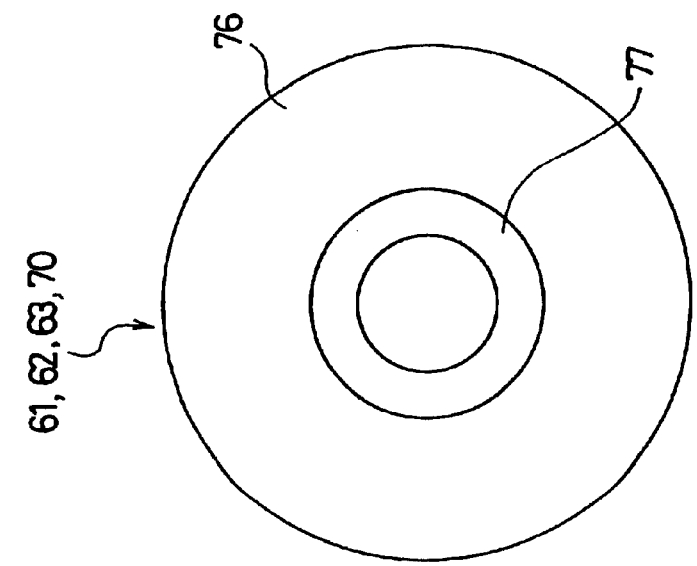

The four reduction pins 61, 62, 63 and 70 are identical, and each of them comprises, as shown in FIGS. 21(a) to 21(c), a head portion 76, a male screw 77 vertically extending from the head portion 76, and a tool hole 78 for inserting a tool, such as a screw driver, and engaging the same in the direction of rotation for rotating the reduction pins 61, 62, 63 and 70.

The respective planetary gears 39, 40, 59 and 69 are mounted on the first carrier 38 by screwing the male screw 77 of the reduction pins 61, 62, 63 and 70 into the female screws 71a, 72a, 73a and 74a of the first carrier 38 via the reduction plate 60. The reduction pins 61, 62, 63 and 70 may be mounted on the planetary gear mounting portions 71, 72, 73 and 74, respectively, of the first carrier 38 by fixing means other than screwing, such as press-fitting or swaging. In such an arrangement, screw thread cutting on the male screw 77 or female screws 71a, 72a, 73a and 74a is not necessary, and thus machining is simplified.

The planetary gears 39, 40, 59 and 69 are identical, and engaged with both the sun gear 43 and the inner teeth 44a of the internal gear 44 at all the time. It is possible to provide the adequate number, that is, one or more of the planetary gears. It is also possible to provide the adequate number of idle gears, such as the idle gears 41, 42 in the first embodiment. In addition, the reduction plate 60 may be omitted as in the first example. Each of the planetary gears 39, 40, 59 and 69 of the third embodiment may be composed of a large planetary gear and a small planetary gear having two different diameters respectively as in the first embodiment.

While the locking base 19 and the torsion bar 26 of the second embodiment shown in FIG. 10 are formed as a single unit, the locking base 19 and the torsion bar 26 in the third embodiment are formed separately as in the first embodiment, and the first torque transmission part 26b of the torsion bar 26 is fitted into the engaging hole 19h formed at the center of the locking base 19 in such a manner that they can not rotate with respect to each other, whereby the torsion bar 26 and the locking base 19 are rotatively connected.

The locking base 19 includes a shaft 19i projecting from the center of the surface thereof on the opposite side of the engaging hole 19h, and rotatably penetrating through the components 21 and 24. On the shaft 19i, a bush 53 to which the inner end of the return spring is connected is fitted so that they can rotate together as a single unit.

The retractor 1 of the third embodiment has substantially the same structure as the second embodiment except that the pretensioner cassette 67 is not provided.

In the seat belt retractor 1 of the third embodiment having such a structure, when an abrupt deceleration is applied to the vehicle in case of an emergency, such as collision, the motor 10 is actuated to wind the prescribed amount of the seat belt 3 in advance to restrain the passenger. The passenger tends to move forward by the inertia, but is prevented from being moved forward and thus protected more effectively since a force of the seat belt 3 to restrain the passenger has been increased.

In such a construction that the seat belt 3 is wound by the driving force of the motor 10 in advance in case of the emergency as described above, since the load of the motor 10 is linked to the torsion bar 26 of the EA mechanism 7, the EA load applied to the torsion bar 26 of the EA mechanism due to the load of the motor 10 itself increases to a relatively large extent when the seat belt 3 is unwound due to the inertia of the passenger. However, in the seat belt retractor 1 of the third embodiment, in case a large torque, in other words, a large shearing force of the prescribed value or more is applied in the direction of rotation to the four planetary gear mounting portions 71, 72, 73 and 74 standing on the carrier 38, the four planetary gear mounting portions 71, 72, 73 and 74 are ruptured at their root portion as shown in FIG. 20. Therefore, increase in the EA load due to the load of the motor 10 itself is controlled or suppressed.

Other operations and effects of the seat belt retractor 1 of the third embodiment are the same as those of the second embodiment described above.

Figure 22B:
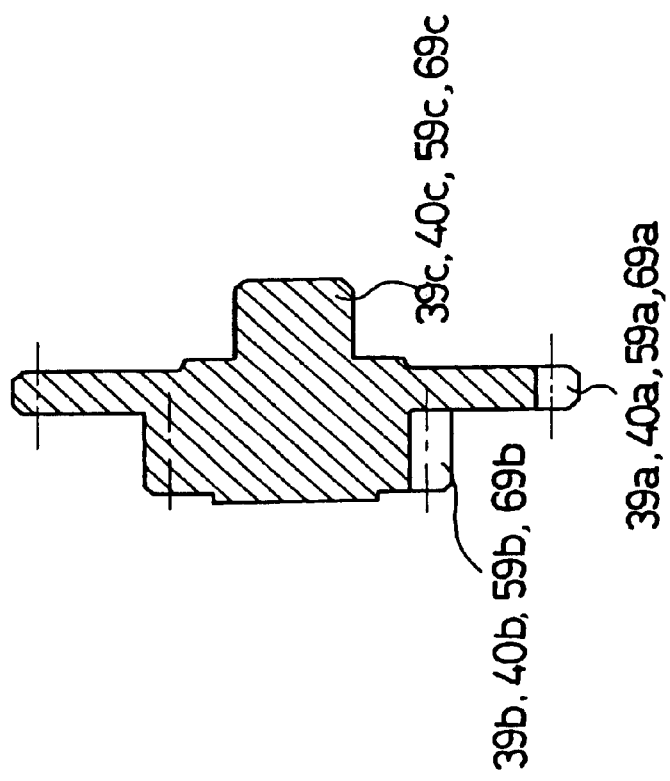
Figure 22A:
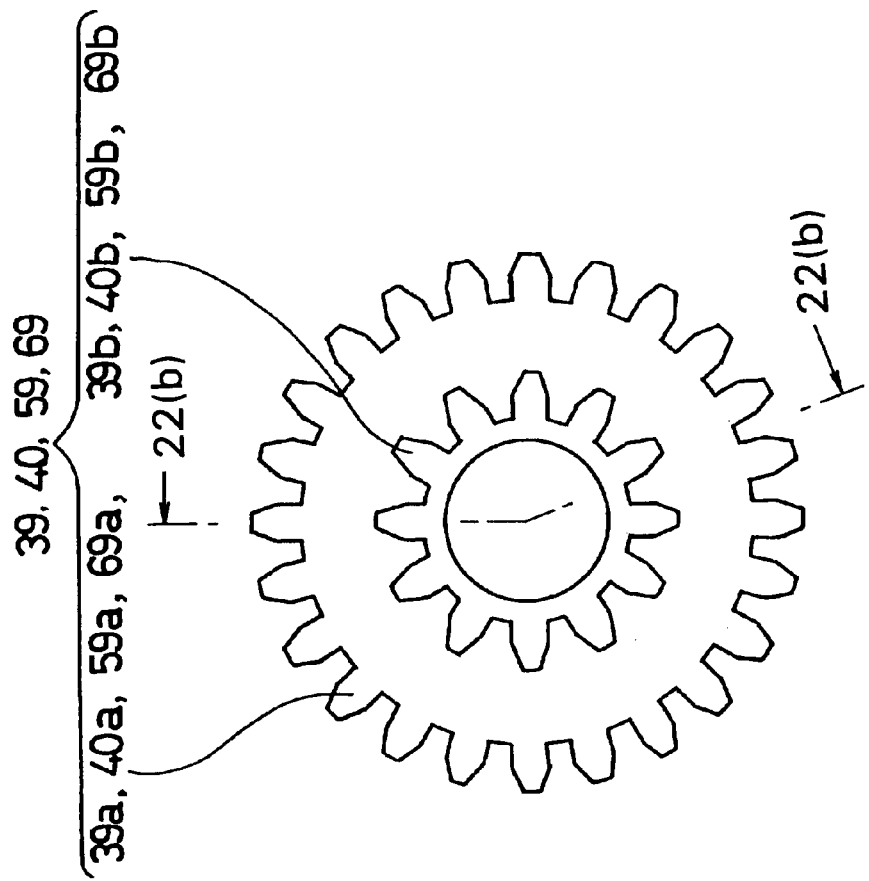

FIGS. 22(a) and 22(b) show the fourth embodiment of the present invention.

In the third embodiment shown in FIG. 17, the respective planetary gears 39, 40, 59 and 69 are mounted on the four planetary gear mounting portions 71, 72, 73 and 74, respectively, by the respective reduction pins 61, 62, 63 and 70 so that the respective planetary gear mounting portions 71, 72, 73 and 74 are ruptured when a sharing force of the preset value or more is applied thereto. However, in the fourth embodiment, the planetary gear is provided with an integrated axis of rotation, which is rotatably mounted on the carrier 38 and constructed in such a manner that it is ruptured at its root when subjected to a sharing force equal to or higher than the prescribed value in the direction of rotation.

More specifically, as shown in FIGS. 22(a) and 22(b), the respective planetary gears 39, 40, 59 and 69 of the fourth embodiment are composed of large planetary gears 39a, 40a, 59a, 69a and small planetary gears 39b, 40b, 59b, 69b, respectively. It is needless to say that the construction of the planetary gears is not limited to this type, but the planetary gears 39, 40, 59 and 69 of the third embodiment may be used as well. As shown in FIG. 22(b), in the centers of the side surfaces of the large planetary gears 39a, 49a, 59a and 69a opposite to the small planetary gears 39b, 49b, 59b and 69b, axes of rotation 39c, 40c, 59c and 69c, which correspond to the torque transmission limiting mechanism and the supporting portion for the planetary gear of the invention, are provided to stand upward therefrom.

As shown in FIGS. 23(a) and 23(b), the carrier 38 of the fourth embodiment is formed with four through holes 79, 80, 81 and 82 circumferentially at regular intervals. Then, the respective planetary gears 39, 40, 50 and 69 are rotatably mounted on the carrier 38 by fitting the axes of rotation 39c, 40c, 59c and 69c of the respective planetary gears 39, 40, 59 and 69 into the through holes 79, 80, 81 and 82. The axes of rotation 39c, 40c, 59c and 69c are constructed in such a manner that they are ruptured at their root portions when subjected to a sharing force equal to or higher than the preset value in the direction of rotation.

Other structures of the seat belt retractor of the fourth embodiment are the same as those of the third embodiment.

Figure 24:
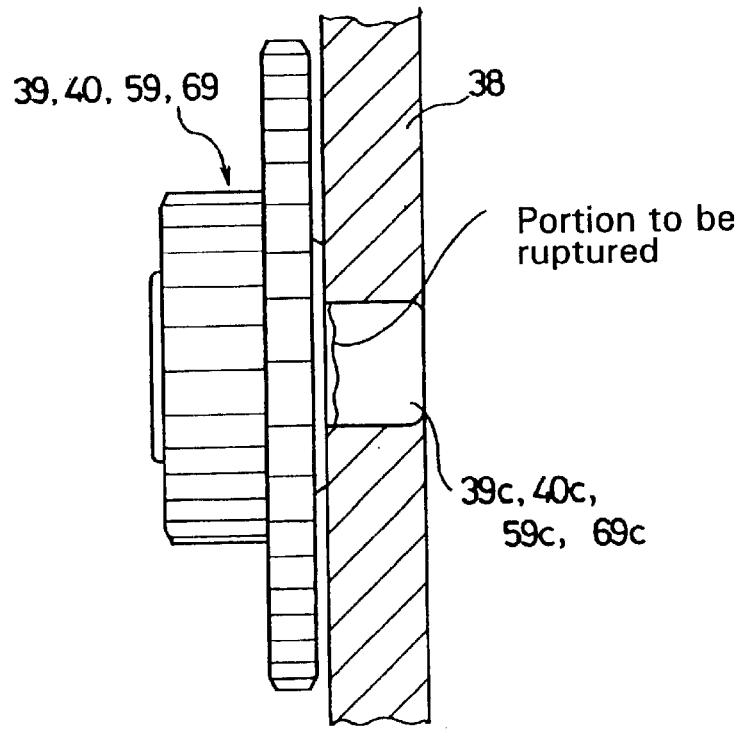
FIG. 24 is an explanatory view illustrating the operation of the torque transmission limiting mechanism of the seat belt retractor of the fourth embodiment.
Figure 25:
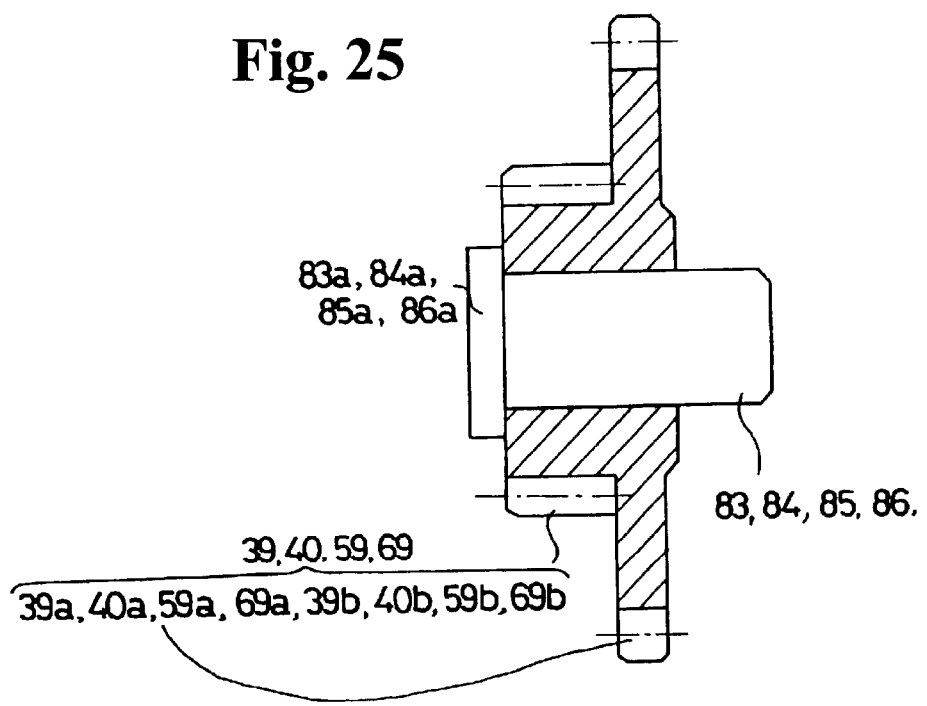
FIG. 25 is a cross sectional view of a planetary gear used in the seat belt retractor, and a supporting pin of a fifth embodiment of the present invention.

In the seat belt retractor 1 of the fourth embodiment having such a structure, in case of emergency, the axes of rotation 39c, 40c, 59c and 69c of the respective planetary gears 39, 40, 59 and 69 are subjected to a sharing force equal to or higher than the prescribed value as in the case described above, the respective axes of rotation 39c, 40c, 59c and 69c are ruptured at the root portions thereof as shown in FIG. 24. Therefore, increase in the EA load due to the load of the motor 10 itself is controlled or suppressed.

Other operations and effects of the seat belt retractor 1 of the fourth embodiment are the same as those of the third embodiment described above.

While in the fourth embodiment shown in FIGS. 22(a) and 22(b), the respective axes of rotation 39c, 40c, 59c and 69c provided on the respective planetary gears 39, 40, 59 and 69 are rotatably fitted into the through holes 79, 80, 81 and 82 of the carrier 38 so that the respective axes of rotation 39c, 40c, 59c and 69c are ruptured when subjected to a sharing force equal to or higher than the preset value in the direction of rotation, in the fifth example, the supporting pins passing through the planetary gears to rotatably support the planetary gears are secured to the carrier so that the supporting pins are ruptured when subjected to a sharing force equal to or higher than the prescribed value in the direction of rotation.

The centers of the respective planetary gears 39, 40, 59 and 69 of the fifth embodiment are provided with through holes 39d, 40d, 59d and 69d respectively. Then, the supporting pins 83, 84, 85 and 86, which correspond to the torque transmission limiting mechanism and the supporting portion for the planetary gear of the invention, having head portions 83a, 84a, 85a and 86a pass through these through holes 39d, 49d, 59d and 69d, and the other ends thereof are fitted and fixed to the through holes 79, 80, 81 and 82 of the carrier 38 shown in FIGS. 23(a) and 23(b). The diameter of each of the head portions 83a, 84a, 85a, and 86a is larger than the diameter of each of the through holes 39d, 40d, 59d and 69d. In this way, the respective planetary gears 39, 40, 59 and 69 are prevented from being detached by the head portions 83a, 84a, 85a, 86a of the supporting pins 83, 84, 85 and 86, and these supporting pins 83, 84, 85 and 86 are constructed in such a manner that they are ruptured when subjected to a sharing force equal to or higher than the preset value in the direction of rotation.

Other structures of the seat belt retractor 1 of the fifth embodiment are the same as those of the fourth embodiment.

Figure 26:
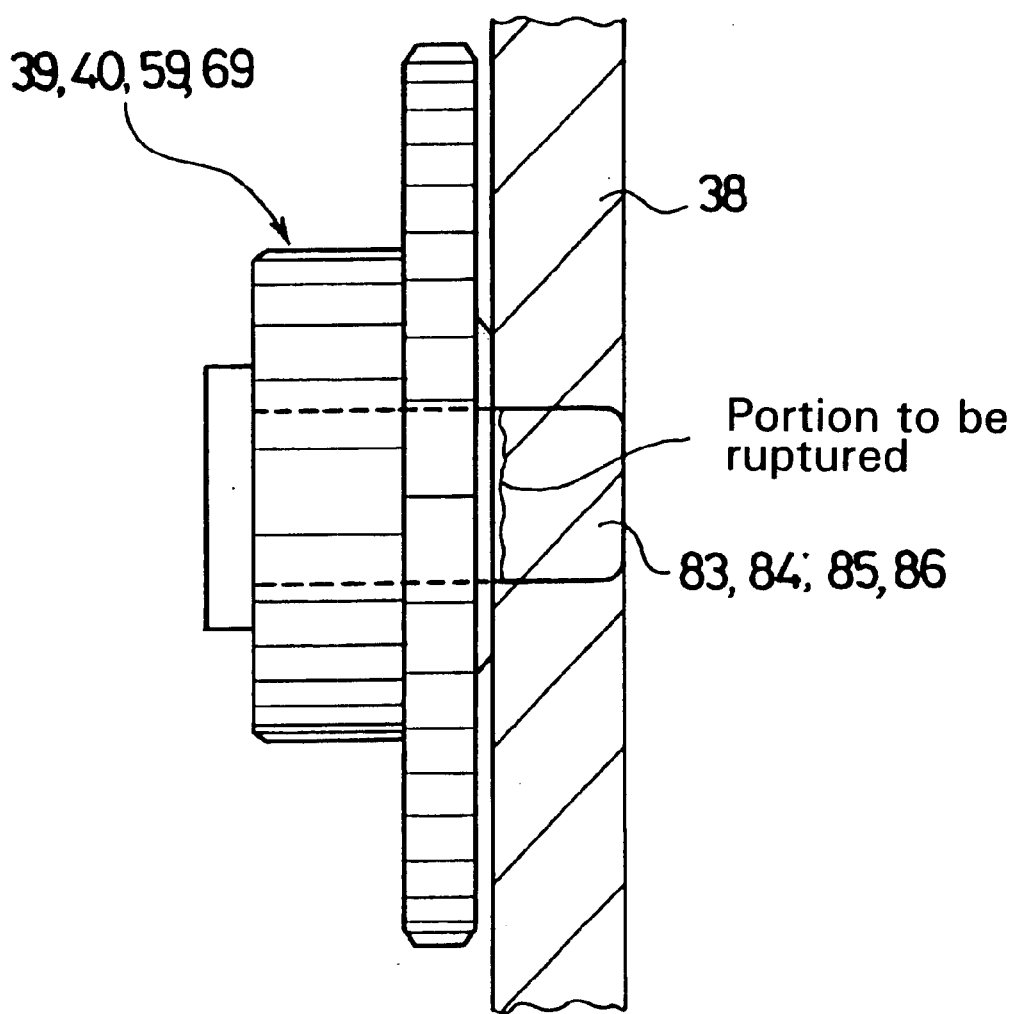
FIG. 26 is an explanatory drawing illustrating the operation of the torque transmission limiting mechanism in the seat belt retractor of the fifth embodiment.

In the seat belt retractor 1 of the fifth embodiment having such a structure, if, in case of emergency, the respective supporting pins 83, 84, 85 and 86 are subjected to a sharing force equal to or higher than the prescribed value as in the case described above, the respective supporting pins 83, 84, 85 and 86 are ruptured as shown in FIG. 26. Therefore, increase in the EA load caused by the load of the motor 10 itself is controlled or suppressed.

Other operations and effects of the seat belt retractor 1 of the fifth embodiment are the same as those of the fourth embodiment described above.

Figure 27:
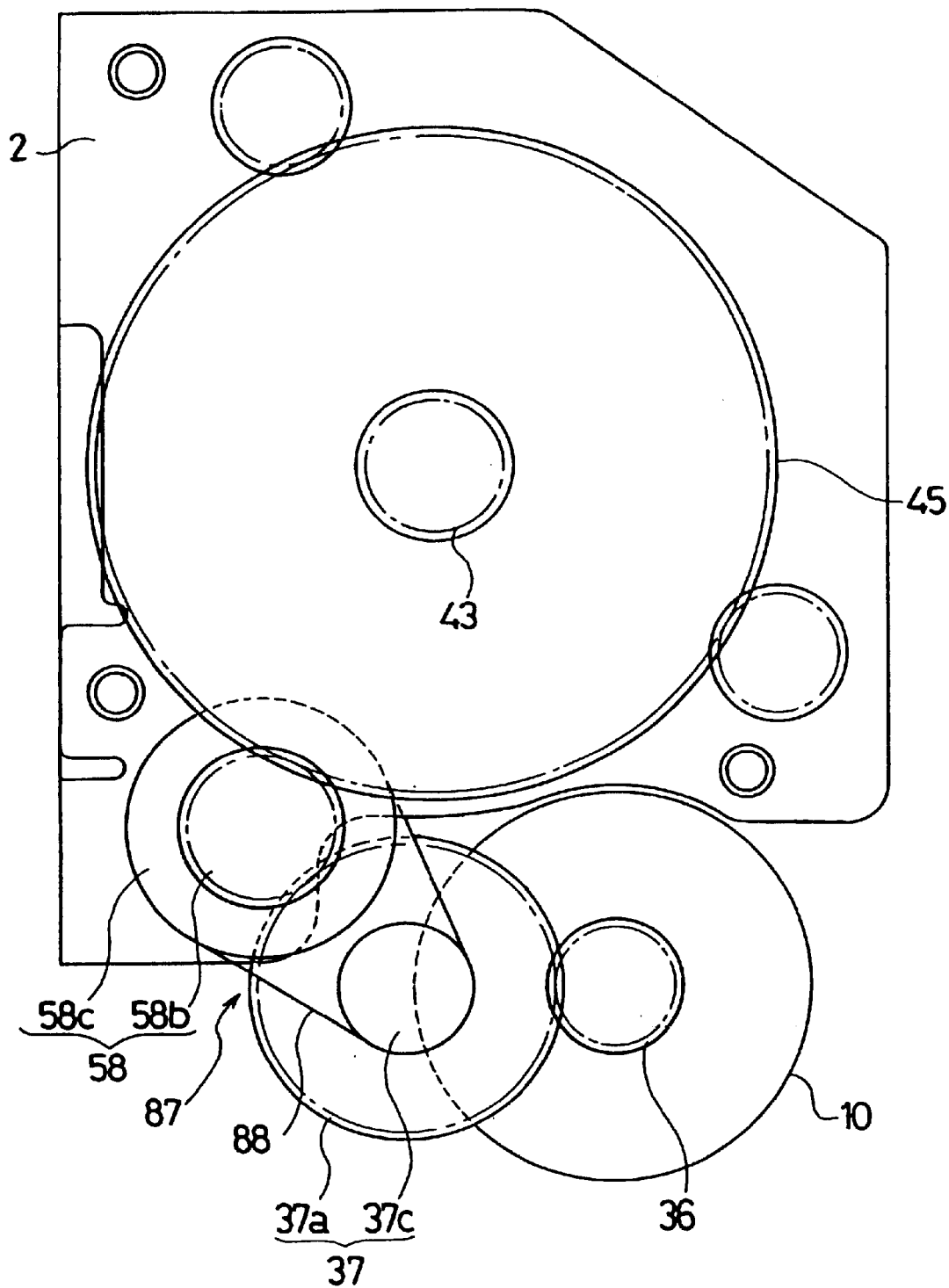
FIG. 27 is a side view showing only a motor and a power transmission gear mechanism used in the seat belt retractor of a sixth embodiment of the present invention.

FIG. 27 is a side view showing only the motor and the power transmission gear mechanism of a sixth embodiment of the present invention, shown in the same manner as in FIG. 18.

While, in the third to fifth embodiments described above, increase in the EA load due to the load of the motor 10 itself is controlled or suppressed by discontinuing transmission of a power by rupturing the supporting portion of the planetary gears fitted to the carrier 38 when subjected to a large sharing force equal to or higher than the prescribed value in the direction of rotation, increase in the load of the motor 10 and increase in the EA load are controlled or suppressed by discontinuing transmission of a power of the power transmission mechanism 12 in the sixth embodiment.

More specifically, while a driving force of the motor 10 is transmitted to the speed reducing gear 45 by means of the engagement among the motor gear 36, the connect gear 37 and the intermediate speed reducing gear 58 in the third to fifth embodiments, the power transmission between the connect gear 37 and the intermediate speed reducing gear 58 is made by a belt power transmission mechanism 87 in the seat belt retractor 1 of the sixth embodiment.

In other words, as shown in FIGS. 28(a) and 28(b), a connect gear 37 is composed of a large diameter connect gear 37a, and a small diameter belt pulley 37c formed coaxially and unitarily therewith, and having a smaller diameter than the large connect gear 37a. As shown in FIGS. 29(a) and 29(b), an intermediate speed reducing gear 58 is composed of a small intermediate speed reducing gear 58b, and a large diameter belt pulley 58c formed coaxially and unitarily therewith, and having a larger diameter than the small diameter intermediate speed reducing gear 58b. An endless belt 88 is looped between the large diameter belt pulley 58c and the small diameter belt pulley 37c. Namely, the belt power transmission mechanism 87 is composed of the small diameter belt pulley 37c, the large diameter belt pulley 58c, and the endless belt 88. These small diameter belt pulley 37c, the large diameter belt pulley 58c, and the endless belt 88 correspond to the torque transmission limiting mechanism of the invention.

The frictional coefficient between the small diameter belt pulley 37c and the endless belt 88, and the frictional coefficient between the large diameter belt pulley 58c and the endless belt 88 are set to the values such that a slip occurs between them when a torque transmitted among the respective belt pulleys 37c, 58c and the endless belt 88 is equal to or higher than the prescribed value. When such a slip is generated, transmission of a power from the belt pulleys 37c, 58c to the endless belt 88, or transmission of a power from the endless belt 88 to the belt pulleys 37c, 58c is discontinued, and when a torque is below the prescribed value, the power is transmitted.

Figure 30A:
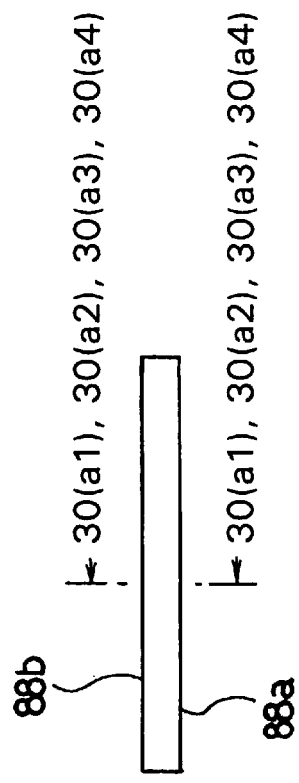
FIGS. 30(a)–30(c) show parts of the endless belt used in the seat belt retractor of the sixth example shown in FIG. 27, wherein FIG. 30(a1) to FIG. 30(c4) show cross sectional views of the endless belts in various configurations, respectively.
Figure 30:
Figure 30:
Figure 30:
Figure 30:

The endless belt 88 may have various configurations. As examples of the configurations of the endless belts 88, as shown in FIG. 30(a), both of the inner and outer side surfaces 88a and 88b may be smoothly formed, and the configurations of the cross sections may be a circle as shown in FIG. 30(a1), an inverted trapezoid as shown in FIG. 30(a2), a rectangle as shown in FIG. 30(a3), and inversed triangle as shown in FIG. 30(a4). It may be an oval, as well.

Figure 30B:
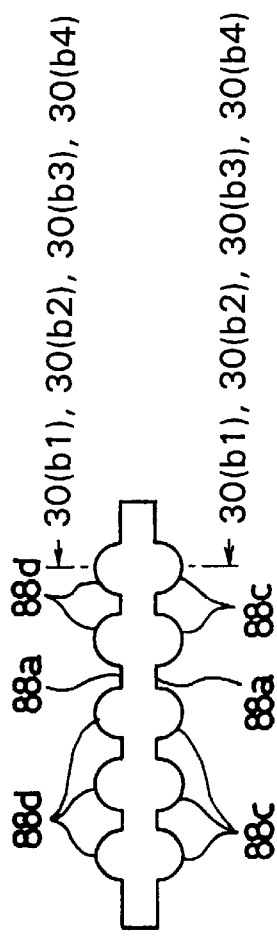
Figure 30:
Figure 30:
Figure 30:
Figure 30:

As other examples of the configurations of the endless belt 88, as shown in FIG. 30(b), it may have semi-circular projections 88c, 88d on the inner and outer side surfaces 88a and 88b, and the configurations of the cross sections may be a circle as shown in FIG. 30(b1), an inverted trapezoid as shown in FIG. 30(b2), a rectangle as shown in FIG. 30(b3), and an inversed triangle as shown in FIG. 30(b4). It may be an oval, as well. Instead of the semi-circular projections 88c, 88d, rectangular projections 88c, 88c may be formed. While the projections on the inner and outer side surfaces 88c, 88d may be formed at the same position, the projections 88c, 88d may be formed alternately in a staggered arrangement on the inner and outer side surfaces 88a, 88b.

As still other examples of the endless belt 88, rectangular projections 88c may formed only on the inner side surface 88a as shown in FIG. 30(c), and the configurations of the cross sections may be a circle as shown in FIG. 30(c1), an inverted trapezoid as shown in FIG. 30(c2), a rectangle as shown in FIG. 30(c3), and inversed triangle as shown in FIG. 30(c4). It may be an oval, as well. Instead of rectangular projections 88c, semi-circular projections 88c may be formed.

As in the third embodiment shown in FIG. 17, the large diameter connect gear 37a is engaged with the motor gear 36 all the time, and the small diameter intermediate speed reducing gear 58b is engaged with the speed reducing gear 45 all the time.

Other structures of the seat belt retractor 1 of the sixth embodiment are the same as the third example shown in FIG. 17.

In the seat belt retractor 1 of the sixth embodiment having such a structure, when a high load is applied to the motor 10 as described above and the EA load at the EA mechanism 7 increases to a large extent, a torque transmitted among the respective belt pulleys 37c, 58c and the endless belt 88 becomes equal to or higher than the prescribed value. Accordingly, a slip is generated at least between the belt pulley 37c and the endless belt 88, or between the belt pulley 58c and the endless belt 88, to thereby discontinue transmission of a power between them, whereby power transmission does not take place any more at a torque equal to or higher than the prescribed value. Consequently, increase in the EA load due to the load of the motor 10 itself may be controlled or suppressed.

In the sixth embodiment, increase in the EA load is not controlled by rupturing the supporting portion of the planetary gear when subject to the EA lead due to the load of the motor 10 itself as in the third to fifth embodiment, so that when the EA load due to the load of the motor 10 is lowered, it may be used repeatedly. Therefore, in the vehicle that can be driven freely even after occurrence of an emergency, such as a crush, when another emergency, such as a secondary crash, occurs again while the vehicle is being driven to another location, such as a repair shop, the capability of the seat belt retractor to restrain the passenger by winding its seat belt by the motor may be fully exerted again.

Other operation and effects of the seat belt retractor 1 of the sixth embodiment are the same as those of the third embodiment described above.

While transmission of the power between the connect gear 37 and the intermediate speed reducing gear 58 is made by the belt power transmission mechanism 87 in the sixth embodiment, transmission of the power between the motor gear 36 and the connect gear 37 may be made by the belt power transmission mechanism. Alternatively, transmission of the power between the motor gear 36 and the intermediate speed reducing gear 58 may be made by the belt transmission mechanism. In this case, an intermediate pulley comprising a large diameter pulley and a small diameter pulley corresponding to the connect gear 37 may be provided between the motor gear 36 and the intermediate speed reducing gear 58.

In the seat belt retractor 1 in the respective examples described above, the passenger is restrained by the seat belt 3 wound by the prescribed amount by the rotation of the motor 10 in the belt winding direction CCW in case of an emergency. Therefore, after the emergency state is eliminated, the seat belt 3 is restored to its original state, i.e. state before occurrence of an emergency, by rotating the motor in the belt unwinding direction CW. In this case, the reel 4 can not be rotated easily in the belt unwinding direction CW because the locking means 5 is actuated and the pawl 20 is engaged with the inner teeth 18a of the internal teeth member 18 fixed on the frame 2, which resists restoration of the seat belt 3 to its original state. Therefore, the passenger is released by detaching a tongue, not shown, from the buckle.

However, it is preferable to provide the seat belt retractor that ensures restoration of the seat belt 3 to its original state only by controlling the motor 10 without detaching the tongue from the buckle every time after the elimination of the emergency state. Therefore, according to the invention, the seat belt 3 is restored more reliably to its original state by the driving power of the motor 10 after the emergency state is eliminated.

Figure 31:
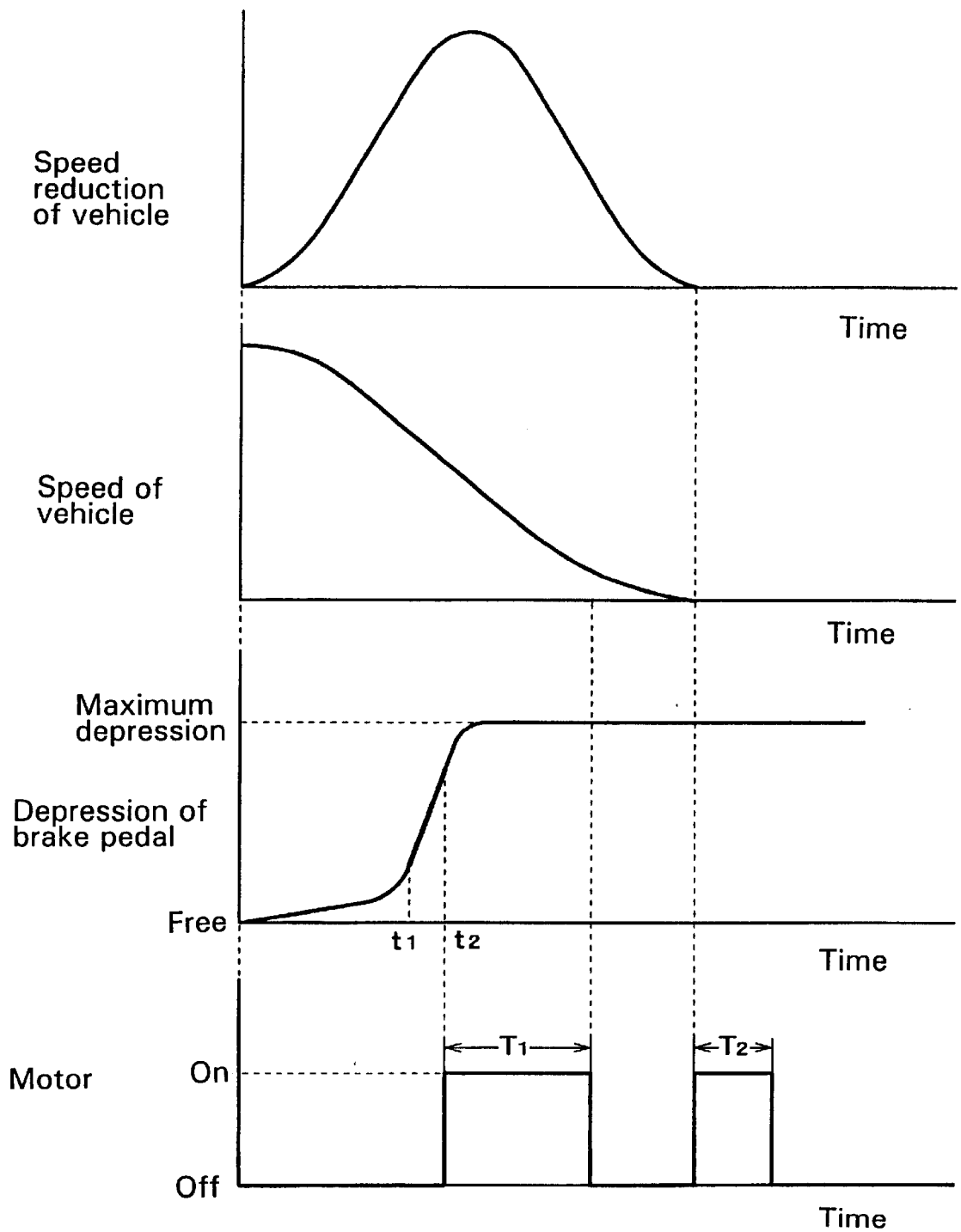
FIG. 31 shows a drawing of a seventh embodiment of the present invention.

FIG. 31 shows a seventh embodiment of the present invention, wherein the seat belt 3 is restored more reliably to its original state by the driving power of the motor after the emergency state is eliminated.

The seat belt retractor 1 of the seventh embodiment has a feature in the driving control of the motor, and any of the seat belt retractors 1 of the previous embodiments may be used.

In the seventh embodiment shown in FIG. 31, a CPU is provided with vehicle's emergency state detecting means, not shown. The vehicle's emergency state detecting means measures a time period (t2−t1) from the time t1 when the brake pedal reached the first fixed depressing position from the initial position, until the time t2 when the brake pedal reached the second fixed depressing position. Then, when the time described above (t2−t1) is equal to or below a certain value, in other words, when the driver brakes suddenly, the vehicle's emergency state detecting means determines that there is a danger of a crush to an obstacle, such as a vehicle, in front thereof, and outputs a signal to the motor drive control means, not shown, in the CPU.

The motor drive control means restrains the passenger by rotating the motor in the belt winding direction CCW for the first preset time period T1 according to the output signal received from the vehicle's emergency state detecting means, and winding a prescribed amount of seat belt 3. It is possible to employ other types of vehicle's emergency state detecting means that uses information on the state of operation by the driver or on the traveling state of the vehicle that may be generated when there is a danger of a crush, for example by determining whether the vehicle's deceleration is equal to or below the preset deceleration or not, as well as by determining whether the time (t2−t1) is equal to or below a certain time period or not as is described above.

After the motor 10 has rotated for the first preset time period T1, the operation of the motor is stopped. In the emergency state of the vehicle, the speed reduction detecting means 8 is actuated, and the pawl 20 of the locking means 5 of the seat belt retractor 1 is moved to the position where it is engageable with the internal teeth 18a as described above, and then, the seat belt is unwound by the passenger firmly restrained onto the seat of the vehicle by the driving force of the motor and the elasticity of the seat itself, so that the reel 4 is rotated in the belt unwinding direction CW. As a result, the pawl 20 is engaged with the internal gear 18a, so that the rotation of the reel 4 in the belt unwinding direction CW is prevented. In other words, the locking means 5 is actuated. Therefore, the unwinding of the seat belt 3 is prevented, thereby preventing the inertial movement of the passenger effectively.

In addition, when the speed of the vehicle becomes zero, in other words, when the vehicle stops, the motor 10 is driven again for the preset time period T2 to rotate the motor in the winding direction CCW, and then the motor 10 is stopped. Driving of the motor 10 for the second preset time period T2 in the belt winding direction CCW makes the reel 4 to rotate in the belt winding direction, and thus engagement of the pawl 20 with the internal teeth 18a is released. In addition, since the vehicle is stopped and thus the speed reduction detecting means 8 is in the non-operating state as it was in the initial state, the operation of the locking means 5 is released. In this state, the vehicle's emergency state is eliminated.

Subsequently, with the vehicle's emergency state eliminated, the motor 10 is rotated for the third preset time period T3 in the belt unwinding direction CW as in the conventional case, and the seat belt 3 and the seat belt retractor 1 are returned to the normal state where the normal unwinding and winding of the seat belt 3 is possible, that is, the state before the vehicle comes into the emergency state with the above described time period (t2−t1) equal to or below a certain time period.

As a next step, the driving control of the motor 10 of the seventh embodiment will be described according to a flow control shown in FIG. 32.

Figure 32:
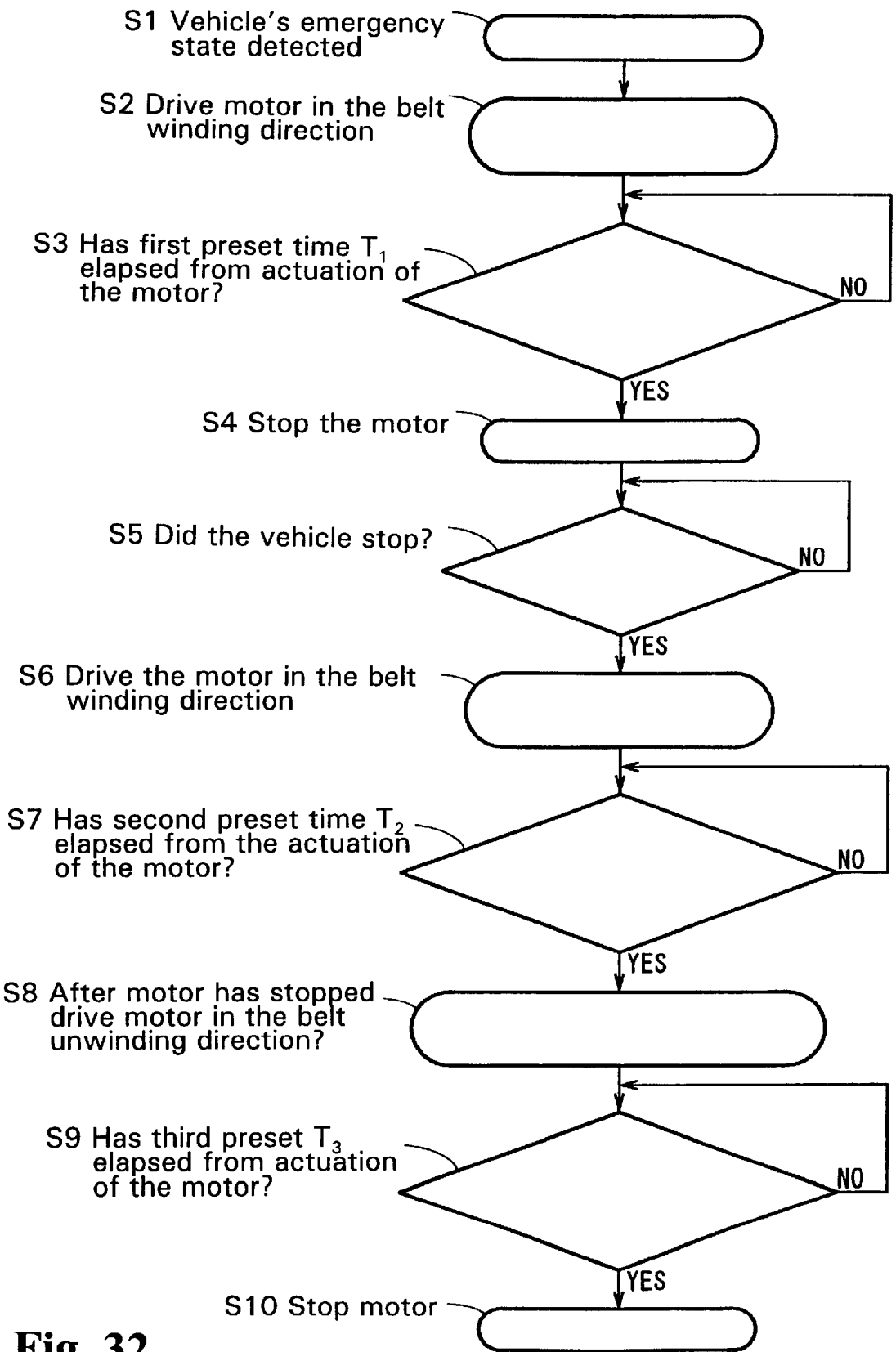
FIG. 32 is a flow chart showing a driving control of the motor of the seventh embodiment shown in FIG. 31.

As shown in FIG. 32, when the vehicle's emergency state is detected according to the method described above at step S1, the motor 10 is driven and rotated in the belt winding direction CCW at the step S2. Then, at the step 3, after the motor 10 is actuated, it is determined whether or not the first preset time period T1 has elapsed. When it is determined that the first preset time period T1 has elapsed, the motor 10 is stopped at the step S4. Then, at the step S5, it is determined whether or not the speed of the vehicle has become zero and the vehicle 10 has stopped. When it is determined that the vehicle has stopped, the motor 10 is rotated again in the belt winding direction CCW at the step S6. Then, after the motor 10 is actuated at the step 7, it is determined whether or not the second preset time period T2 has elapsed. When it is determined that the second preset time period T2 has elapsed, the motor 10 is stopped at the step S8, and then, the motor 10 is driven again and rotated in the belt unwinding direction CW. Subsequently, after the motor 10 is actuated at the step 9, it is determined whether or not the third preset time period T3 has elapsed. When it is determined that the third preset time period T3 has elapsed, the motor 10 is stopped at the step S10.

According to the seventh embodiment, after the locking means 5 has actuated by the vehicle's emergency state and then the vehicle's emergency state is eliminated, the operation of the locking means 5 can be released automatically. Therefore, the passenger can be released easily and reliably from the state securely restrained by driving the motor 10 in the belt winding direction CCW. In addition, it is not necessary to detach the engagement between the tongue and the buckle every time as in the conventional manner, so that the passenger need not perform cumbersome lock releasing operation.

In the example shown in FIG. 31 and FIG. 32, the motor 10 is driven intermittently for the first preset time period T1 and for the second preset time period T2. In this case, the motor 10 may be driven continuously until the second preset time T2 has elapsed from the moment that the vehicle's emergency state is detected. In this case, it is not necessary to set the first preset time period T1.

Figure 33:
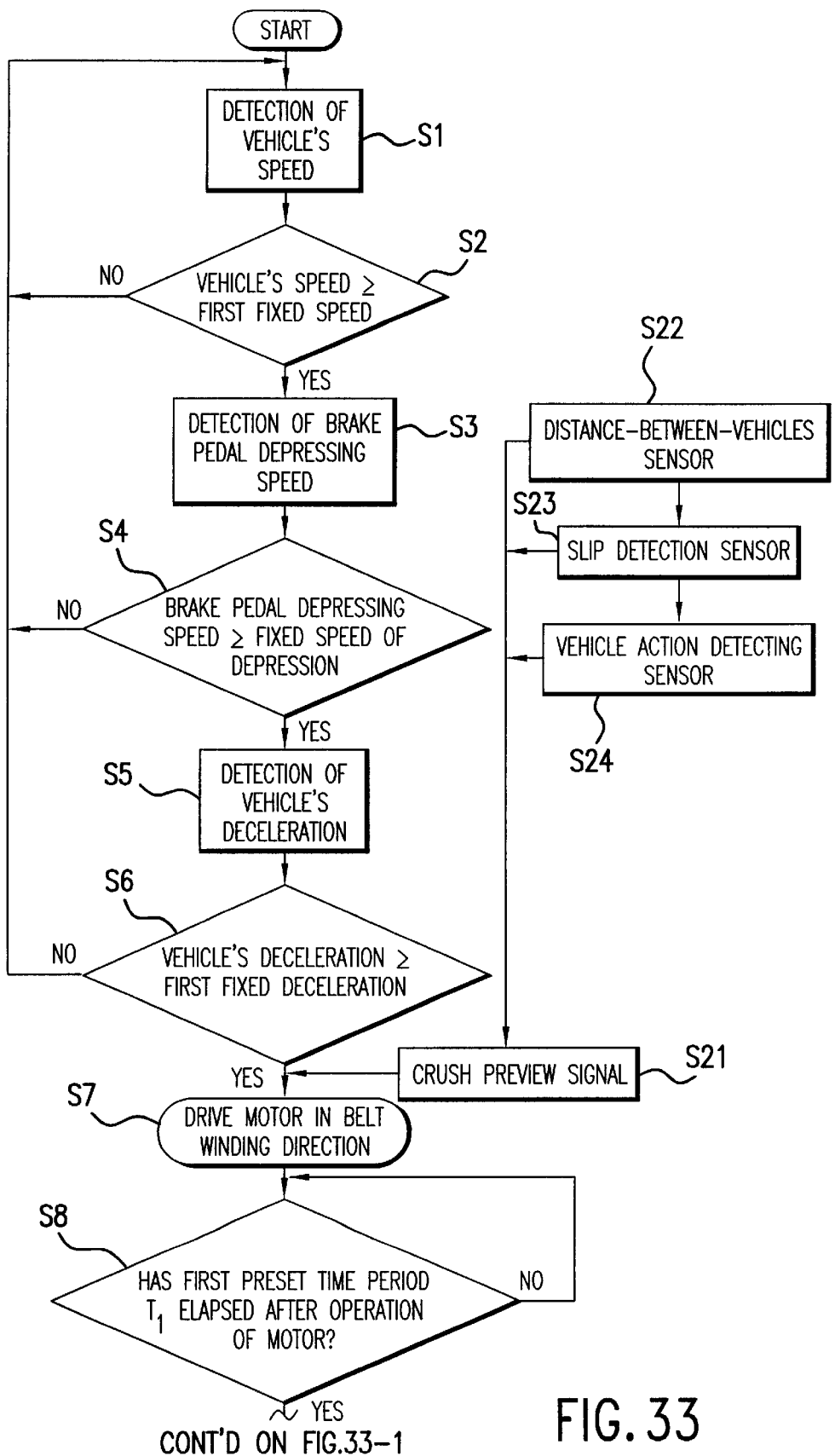
FIG. 33 is a flow chart showing the driving control of the motor shown in an eighth embodiment of the invention.
Figures 1, 33:
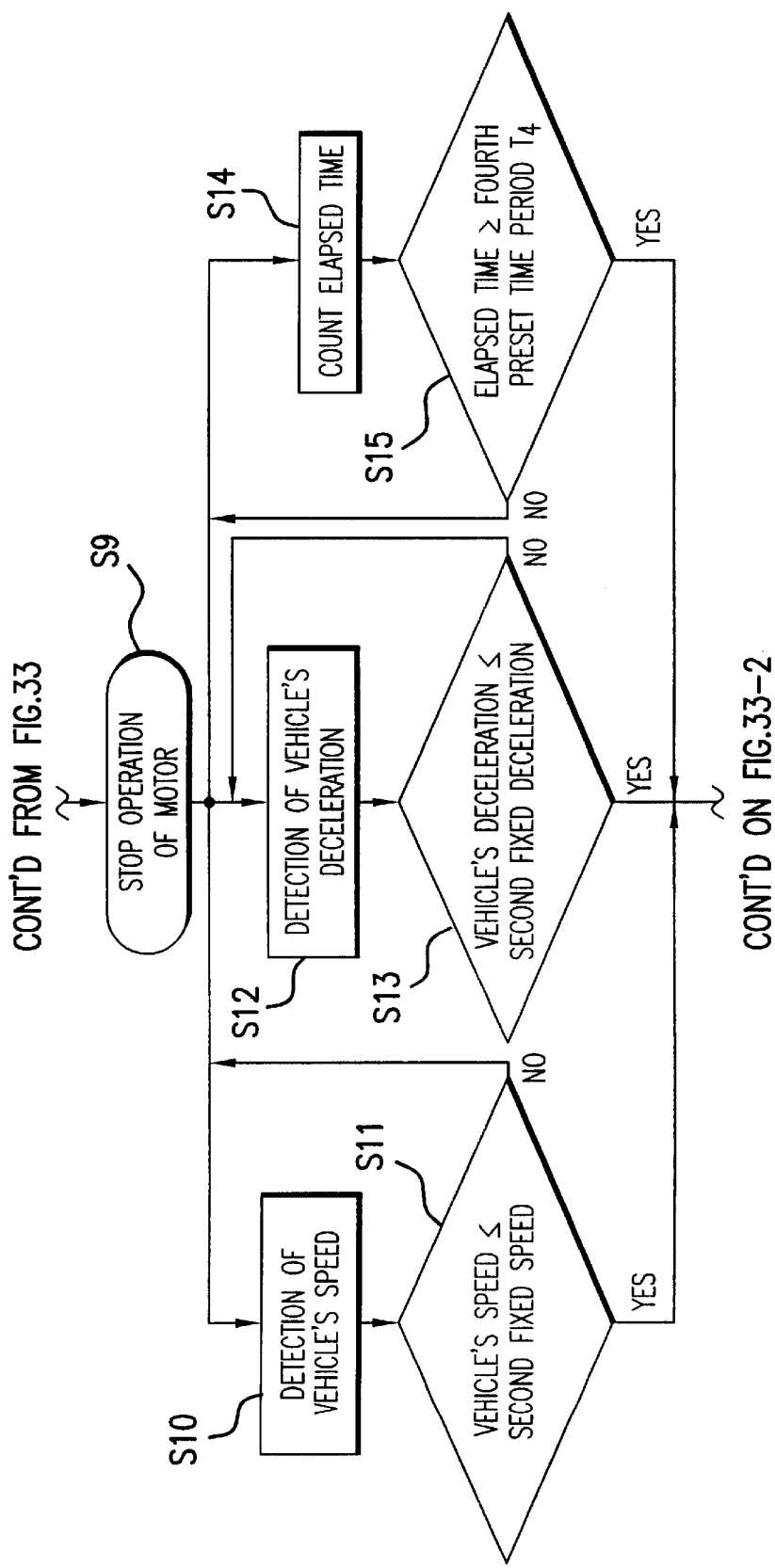
Figures 2, 33:
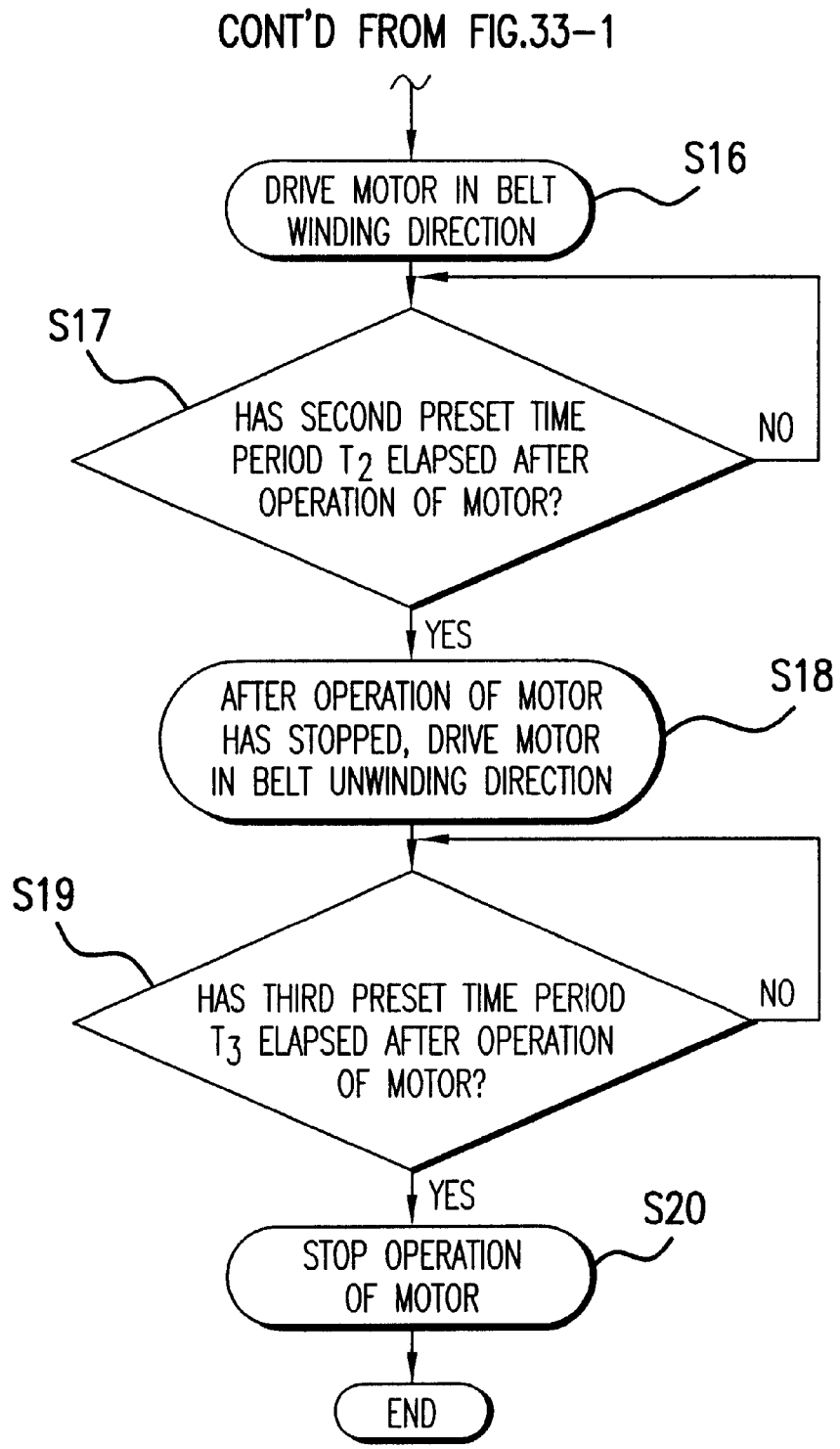

FIG. 33 is a flow chart showing a driving control of a motor shown in an eighth embodiment of the invention.

A driving control of the motor of the eighth example is also intended to restore the seat belt 3 to its original state by the driving force of the motor 10 after the elimination of the emergency state as in the case of the seventh embodiment shown in FIG. 31 and FIG. 33 described above. In the case of the seventh embodiment described above, the motor 10 is controlled to wind the seat belt when one of the conditions according to information on the state of operation by the driver, or information on the vehicle's traveling state is satisfied, in other words, when the time period which takes for the brake pedal to move from the first fixed depressing position to the second fixed depressing position is equal to or below the preset fixed time period, that is, when the speed of depression of the brake pedal is equal to or higher than the preset fixed speed, or when the deceleration of the vehicle is equal to or higher than the preset fixed deceleration. However, in the eighth embodiment, the vehicle is determined to be in the emergency state only when all of these three conditions are satisfied.

In other words, in the eighth embodiment, it is determined to be the vehicle's emergency state when the condition that the speed of the vehicle is equal to or higher than the first preset fixed speed, the condition that the speed of depression of the brake pedal is equal to or higher than the preset first fixed speed, and the condition that the deceleration of the vehicle is equal to the preset first fixed deceleration or higher, are all satisfied, and the motor 10 is driven to wind the seat belt 3 to restrain the passenger with a relatively strong restraining force.

In the seventh embodiment described above, after the passenger is restrained by the seat belt wound by driving the motor 10, the motor 10 is driven in the belt winding direction for the second preset time period T2 upon stoppage of the vehicle, and then, in the belt unwinding direction for the third preset time period T3, so that the seat belt 3 is restored to the original state as it was, i.e. before the vehicle's emergency state is detected. While in the eighth embodiment, when one of several conditions is satisfied, the motor 10 is controlled in the same manner and the seat belt 3 is restored to its original state before the vehicle's emergency state was detected even though the vehicle does not stop.

In other words, in the eighth embodiment, upon detection of the vehicle's emergency state, the motor 10 is driven in the belt winding direction to wind the prescribed amount of the seat belt 3 to restrain the passenger. After the vehicle has stopped and when one of the condition that the speed of the vehicle is equal to or lower than the preset second fixed speed, the condition that the deceleration of the vehicle is equal to or lower than the preset second fixed deceleration, and the condition that the time elapsed after the motor 10 has stopped is equal to or longer than the fourth preset time period T4, is satisfied, the motor 10 is controlled in the same manner as described above to restore its original state before the vehicle's emergency state is detected.

The driving control of the motor 10 of the eighth embodiment will now be described according to the flow chart shown in FIG. 33.

As shown in FIG. 33, the speed of the vehicle is detected at the step S1, and it is determined at the step S2 whether or not the speed of the vehicle is equal to or higher than the first fixed speed. When the speed of the vehicle is determined to be equal to or higher than the first fixed speed, the speed of depression of the brake pedal is detected at the step S3. Detection of the speed of depression of the brake pedal may be performed in the same manner as in the case of the seventh embodiment. At the step S4, it is determined whether or not the speed of depression of the brake pedal is equal to or higher than the fixed speed of depression. When the speed of depression of the break pedal is determined to be equal to or higher than the fixed speed of depression, the deceleration of the vehicle (G) is detected at the step S5, and it is determined at the step S6 whether or not the deceleration of the vehicle is equal to or higher than the first fixed deceleration. When the speed of the vehicle is determined not to be equal to or higher than the first fixed speed at the step S2, when the speed of depression of the pedal is determined not to be equal to or higher than the fixed speed of depression at the step S4, or when the deceleration of the vehicle is determined not to be equal to or higher than the first fixed deceleration at the step S6, the procedure goes back to the start position and is repeated again from the step S1.

When the deceleration of the vehicle is determined to be equal to or higher than the first fixed deceleration at the step S6, it is detected to be the vehicle's emergency state, and the same procedures as the steps S2, S3 and S4 as in the seventh embodiment are carried out at the steps S7, S8 and S9. In other words, the motor 10 is driven in the belt winding direction at the step S7 for the first preset time period T1 (seconds) that is determined at the step S8, and then, the motor 10 is stopped at the step S9 to stop the belt winding operation.

After the procedure of the step S9, three procedures are carried out simultaneously. As the first procedure, the speed of the vehicle is detected again at the step S10, and it is determined at the step S11 whether or not the speed of the vehicle detected is equal to or lower than the second fixed speed. As the second procedure, the deceleration of the vehicle is detected again at the step S12, and it is determined at the step S13 whether or not the deceleration of the vehicle is equal to or lower than the second fixed deceleration. As the third procedure, the time elapsed after the stoppage of the motor at the step S9 is counted at the step S14, and it is determined at the step S15 whether or not the elapsed time counted is equal to or longer than the fourth preset time T4. When the speed of the vehicle is determined not to be equal to or below the second fixed speed at the step S11, when the deceleration of the vehicle is determined not to be equal to or lower than the second fixed deceleration at the step S13, and when the time elapsed from the stoppage of the motor at the step S15 is determined not to be equal to or longer than the fourth preset time period T4 at the step S15, the procedure goes to the step S10 to detect the speed of the vehicle, to the step S12 to detect the deceleration of the vehicle, and to the step 14 to count the elapsed time, respectively.

When the speed of the vehicle is determined to be equal to or lower than the second fixed speed at the step S11, when the deceleration of the vehicle is determined to be lower than the second fixed deceleration at the step S13, or when the time elapsed from the stoppage of the vehicle is equal to or longer than the fourth preset time period T4 at the step 15, exactly the same procedures as the steps S6, S7, S8, S9 and S10 as in the seventh embodiment are carried out at the steps S16, S17, S18, S19 and S20. In other words, the motor 10 is driven in the belt winding direction at the step S16 for the second preset time period T2 (seconds) determined at the step S17, then, the motor 10 is driven in the belt unwinding direction at the step S18 for the third preset time period T3 (seconds) determined at the step S19, and then the motor 10 is stopped at the step S20. Then, after the emergency state is eliminated, the seat belt 3 is restored to the state before the vehicle's emergency state is detected.

In the eighth embodiment, in addition to the detection of the vehicle's emergency state, the motor 10 winds the belt to restrain the passenger, and then, the motor 10 winds and unwinds the seat belt 3 to restore its original state. In other words, when the crush preview signal is detected at the step S21 as shown in FIG. 33, the respective procedures from the step S7 where the passenger is restrained by the belt wound by the motor 10 to the step S20 where the operation of the motor is stopped are carried out.

In this case, a crush preview signal is generated when a distance-between-vehicles sensor has detected that the distance to the car ahead is equal to or below a fixed distance at the step S22, when a slip detecting sensor has detected that a wheel has slipped at the step S23, or when a vehicle action detecting sensor has detected an abnormal action of the vehicle, for example, spinning of the vehicle at the step S24.

According to the motor driving control of the eighth embodiment, since the vehicle's emergency state is detected only when all of the three conditions described above are detected, thus further detail and more accurate detection of the vehicle's emergency state can be made. When one of the condition that the speed of the vehicle is equal to or below the second fixed speed, the condition that the deceleration of the vehicle is equal to or below the second fixed deceleration, and the condition that the time elapsed from the stoppage of the motor is equal to or longer than the third preset time period, is satisfied, it is judged that the vehicle's emergency state is eliminated. Thus, the locking means can be released automatically at the earlier stage and more flexibly in comparison with the case where restoration of the seat belt 3 after elimination of the vehicle's emergency state is made after the vehicle has stopped as in the seventh embodiment. In addition, since the seat belt is automatically restored to the state before the vehicle's emergency state is detected after the vehicle's emergency state is eliminated and the operation of the locking means is automatically released, the passenger need not perform the additional lock releasing operation, and what is more, the passenger can be released automatically from the restrained state.

Figure 34:
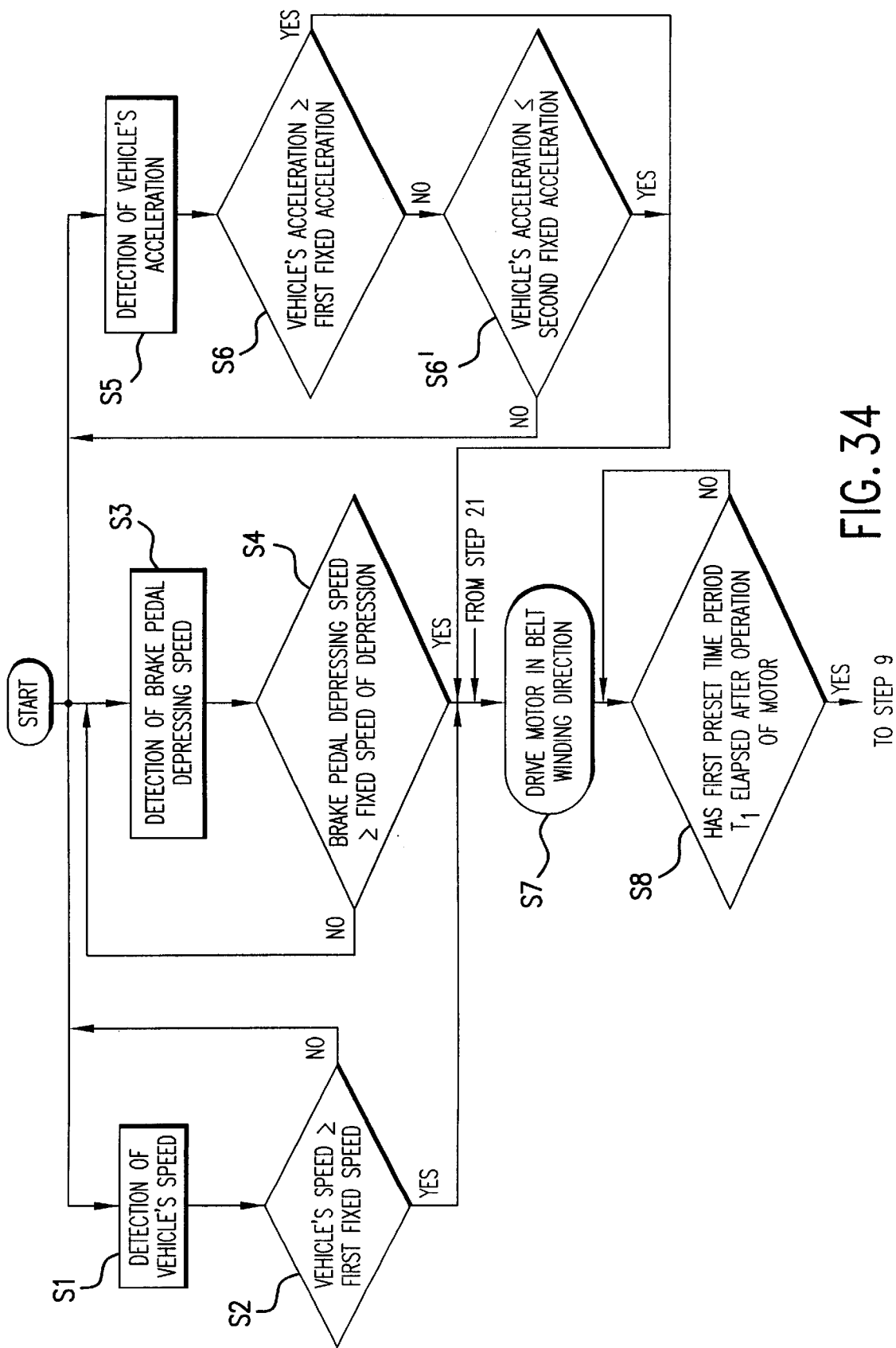
FIG. 34 is a flow chart showing the driving control of the motor shown in a ninth embodiment of the invention.

FIG. 34 is a flow chart showing the driving control of the motor of a ninth embodiment of the invention.

While the vehicle's emergency state is detected when all the three conditions described above are satisfied in the eighth embodiment, in the driving control of the motor of the ninth embodiment, the speed of the vehicle is detected at the step S1, and it is determined at the step S2 whether or not the speed of the vehicle detected is equal to or higher than the first fixed speed, as shown in FIG. 34. When the speed of the vehicle is determined to be equal to or higher than the first fixed speed, the motor 10 is driven in the belt winding direction at the step 7 as in the eighth embodiment. When the speed of the vehicle is determined not to be equal to or higher than the first fixed speed, the procedure goes back to the step S1.

The speed of depression of the brake pedal is detected at the step S3, and it is determined at the step S4 whether or not the speed of depression of the pedal is equal to or higher than the fixed speed of depression. When the speed of depression of the pedal is determined to be equal to or higher than the fixed speed of depression, the motor 10 is driven in the belt winding direction at the step S7 as in the eighth embodiment. When the speed of depression of the pedal is determined not to be equal to or higher than the fixed speed of depression, the procedure goes back to the step S3. The procedures of the steps S3 and S4 are the same as the case of the seventh embodiment.

At the step S5, the acceleration of the vehicle is detected. In the ninth embodiment, the deceleration of the vehicle in the respective embodiments described above is treated as the negative acceleration of the vehicle. Therefore, when a significantly large positive acceleration of the vehicle or a significantly small negative acceleration of the vehicle, i.e. deceleration of the vehicle, is detected, the vehicle is determined to be in the emergency state. Therefore, in the ninth embodiment, the first fixed acceleration (positive value) as a reference value for comparing with the positive acceleration of the vehicle and the second fixed acceleration (negative value) as a reference value for comparing with the negative acceleration of the vehicle are set in advance. Then, at the step S6, it is determined whether or not the acceleration of the vehicle is equal to or higher than the first acceleration. When the acceleration of the vehicle is determined to be equal to or higher than the first fixed acceleration, the motor 10 is driven in the belt winding direction at the step S7 as in the eighth embodiment. When the acceleration of the vehicle is determined not to be equal to or higher than the first fixed acceleration, it is determined at the step S6' whether or not the acceleration of the vehicle is equal to or below the second fixed acceleration. When the acceleration of the vehicle is determined to be equal to or below the second fixed acceleration, the motor 10 is driven to the belt winding direction at the step S7 as in the eighth embodiment. When the acceleration of the vehicle is determined not to be equal to or below the second fixed acceleration, the procedure goes back to the step S5.

Other flows of the ninth embodiment are the same as in the eighth embodiment.

According to the ninth embodiment, when the speed of the vehicle is high, the passenger under high speed driving is restrained and protected by winding the seat belt 3, and when there is a danger of being bumped at the back of the vehicle by another vehicle and thus the vehicle is suddenly accelerated, in order to eliminate the vehicle's emergency state, the passenger under strong acceleration is restrained and protected in the same manner. When there is a danger of crushing to another vehicle ahead and thus the vehicle is suddenly decelerated by braking suddenly in order to eliminate the vehicle's emergency state, the passenger under strong deceleration is restrained and protected in the same manner.

Other operations and effects of the ninth example are the same as those of the seventh and eighth embodiments.

In addition, it is also possible to construct the seat belt retractor of this embodiment to detect the vehicle's emergency state when the absolute value of the acceleration of the vehicle is determined to be equal to or higher than a fixed acceleration as a reference value.

As is apparent from the description above, according to one aspect of seat belt retractor of the invention, when the motor is not in operation, the power transmission path switching mechanism is not actuated and the power transmission path is set to the OFF-state so that a rotational torque is not transmitted between the motor and the reel, and thus the rotation of the reel during unwinding or winding operation of the seat belt is not transmitted to the power transmission path switching mechanism, and consequently, the rotation of the reel does not affect the motor and the power transmission path switching mechanism.

On the other hand, when the motor is in operation, a rotational torque of the motor actuates the power transmission path switching mechanism, and the power transmission path is set in the ON-state so that the rotational torque is transmitted between the motor and the reel, and thus, the rotational torque of the motor is transmitted to the reel via the power transmission path switching mechanism. Therefore, by rotating the reel by the rotational torque of the motor, the winding and unwinding operations of the seat belt are carried out and thus the belt tension is controlled. In this manner, the belt tension is controlled easily and reliably to the desired value by operating the belt tension control mechanism by the driving force of the motor.

In this case, since the ON and OFF-states of the power transmission path are controlled by the power transmission path switching mechanism actuated by the rotational torque of the motor, it is not necessary to provide a specifically designed actuator using a special motive power, such as an electromagnetic solenoid, for actuating the power transmission path switching mechanism. Therefore, the number of the components used in the power transmission path switching mechanism is reduced, and thus the structure is simplified, thereby reducing the cost.

In addition, according to another aspect of the invention, since transmission of a power is discontinued by the transmitted torque limiting mechanism when a power transmission torque is equal to or higher than the prescribed value, it is possible to discontinue transmission of the power so that the load of the motor itself is not linked to the reel side in case of sudden increase of a transmitted power by occurrence of emergency state. Therefore, in the seat belt retractor having the EA mechanism on the reel side, it is possible to prevent the load of the motor itself from being linked to the EA mechanism, thus to control or suppress increase of the EA load due to the load of the motor itself. In this case, according to one embodiment of the invention, since the supporting portion of the planetary gear is ruptured when the power transmission torque is equal to or higher than the prescribed value, the structure of the transmitted torque limiting mechanism can be simplified.

According to a further aspect of the invention, since transmission of the power is discontinued by generating a slip between the endless belt and the pulley of the transmitted torque limiting mechanism when the power transmitting torque is equal to or higher than the prescribed value, a high load of the motor itself can be prevented from being linked to the reel side by discontinuing transmission of a power even when a transmitted power is suddenly increased. Therefore, in the seat belt retractor having the EA mechanism on the reel side, the high load of the motor itself can be prevented from being linked to the EA mechanism, as in the other embodiment, so that the increase in the EA load due to the load of the motor itself can be controlled or suppressed.

In addition, the component, such as a supporting portion of the planetary gear, is not ruptured even when the power transmission torque is equal to or higher than the prescribed value in this construction, the component can be used repeatedly when the power transmission torque is lowered to the value below the prescribed value. Therefore, in the vehicle that can be driven freely even after occurrence of an emergency, such as a crush, when another emergency, such as a secondary crush, occurs again while the vehicle is being driven to another location, such as a repair shop, the capability of the seat belt retractor to restrain the passenger by winding its seat belt by the motor may be fully exerted again.

According to a further aspect of the invention, after the locking means is actuated by occurrence of the vehicle's emergency and then the emergency state is eliminated, the actuation of the locking means is automatically released, so that the passenger is released easily and more reliably from the state of secure restraint brought by the motor driven in the belt winding direction. In addition, it is not necessary to release the engagement between the tongue and the buckle every time as in the case of the conventional system any more, whereby the additional lock releasing operation to be made by the passenger can be eliminated.

According to a further aspect of the invention, the detection of the vehicle's emergency state can be performed in further detail and more accurately by detecting the vehicle's emergency state only when all of the three conditions are satisfied.

According to a still further aspect of the invention, detection of the vehicle's emergency state by the vehicle's emergency state detecting means is relatively easy since the vehicle's emergency state detecting means detects the emergency state when the condition that the speed of the vehicle is equal to or higher than the first fixed speed is determined to be satisfied, when the condition that the speed of depression of the brake pedal is equal to or higher than a fixed speed of depression is determined to be satisfied, or when the condition that the acceleration of the vehicle is equal to or higher than the first fixed acceleration which is a positive value, or is equal to or lower than the second fixed acceleration which is a negative value is determined to be satisfied.

According to a still further aspect of the invention, it is determined that the vehicle's emergency state is eliminated when one of the condition that the vehicle has stopped, the condition that the speed of the vehicle is equal to or lower than the second fixed speed, the condition that the deceleration of the vehicle is equal to or lower than the second fixed deceleration, and the condition that the time elapsed from a moment when the operation of the motor is stopped is equal to or longer than the third preset time period, is satisfied. Consequently, the operation of the locking means is automatically released at an earlier stage and more flexibly after the vehicle's emergency state is eliminated.

According to a still further aspect of the invention, after the vehicle's emergency state is eliminated and the operation of the rocking means is automatically released, the seat belt is restored automatically to the state before the vehicle's emergency state was detected. Consequently, the passenger need not perform the additional lock releasing operation, and what is more, the passenger can be released automatically from the restrained state.

While the invention has been explained with reference to the specific embodiments of the invention, the explanation is illustrative and the invention is limited only by the appended claims.

What is claimed is:

1. A seat belt retractor comprising:

a frame, a reel rotationally supported by the frame for winding a seat belt, reel urging means connected to the reel for always urging the reel in a seat belt winding direction, locking means provided between the frame and the reel for allowing the reel to rotate freely in a normal state and preventing the reel from rotation in a belt unwinding direction when necessary, and a belt tension control mechanism for controlling a belt tension of the seat belt, and including a motor for generating a rotational torque; a power transmission path situated between the motor and the reel and having a speed reducing mechanism therein, an OFF-state in which the rotational torque of the motor is not transmitted between the motor and the reel and an ON-state in which the rotational torque is transmitted between the motor and the reel; and a power transmission path switching mechanism for selectively switching the power transmission path between the ON-state and the OFF-state and having a stop lever engageable with the speed reducing mechanism so that when the motor is actuated, the stop lever is engaged with the speed reduction mechanism to transfer the rotational torque of the motor to the reel for winding the seat belt.

2. A seat belt retractor according to claim 1, wherein said power transmission path includes a power transmission gear mechanism with a helical gear, and said power transmission path switching mechanism includes a helical switch gear axially movable for controlling operation thereof and engaging the helical gear of the power transmission gear mechanism so that when the helical gear of the power transmission gear mechanism is rotated by the rotational torque of the motor, the switch gear is rotated, and an axial tension generated in an axial direction by the rotation of the helical gear moves said switch gear in the axial direction, to thereby move the stop lever of the power transmission path switching mechanism and set the power transmission path into the ON-state.

3. A seat belt retractor according to claim 2, wherein said speed reducing mechanism reduces a rotating speed of the motor transmitted from the power transmission gear mechanism and transmits it to the reel, said speed reducing mechanism including a sun gear, a ring-shaped internal gear having ratchet teeth on an outer periphery thereof and internal teeth on an inner periphery thereof, a planetary gear engaging the sun gear and the internal gear, a carrier for rotatably supporting the planetary gear and transmitting rotation thereof to the reel, and a speed reducing gear integrally rotatable with the sun gear for receiving the rotational torque of the motor transmitted from the power transmission gear mechanism.

4. A seat belt retractor according to claim 3, wherein said stop lever is rotatable between a non-engaging position in which the stop lever does not engage the ratchet teeth and an engaging position in which the stop lever is engageable with the ratchet teeth, and said power transmission path switching mechanism further includes a plunger for placing the stop lever to the non-engaging position in the normal state in which the switch gear does not move in an axial direction thereof to allow free rotation of the internal gear, and for preventing the rotation of the internal gear by placing the stop lever to engage the ratchet teeth when the switch gear is actuated and moved in the axial direction, said power transmission path being set to the OFF-state when the internal gear is free to rotate, and to the ON-state when the internal gear is prevented from rotating.

5. A seat belt retractor according to claim 3, wherein said speed reducing mechanism includes a transmitted torque limiting mechanism for discontinuing transmission of a power when a power transmission torque is equal to or higher than a prescribed value.

6. A seat belt retractor according to claim 5, wherein said transmitted torque limiting mechanism includes a supporting portion formed at the planetary gear, said supporting portion being ruptured when a power transmission torque is equal to or higher than the prescribed value.

7. A seat belt retractor according to claim 3, wherein said power transmission gear mechanism includes a belt power transmission mechanism having first and second pulleys, and an endless belt disposed between the first and the second pulleys, to form a transmitted torque limiting mechanism so that when a power transmission torque is equal to or higher than a prescribed value, a slip is generated between the endless belt and at least one of the first and second pulleys to discontinue power transmission therethrough.

8. A seat belt retractor according to claim 1, wherein said power transmission path switching mechanism includes a rotatable control lever for controlling an operation thereof, to which the stop lever is attached, so that when the power transmission gear mechanism is operated by the rotational torque of the motor, the power transmission path switching mechanism is actuated by rotation of the rotatable control lever to set to the ON-state.

9. A seat belt retractor according to claim 8, wherein said speed reducing mechanism reduces a rotating speed of the motor transmitted from the power transmission gear mechanism and transmits it to the reel, said speed reducing mechanism including a sun gear, a ring-shaped internal gear having ratchet teeth on an outer periphery thereof and internal teeth on an inner periphery thereof, a planetary gear engaging the sun gear and the internal gear, a carrier for rotatably supporting the planetary gear and transmitting rotation thereof to the reel, and a speed reducing gear integrally rotatable with the sun gear for receiving the rotation of the motor transmitted from the power transmission gear mechanism.

10. A seat belt retractor according to claim 9, wherein said control lever is rotatable between a non-engaging position in which the stop lever does not engage the ratchet teeth and an engaging position in which the stop lever is engageable with the ratchet teeth, said stop lever being placed in the non-engaging position in the normal state in which the control lever does not rotate, to allow free rotation of the internal gear, and being placed in the engaging position to engage the ratchet teeth to thereby prevent the rotation of the internal gear when the control lever is rotated, said power transmission path being set to the OFF-state when the internal gear is free to rotate, and to the ON-state when the internal gear is prevented from rotating.

11. A seat belt retractor according to claim 10, wherein said control lever is formed of a lever spring having a predetermined resiliency.

12. A seat belt retractor according to claim 10, wherein said planetary gear comprises a large planetary gear having a large diameter to always engage the sun gear, and a small planetary gear having a diameter smaller than that of the large planetary gear, said small planetary gear rotating integrally with the large planetary gear and always engaging the internal teeth of the internal gear.

13. A seat belt retractor according to claim 1, wherein said belt tension control mechanism further includes vehicle's emergency state detecting means for detecting an emergency state of a vehicle and sending a signal, and motor drive control means connected to the motor and the emergency state detecting means, said motor drive control means driving the motor in a belt winding direction for a first preset time period according to the signal from the emergency state detecting means to restrain a passenger, then stopping the motor, and when a prescribed condition is satisfied after the motor has stopped, driving the motor again in the belt winding direction additionally for a second preset period.

14. A seat belt retractor according to claim 13, wherein said vehicle's emergency state detecting means detects a condition that a speed of the vehicle is equal to or higher than a fixed speed, a condition that a speed of depression of a brake pedal is equal to or higher than a fixed speed of depression, and a condition that a deceleration of the vehicle is equal to or higher than a fixed deceleration, said vehicle's emergency state detecting means determining that the vehicle is in the emergency state when the three conditions are satisfied.

15. A seat belt retractor according to claim 13, wherein said vehicle's emergency state detecting means detects a condition that a speed of the vehicle is equal to or higher than a fixed speed, a condition that a speed of depression of a brake pedal is equal to or higher than a fixed speed of depression, a condition that an acceleration of the vehicle is equal to or higher than a first fixed acceleration which is a positive value, and an acceleration of the vehicle is equal to or lower than a second fixed acceleration which is a negative value, said vehicle's emergency state detecting means determining that the vehicle is in the emergency state when one of the four conditions is satisfied.

16. A seat belt retractor according to claim 13, wherein said prescribed condition includes a condition that the vehicle has stopped, a condition that a speed of the vehicle is equal to or lower then a second speed, a condition that a deceleration of the vehicle is equal to or lower than a fixed deceleration, and a condition that a time elapsed since an operation of the motor is stopped is equal to or longer than a third preset period, said prescribed condition being satisfied when one of the four conditions is met.

17. A seat belt retractor according to claim 13, wherein said motor is driven in a belt unwinding direction for a third preset period after the motor is driven in the belt winding direction for the second preset period.

* * * * *